(12) United States Patent
Bidram et al.

(10) Patent No.: US 10,676,279 B1
(45) Date of Patent: Jun. 9, 2020

(54) SYSTEMS, METHODS, AND STORAGE UNITS FOR ARTICLE TRANSPORT AND STORAGE

(71) Applicant: Advanced Intelligent Systems Inc., Burnaby (CA)

(72) Inventors: Farhang Bidram, Burnaby (CA); Shahram Pourazadi, Burnaby (CA); Milad Zarrinderakht, Burnaby (CA)

(73) Assignee: ADVANCED INTELLIGENT SYSTEMS INC., Burnaby (CA)

( * ) Notice: Subject to any disclaimer, the term of this patent is extended or adjusted under 35 U.S.C. 154(b) by 0 days.

(21) Appl. No.: 16/704,019

(22) Filed: Dec. 5, 2019

Related U.S. Application Data

(63) Continuation of application No. PCT/CA2019/051662, filed on Nov. 20, 2019.
(Continued)

(51) Int. Cl.
*B65G 1/10* (2006.01)
*A47B 57/04* (2006.01)
(Continued)

(52) U.S. Cl.
CPC ............ *B65G 1/10* (2013.01); *A47B 57/04* (2013.01); *A47B 57/06* (2013.01); *B65G 1/023* (2013.01); *B65G 1/026* (2013.01); *B65G 1/0492* (2013.01); *B65G 1/1371* (2013.01); *B65G 1/1373* (2013.01); *B65G 2203/046* (2013.01)

(58) Field of Classification Search
CPC ...................................................... B65G 1/10
See application file for complete search history.

(56) References Cited

U.S. PATENT DOCUMENTS

| | | | |
|---|---|---|---|
| 4,345,802 | A | 8/1982 | Sorensen |
| 4,536,690 | A | 8/1985 | Belsterling et al. |

(Continued)

FOREIGN PATENT DOCUMENTS

| | | |
|---|---|---|
| CA | 2622940 A1 | 3/2007 |
| CN | 1611331 A | 5/2005 |

(Continued)

OTHER PUBLICATIONS

ISA/CA, International Search Report and Written Opinion for PCT/CA2019/051662, dated Jan. 28, 2020.

*Primary Examiner* — Jonathan Snelting
(74) *Attorney, Agent, or Firm* — Own Innovation; James W. Hinton

(57) ABSTRACT

Provided are systems, methods, and devices for storing and transporting articles with a multi-shelf storage unit. A system for article handling includes a multi-shelf storage unit and a robotic unit. The multi-shelf storage unit includes a plurality of shelves disposed on a frame, the plurality of shelves including at least one vertically moveable shelf configured to move in first and second vertical directions relative to the frame, and a lift mechanism configured to automatically drive, in response to receiving a drive input, the at least one vertically moveable shelf in the first or second vertical direction. The robotic unit includes an end effector disposed on a robotic manipulator for engaging an article and a lift mechanism actuator that is connectable to the lift mechanism and configured to provide the drive input to actuate the lift mechanism.

19 Claims, 48 Drawing Sheets

Related U.S. Application Data

(60) Provisional application No. 62/802,436, filed on Feb. 7, 2019, provisional application No. 62/800,158, filed on Feb. 1, 2019, provisional application No. 62/786,310, filed on Dec. 28, 2018, provisional application No. 62/780,764, filed on Dec. 17, 2018, provisional application No. 62/769,591, filed on Nov. 20, 2018.

(51) Int. Cl.
*A47B 57/06* (2006.01)
*B65G 1/02* (2006.01)
*B65G 1/04* (2006.01)
*B65G 1/137* (2006.01)

(56) References Cited

U.S. PATENT DOCUMENTS

| | | |
|---|---|---|
| 4,600,355 A | 7/1986 | Johnson |
| 4,621,562 A | 11/1986 | Carr et al. |
| 4,636,137 A | 1/1987 | Lemelson |
| 4,678,390 A | 7/1987 | Bonneton et al. |
| 4,698,775 A | 10/1987 | Koch et al. |
| 4,829,840 A | 5/1989 | Torii et al. |
| 5,017,084 A | 5/1991 | Lemelson |
| 5,202,832 A | 4/1993 | Lisy |
| 5,339,968 A | 8/1994 | Voelz |
| 5,358,568 A | 10/1994 | Okano et al. |
| 5,491,540 A | 2/1996 | Hirst |
| 5,503,513 A | 4/1996 | Detriche |
| 5,523,662 A | 6/1996 | Goldenberg et al. |
| 5,550,953 A | 8/1996 | Seraji |
| 5,664,929 A | 9/1997 | Esaki et al. |
| 5,682,313 A | 10/1997 | Edlund et al. |
| 5,737,500 A | 4/1998 | Seraji et al. |
| 5,787,322 A | 7/1998 | Sass et al. |
| 5,809,375 A | 9/1998 | Owens, Jr. et al. |
| 5,887,229 A | 3/1999 | Sass et al. |
| 6,119,880 A | 9/2000 | Dueck |
| 6,473,371 B1 | 10/2002 | White |
| 6,507,163 B1 | 1/2003 | Allen |
| 6,715,910 B2 | 4/2004 | Robey |
| 6,898,484 B2 | 5/2005 | Pedersen et al. |
| 7,240,879 B1 | 7/2007 | Cepollina et al. |
| 7,496,314 B2 | 2/2009 | Lombardo et al. |
| 7,635,246 B2 | 12/2009 | Neeper et al. |
| 8,010,230 B2 | 8/2011 | Zini et al. |
| 8,075,237 B2 | 12/2011 | Webster et al. |
| 8,099,191 B2 | 1/2012 | Blanc et al. |
| 8,160,747 B1 | 4/2012 | Blackwell et al. |
| 8,229,595 B2 | 7/2012 | Seelinger et al. |
| 8,229,622 B2 | 7/2012 | Payne et al. |
| 8,360,178 B2 | 1/2013 | Goldenberg et al. |
| 8,588,976 B2 | 11/2013 | Mangaser et al. |
| 8,676,425 B2 | 3/2014 | Jones et al. |
| 8,915,692 B2 | 12/2014 | Grinnell et al. |
| 8,958,916 B2 | 2/2015 | Setrakian et al. |
| 9,114,440 B1 | 8/2015 | Colucci et al. |
| 9,238,304 B1 | 1/2016 | Bradski et al. |
| 9,254,897 B2 | 2/2016 | Andrieu et al. |
| 9,326,599 B1 | 5/2016 | Sowers |
| 9,440,352 B2 | 9/2016 | Meier et al. |
| 9,486,921 B1 | 11/2016 | Straszheim et al. |
| 9,505,136 B1 | 11/2016 | Nusser et al. |
| 9,550,624 B2 | 1/2017 | Khodl et al. |
| 9,637,318 B2 | 5/2017 | Messina |
| 9,751,693 B1 | 9/2017 | Battles et al. |
| 9,770,825 B2 | 9/2017 | Goldenberg et al. |
| 9,785,911 B2 | 10/2017 | Galluzzo et al. |
| 9,889,562 B1 | 2/2018 | Rembisz |
| 9,902,560 B2 | 2/2018 | Porat |
| 9,919,872 B2 | 3/2018 | Khodl et al. |
| 9,952,589 B1 | 4/2018 | Brazeau |
| 9,958,854 B2 | 5/2018 | Vasquez et al. |
| 10,011,434 B1 | 7/2018 | Messina |
| 10,048,697 B1 | 8/2018 | Theobald |
| 10,059,006 B2 | 8/2018 | Rublee |
| 10,065,314 B2 | 9/2018 | Tian et al. |
| 10,108,185 B1 | 10/2018 | Theobald |
| 10,137,566 B2 | 11/2018 | Bastian et al. |
| 10,144,128 B1 | 12/2018 | Kolb et al. |
| 10,214,400 B2 | 2/2019 | High et al. |
| 10,336,592 B2 | 7/2019 | Atchley et al. |
| 2004/0096303 A1 | 5/2004 | Resta |
| 2004/0243280 A1 | 12/2004 | Bash |
| 2005/0222713 A1 | 10/2005 | Kawabe et al. |
| 2008/0282494 A1 | 11/2008 | Won et al. |
| 2009/0157224 A1 | 6/2009 | Blanc et al. |
| 2011/0010007 A1 | 1/2011 | Sarh et al. |
| 2011/0172850 A1 | 7/2011 | Paz-Meidan et al. |
| 2011/0301757 A1 | 12/2011 | Jones et al. |
| 2012/0029697 A1 | 2/2012 | Ota et al. |
| 2013/0054024 A1 | 2/2013 | Bruemmer et al. |
| 2013/0110281 A1 | 5/2013 | Jones et al. |
| 2013/0181544 A1 | 7/2013 | Comins et al. |
| 2014/0214195 A1* | 7/2014 | Worsley ............ G05D 1/0287 700/217 |
| 2014/0311995 A1 | 10/2014 | Reimer et al. |
| 2014/0363264 A1 | 12/2014 | Gowa et al. |
| 2015/0050111 A1 | 2/2015 | Townsend |
| 2015/0066281 A1 | 3/2015 | Allen et al. |
| 2015/0151933 A1 | 6/2015 | Grinnell et al. |
| 2016/0075014 A1 | 3/2016 | Bruemmer |
| 2016/0101940 A1 | 4/2016 | Grinnell et al. |
| 2016/0176638 A1 | 6/2016 | Toebes |
| 2016/0187886 A1 | 6/2016 | Jones et al. |
| 2016/0257212 A1 | 9/2016 | Thompson et al. |
| 2016/0259028 A1 | 9/2016 | High et al. |
| 2016/0259341 A1 | 9/2016 | High et al. |
| 2016/0259342 A1 | 9/2016 | High et al. |
| 2016/0259343 A1 | 9/2016 | High et al. |
| 2016/0259345 A1 | 9/2016 | McHale et al. |
| 2016/0260054 A1 | 9/2016 | High et al. |
| 2016/0260161 A1 | 9/2016 | Atchley et al. |
| 2016/0261698 A1 | 9/2016 | Thompson et al. |
| 2016/0318494 A1 | 11/2016 | Henry et al. |
| 2016/0349758 A1 | 12/2016 | Wang et al. |
| 2017/0009417 A1 | 1/2017 | High et al. |
| 2017/0010608 A1 | 1/2017 | High et al. |
| 2017/0010609 A1 | 1/2017 | High et al. |
| 2017/0020354 A1 | 1/2017 | High et al. |
| 2017/0024806 A1 | 1/2017 | High et al. |
| 2017/0174431 A1 | 6/2017 | Borders et al. |
| 2017/0183159 A1 | 6/2017 | Weiss |
| 2017/0248966 A1 | 8/2017 | Lutz et al. |
| 2017/0283171 A1 | 10/2017 | High et al. |
| 2017/0349376 A1 | 12/2017 | Porat |
| 2018/0001479 A1 | 1/2018 | Li et al. |
| 2018/0088586 A1 | 3/2018 | Hance et al. |
| 2018/0127999 A1 | 5/2018 | Durvasula et al. |
| 2018/0162469 A1 | 6/2018 | Blankespoor et al. |
| 2018/0281143 A1 | 10/2018 | Albert et al. |
| 2018/0349843 A1 | 12/2018 | High et al. |
| 2018/0354143 A1 | 12/2018 | Dorfman |
| 2018/0361571 A1 | 12/2018 | Georgeson et al. |

FOREIGN PATENT DOCUMENTS

| | | |
|---|---|---|
| CN | 104133472 A | 11/2014 |
| CN | 205219095 U | 5/2016 |
| CN | 105729441 A | 7/2016 |
| CN | 106002932 A | 10/2016 |
| CN | 106272415 A | 1/2017 |
| CN | 206871807 U | 1/2018 |
| CN | 107753105 A | 3/2018 |
| CN | 108335458 A | 7/2018 |
| CN | 108792386 A | 11/2018 |
| DE | 3416435 A1 | 11/1985 |
| DE | 102015220066 A1 | 4/2017 |
| DE | 102016009548 B3 | 8/2017 |
| DE | 102016222255 B3 | 4/2018 |
| DE | 102017009939 A1 | 4/2019 |
| EP | 0304342 A3 | 8/1990 |

(56) References Cited

FOREIGN PATENT DOCUMENTS

| | | |
|---|---|---|
| EP | 0388288 A1 | 9/1990 |
| EP | 0441397 A1 | 8/1991 |
| EP | 0616275 B1 | 9/1998 |
| EP | 2147757 A1 | 1/2010 |
| EP | 2296071 A1 | 3/2011 |
| EP | 2546711 A2 | 1/2013 |
| EP | 2631040 A2 | 8/2013 |
| EP | 3415284 A2 | 12/2018 |
| EP | 3418245 A1 | 12/2018 |
| FR | 2492784 B1 | 4/1985 |
| JP | S6449237 A | 2/1989 |
| JP | H04310382 A | 11/1992 |
| JP | 2653306 B2 | 9/1997 |
| JP | 2003054711 A | 2/2003 |
| JP | 2009196381 A | 9/2009 |
| JP | 3188953 U | 2/2014 |
| JP | 5900462 B2 | 4/2016 |
| JP | 6531968 B2 | 6/2019 |
| KR | 20070011495 A | 1/2007 |
| KR | 101059929 B1 | 8/2011 |
| KR | 101878436 B1 | 7/2018 |
| WO | 2004103864 A1 | 12/2004 |
| WO | 2013066534 A1 | 5/2013 |
| WO | 2015038705 A1 | 3/2015 |
| WO | 2017197305 A1 | 11/2017 |
| WO | 2018045448 A1 | 3/2018 |
| WO | 2018114041 A1 | 6/2018 |
| WO | 2018140471 A1 | 8/2018 |
| WO | 2018162491 A1 | 9/2018 |
| WO | 2018170102 A1 | 9/2018 |
| WO | 2018205198 A1 | 11/2018 |
| WO | 2018213164 A1 | 11/2018 |
| WO | 2018213931 A1 | 11/2018 |
| WO | 2019028226 A1 | 2/2019 |
| WO | 2019055281 A3 | 4/2019 |

\* cited by examiner

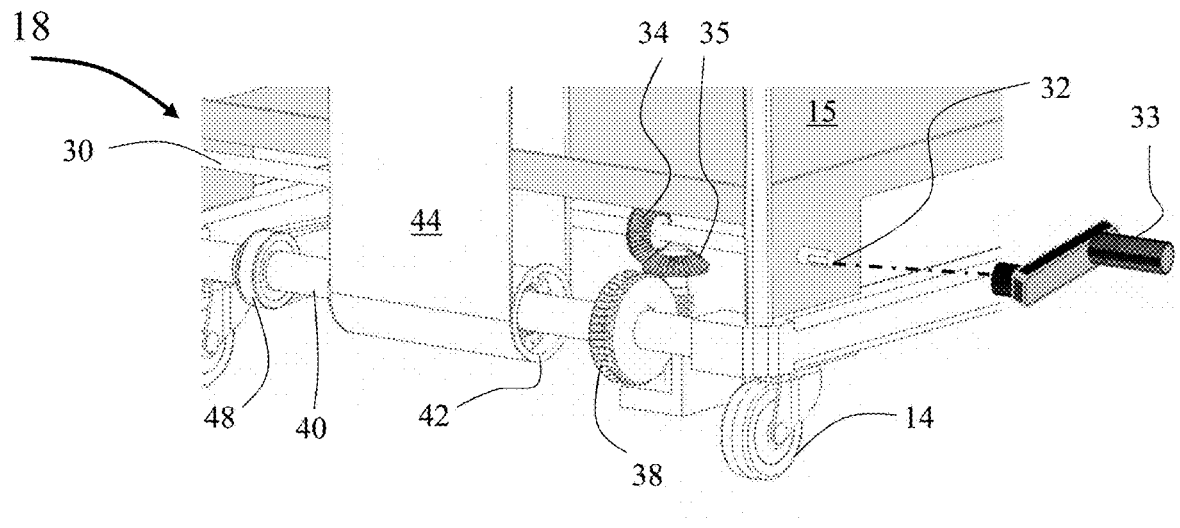
Figure 3A
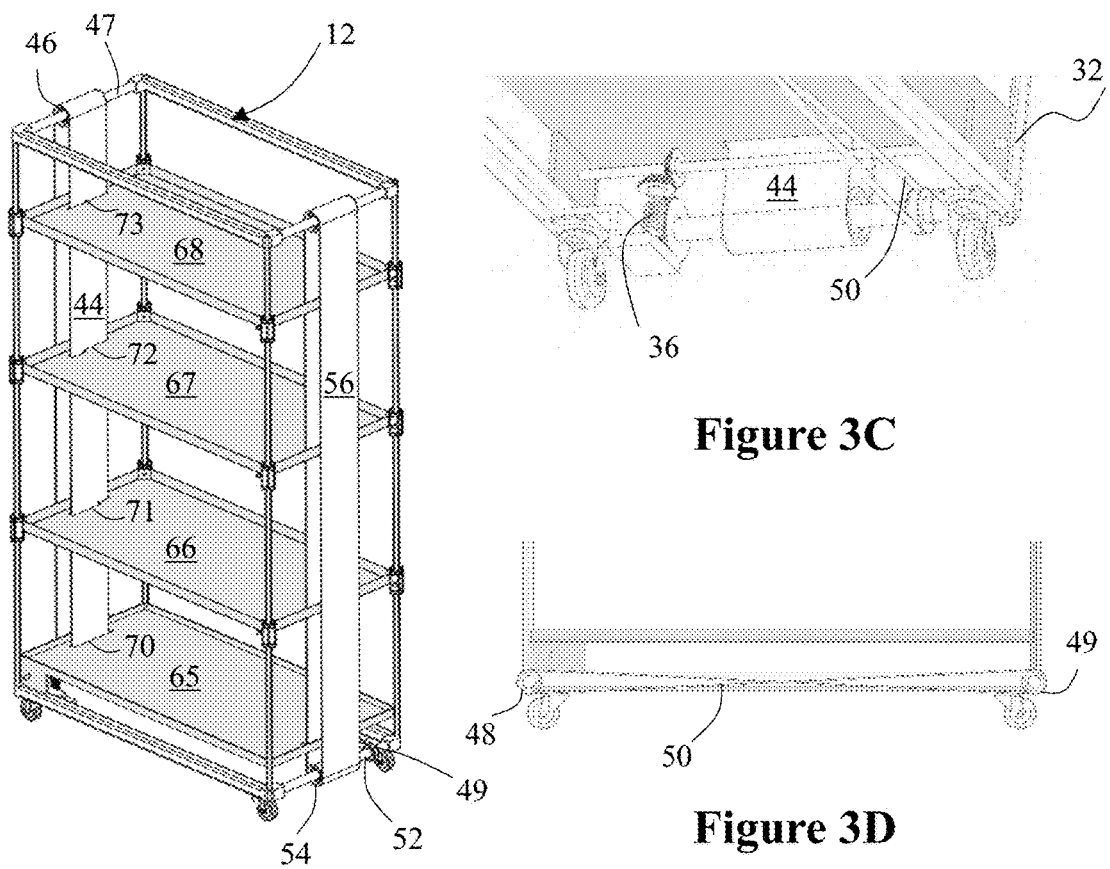
Figure 3C
Figure 3B
Figure 3D

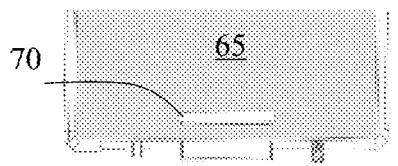
Figure 5A
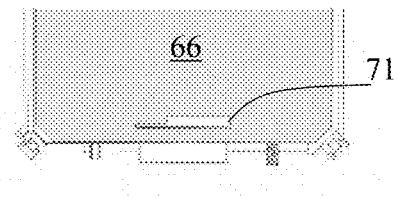
Figure 5B
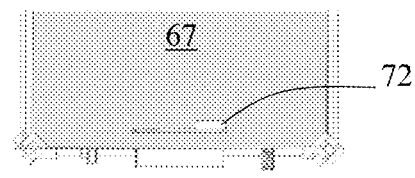
Figure 5C
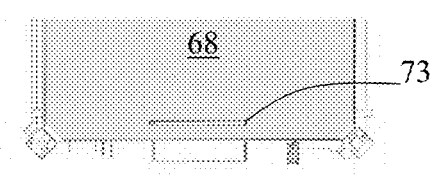
Figure 5D
FIG. 5

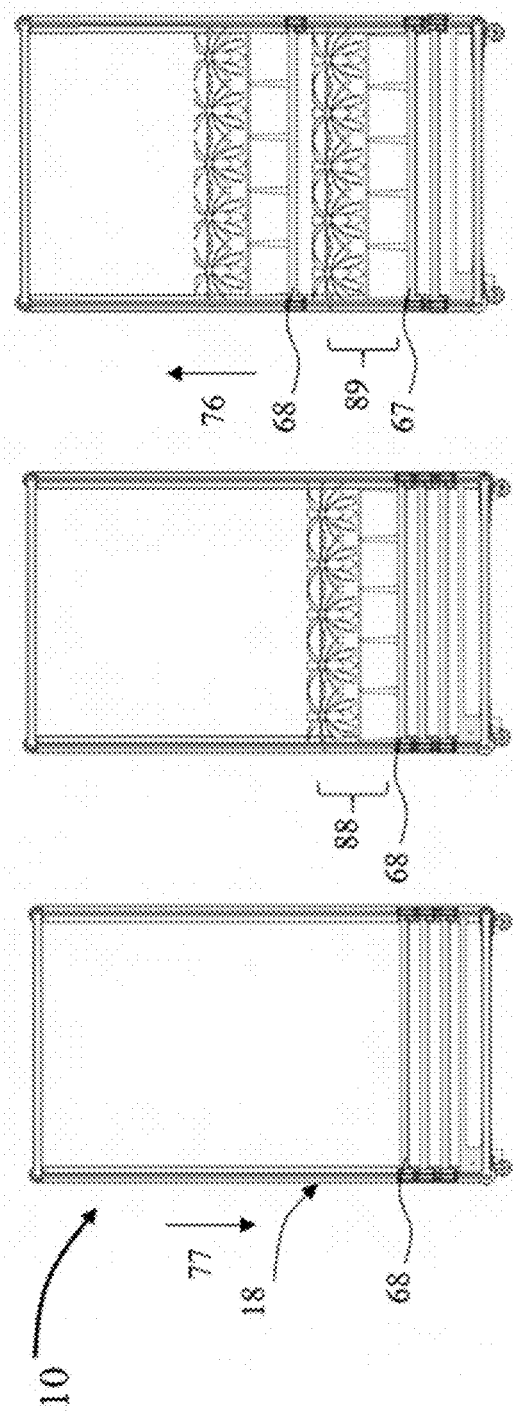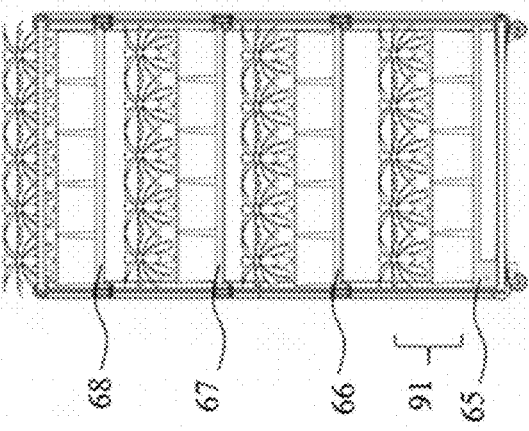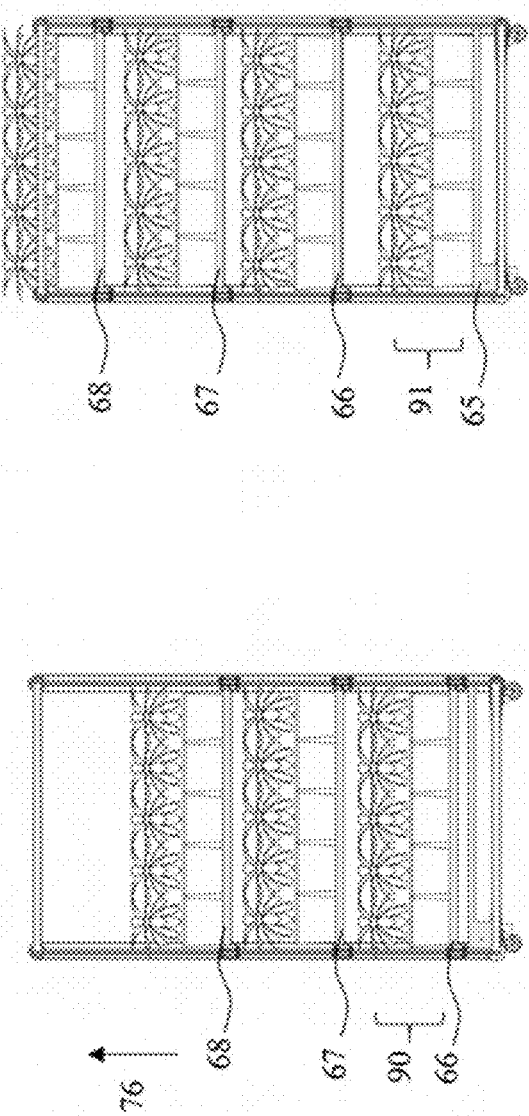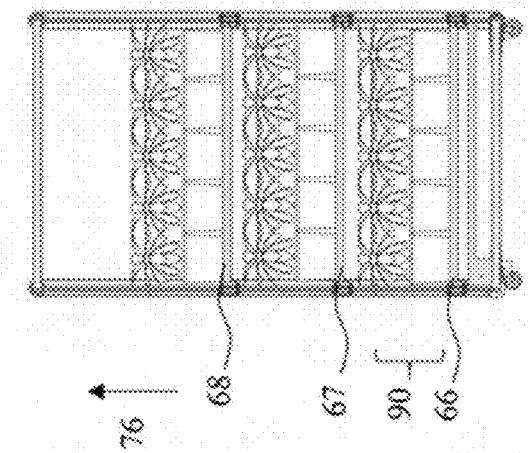

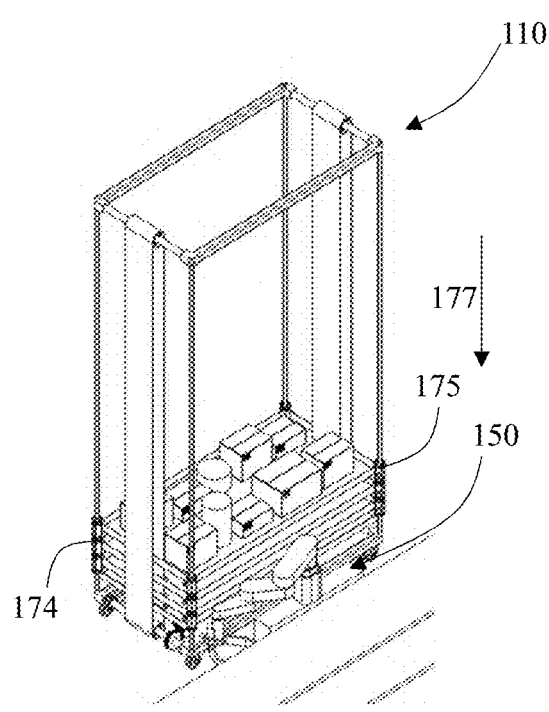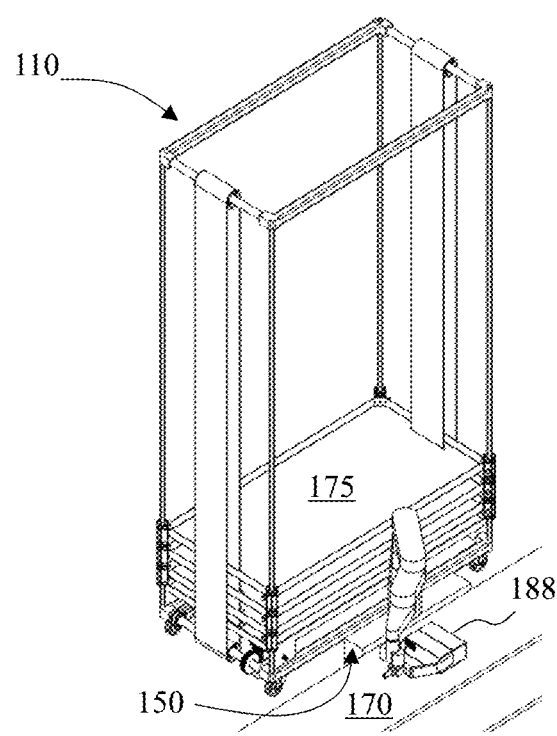
Figure 19I                    Figure 19J

230

Collection and loading of a plurality of articles with at least one identical attribute from the primary facility to a multi-shelf cart using a loader unit
231

Transporting the loaded multi-shelf cart to a destination facility
232

Unloading the articles form the multi-shelf cart to the destination facility using an unloader unit
233

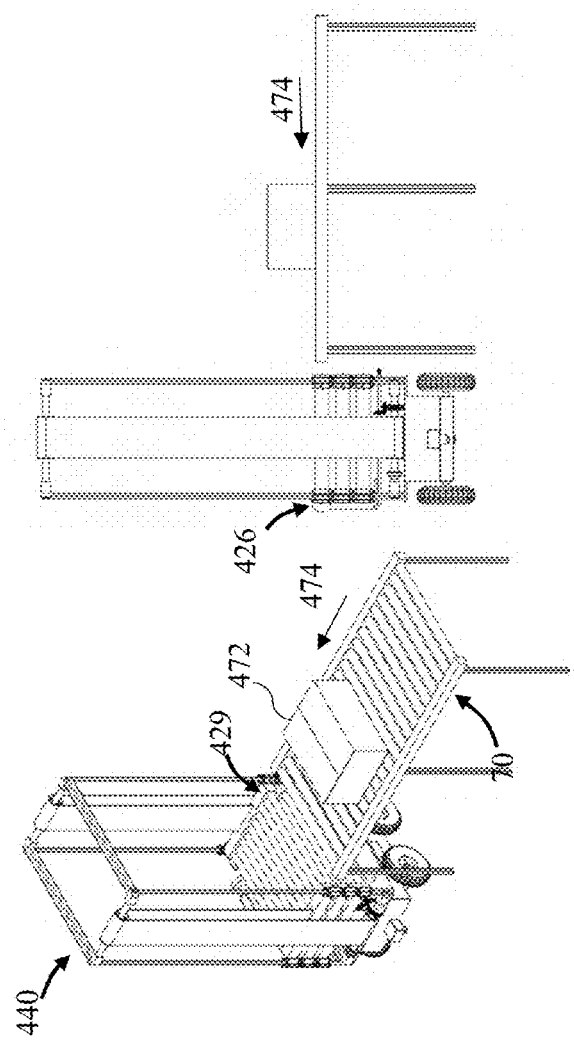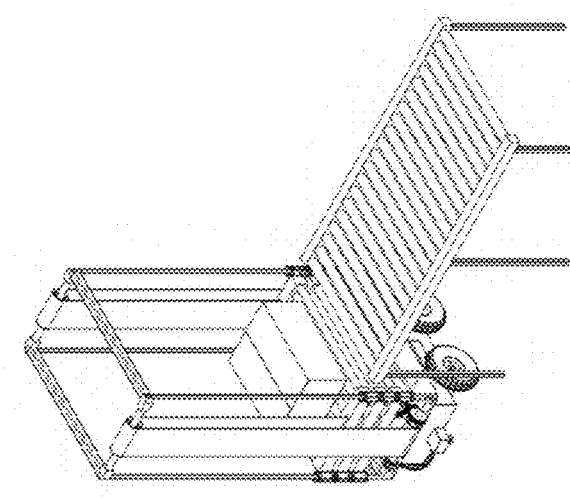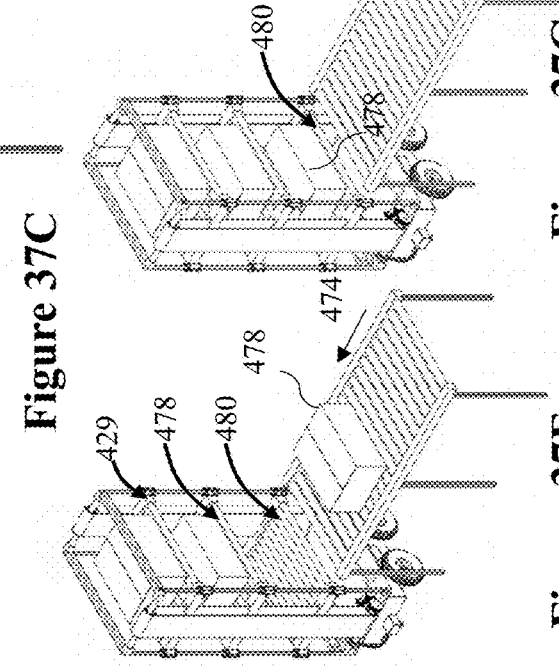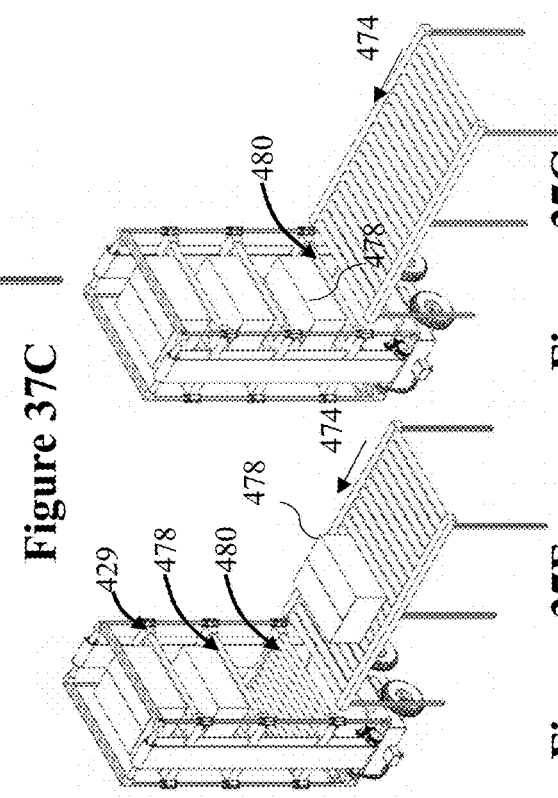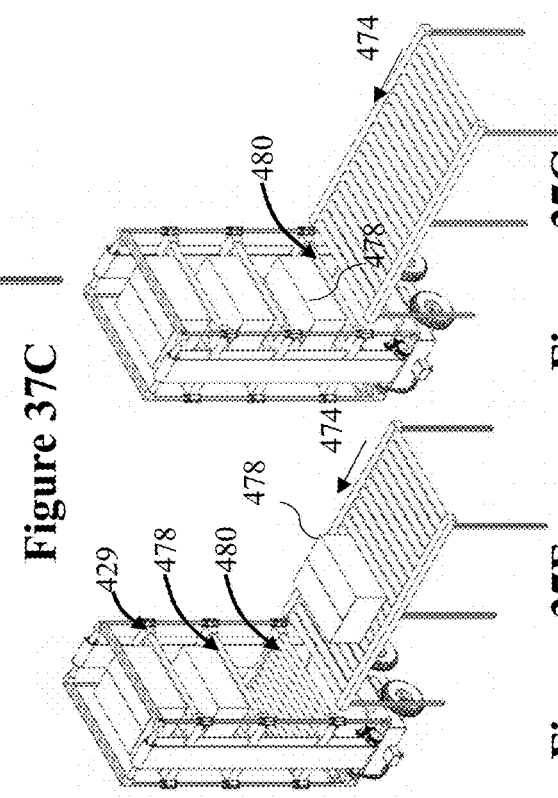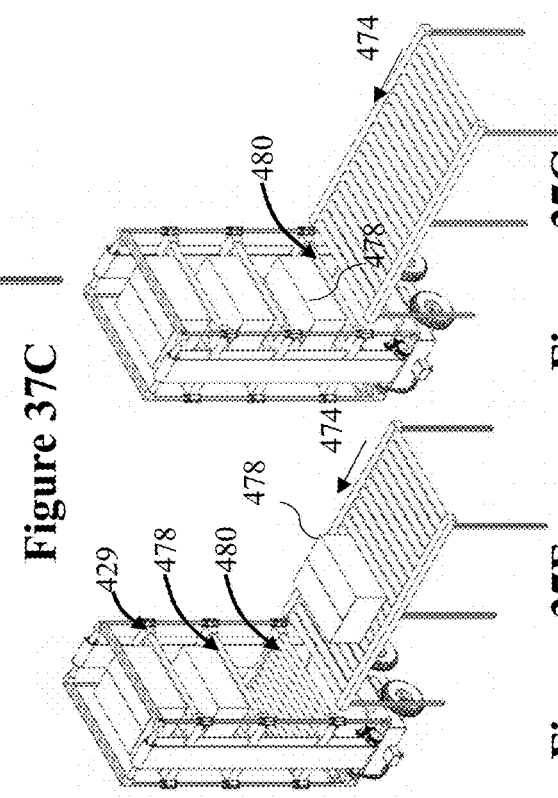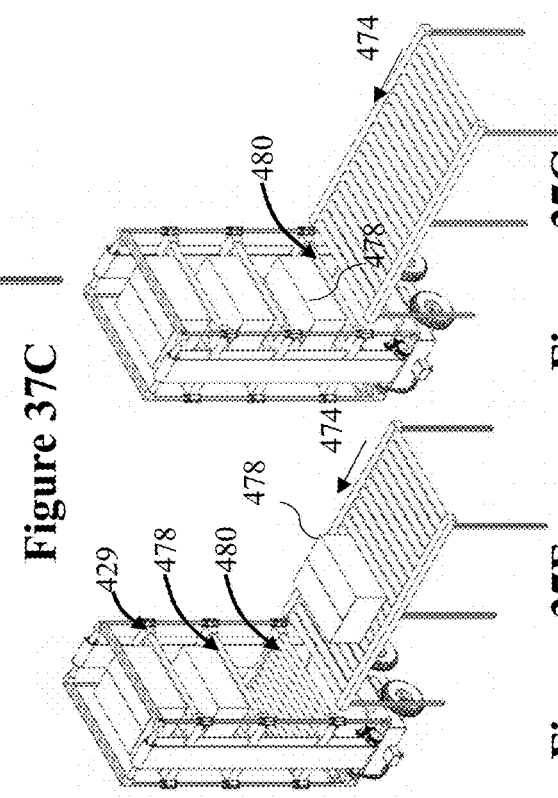

555

Receive a task of providing accessibility for an article which is in an elevated shelf of a multi-shelf storage unit
556

Navigate the mobile buffer storage unit to a spot sufficiently close to the multi-shelf unit
557

Unload at least one article from the lowest article-loaded shelf, lower the subsequent article-loaded shelf onto the emptied shelf, load the at least one unloaded article to the highest shelf of the buffer storage unit with sufficient storage space, and raise the loaded shelf to provide accessibility for the subsequent shelf of the buffer storage unit
558

Is the accessibility for the target shelf provided?
559

N ← → Y → End 560

FIG. 43A

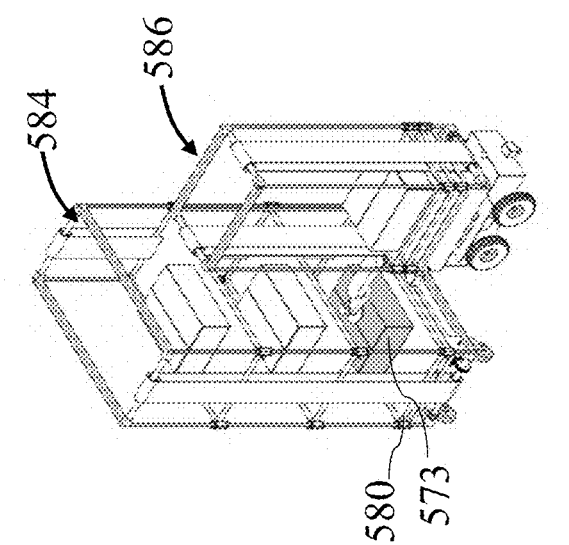
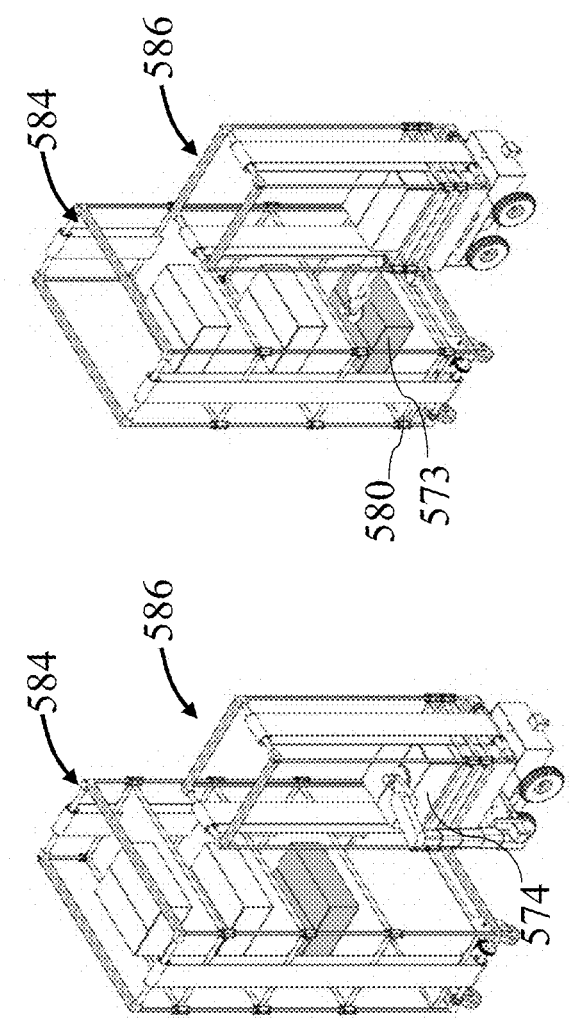
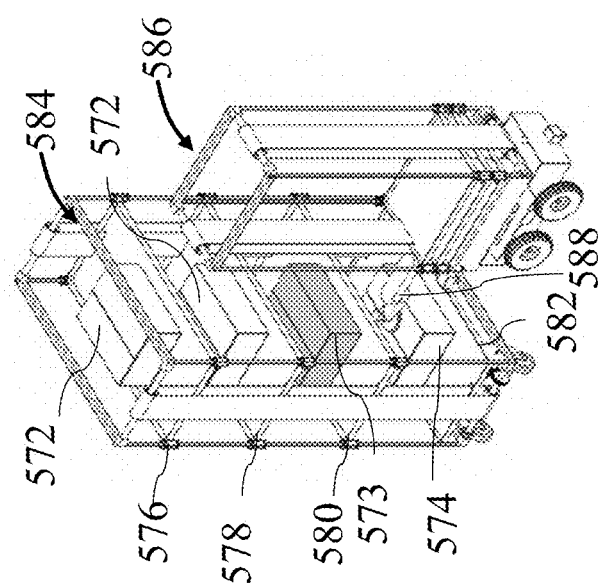
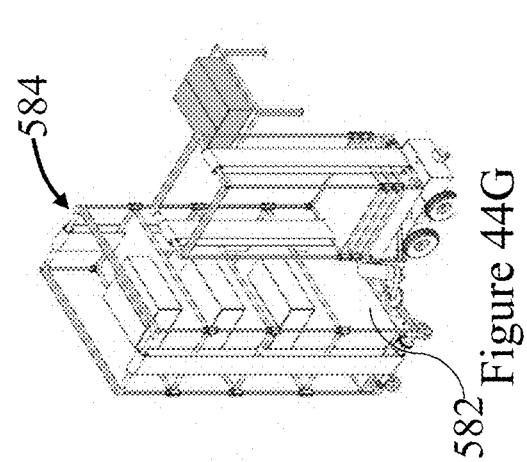
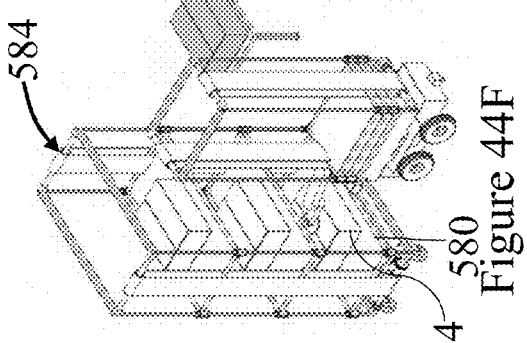
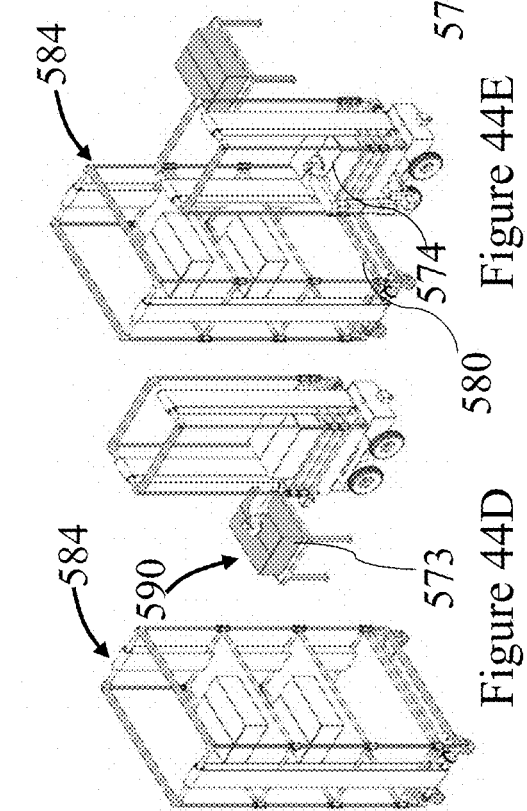

SYSTEMS, METHODS, AND STORAGE UNITS FOR ARTICLE TRANSPORT AND STORAGE

TECHNICAL FIELD

The following relates generally to article storage and transportation, and more particularly to systems and methods for storing and transporting articles via a multi-shelf storage unit or cart.

INTRODUCTION

Supply chain management systems are constantly evolving to meet the global growth of the supply chain. As a part of improving supply chain management, it is crucial to improve logistics management systems. One way to improve efficiency of logistic management systems is to provide efficient solutions for automated distribution planning (i.e. storage, transportation, and retrieval) of articles and goods.

Robotic vehicles may be configured to carry out a certain task autonomously or semi-autonomously for a variety of applications including product transportation and material handling. Autonomous mobile robotic vehicles can typically navigate and detect objects automatically and may be used alongside human workers, thereby potentially reducing the cost and time required to complete otherwise inefficient operations such as basic labor, transportation, and maintenance.

Mobile robots with a conveying top have been proposed to increase the autonomy and efficiency of material handling in inventory systems such as manufacturing facilities, supply chain warehouses, and airport luggage systems. By way of example, U.S. Pat. No. 5,202,832A presents a material handling automated guided vehicle (AGV) configured to include a powered conveyor top to facilitate loading and unloading articles to and from the vehicle. The AGV transports loaded articles from one location to another within a facility. U.S. Pat. No. 5,664,929A also provides a similar vehicle which further includes a power supplying system between the AGV and a conveyor station.

U.S. Pat. No. 9,637,318B2 presents a mobile robotic device with a conveyor top which is configured to link with other conveyor lines or another similar mobile robotic device to further develop a flexible and configurable conveyor line.

U.S. Pat. No. 10,048,697B1 presents a methodology of autonomous article transportation from one location to another using an autonomous mobile robot that has a conveyor top.

Accordingly, there is a need for improved systems, methods, and devices for article transport and storage that overcome at least some of the disadvantages of existing systems, methods, and devices.

SUMMARY

A system for automatic handling of articles is provided. The system includes a multi-shelf storage unit and a robotic unit configured to automatically load or unload an article to or from the multi-shelf storage unit. The multi-shelf storage unit includes a frame; a plurality of shelves disposed on the frame, the plurality of shelves including at least one vertically moveable shelf configured to move in first and second vertical directions relative to the frame, wherein the first vertical direction corresponds to an increase in height of the at least one vertically moveable shelf, and wherein the second vertical direction corresponds to a decrease in height of the at least one vertically moveable shelf; and a lift mechanism coupled to the at least one vertically moveable shelf, the lift mechanism configured to automatically drive, in response to receiving a drive input, the at least one vertically moveable shelf in the first or second vertical direction. The robotic unit includes a base; a robotic manipulator disposed on the base; an end effector operably disposed on the robotic manipulator, the end effector configured to engage an article and transport the engaged article to or from the at least one vertically moveable shelf of the multi-shelf storage unit; and a lift mechanism actuator disposed on the base. The lift mechanism actuator is connectable to the lift mechanism and configured to provide the drive input to actuate the lift mechanism. Actuation of the lift mechanism causes a change in height of the at least one vertically moveable shelf by moving the at least one vertically moveable shelf in the first or second vertical direction.

A multi-shelf storage unit for storing articles is also provided. The multi-shelf storage unit includes a frame; a plurality of shelves disposed on the frame, the plurality of shelves including at least one vertically moveable shelf configured to move in first and second vertical directions relative to the frame, wherein the first vertical direction corresponds to an increase in height of the at least one vertically moveable shelf, and wherein the second vertical direction corresponds to a decrease in height of the at least one vertically moveable shelf; and a lift mechanism disposed on the frame and coupled to the at least one vertically moveable shelf, the lift mechanism configured to automatically, in response to receiving a drive input, drive the at least one vertically moveable shelf in the first or second vertical direction. The lift mechanism is connectable to a lift mechanism actuator disposed on an external robotic unit. The external robotic unit is configured to automatically load or unload an article to or from the multi-shelf storage unit. The lift mechanism actuator is configured to provide the drive input to actuate the lift mechanism. Upon receiving the drive input, the lift mechanism is actuated, causing a change in height of the at least one vertically moveable shelf by moving the at least one vertically moveable shelf in the first or second vertical direction.

A method of article handling is also provided. The method includes providing a multi-shelf storage unit comprising a plurality of shelves for storing articles and a robotic unit for automatically transporting articles to and from the multi-shelf storage unit, the robotic unit comprising a robotic manipulator. The method further includes automatically driving a lift mechanism of the multi-shelf storage unit via a lift mechanism actuator disposed on the robotic unit to vertically collapse the plurality of shelves so that a first shelf, which is the highest shelf having an available storage area, is at a loading height, wherein the loading height is accessible to the robotic manipulator of the robotic unit. The method further includes driving the robotic manipulator and a loading end effector of the robotic manipulator to engage with a first article and transport the first article to the first shelf. The method further includes determining, automatically, whether the first shelf has adequate storage area for a second article. The method further includes, if the first shelf has adequate storage area, driving the robotic manipulator and the loading end effector to engage with a second article and transporting the second article to the first shelf. The method further includes, if the first shelf does not have adequate storage area, automatically driving the lift mechanism via the lift mechanism actuator to vertically raise the first shelf and provide access to a second shelf, wherein the second shelf has an available storage area for the second article.

A method of article handling comprising is also provided. The method includes providing a multi-shelf storage unit for storing articles and a robotic unit for automatically transporting articles to and from the multi-shelf storage unit, the robotic unit comprising a robotic manipulator. The method further includes driving the robotic manipulator and an unloading end effector of the robotic manipulator to engage with a first article on a first shelf of the multi-shelf storage unit, the first shelf being the lowest article-occupying shelf of the multi-shelf storage unit, and transport the first article off the first shelf. The method further includes determining, automatically, whether the first shelf is storing a second article. The method further includes, if the first shelf is storing a second article, driving the robotic manipulator and the unloading end effector to engage with the second article on the first shelf and transport the second article off the first shelf. The method further includes if the first shelf is not storing a second article, automatically driving the lift mechanism via a lift mechanism actuator disposed on the robotic unit to vertically lower a second shelf of the multi-shelf storage unit, the second shelf having at least one article stored thereon, to provide access to the second shelf.

A method of autonomously loading a plurality of articles onto a mobile storage unit is also provided. The method includes detecting, via at least one sensor on the mobile storage unit, a plurality of articles at a pick-up location; sending a signal from the at least one sensor to a processing unit on the mobile storage unit; navigating, via the processing unit, the mobile storage unit to a loading location; sending a drive signal from the processing unit to a lift mechanism actuator of the mobile storage unit; in response to receiving the drive signal, causing a lift mechanism of the mobile storage unit to vertically collapse shelves on the mobile storage unit so that a first shelf is accessible for article loading; and loading, by a robotic arm of the mobile storage unit, a first article from the plurality of articles onto the first shelf.

The present disclosure provides an apparatus for managing article transportation and storage including a multi-shelf cart that has height adjustable shelves to facilitate article loading and unloading to and from the cart. The multi-shelf cart may have application in various fields such as warehousing, transportation of medical items, and transportation of potted plant in plant nurseries.

In an aspect, the present disclosure provides a multi-shelf storage unit for storing a plurality of articles. The storage unit includes a frame and a plurality of spaced apart shelves disposed on the wheeled structure. The shelves provide a storage area for the articles. Each shelf may be configured to move in a vertical direction relative to the wheeled structure. The storage unit also includes a lift mechanism disposed on the wheeled structure and coupled to the shelves. The lift mechanism is configured to cause collapse and extension of the shelves in a vertical direction.

The maximum space between two adjacent shelves of the storage unit may be variable or fixed.

The maximum space between two adjacent shelves of the storage unit may be determined based on the height of the tallest article that is being stored on the lower shelf.

The lift mechanism may utilize at least one actuator to drive the vertical movement of the shelves.

Examples of the actuator may include a hand operated crank and a reversible electrical motor.

The actuator may be disposed on the wheeled structure. The actuator and subsequently the lift mechanism may be controllable via a user interface disposed on the wheeled structure or via a remote controller.

In an embodiment, the actuator is not disposed on the cart and is supplied from an external source such as a human hand, a robotic hand, or a hydraulic system.

Actuation of the actuator may drive the lift mechanism according to the following procedure:
  actuation in one direction causes the collapse of the plurality of the shelves one by one and sequentially from the lowest shelf to the highest shelf; and
  actuation in the opposite direction causes expansion of the plurality of the shelves one by one and sequentially from the highest shelf to the lowest shelf.

In an embodiment, during actuation of the lift mechanism the distance between the adjacent shelves is not changed until one of the adjacent shelves reach the collapse or expanded height.

In an embodiment, a tray may be slidably coupled to each shelf, the tray configured to provide storage area at each shelf and configured to slide in a lateral direction to improve the accessibility of the storage area.

In an embodiment, the cart may further include at least one sensor disposed on the wheeled structure. The sensor is configured to identify the location of the multi-shelf cart. Examples of the at least one sensor include an ultra-wideband sensor and a GPS (e.g. for outdoor uses).

The cart may include a Wi-Fi module disposed on the wheeled structure to communicate data with a network. The communicated data may include information such as a cart location and article data. Article data may include any one or more of an article type, an article quality, and an article quantity (stored on the cart).

In an embodiment, at least one rechargeable power bank is disposed on the wheeled structure. The power bank supplies electricity to any one or more of the functional sensors or actuators that are operably attached to the cart (e.g. the WIFI-fi module), the articles that are stored on the plurality of shelves, or an external device such as a robotic apparatus or an electric power tool.

In an aspect, the present disclosure provides a method for operating the multi-shelf storage unit described above. The method includes a loading process and an unloading process. The loading process includes loading a plurality of articles onto the multi-shelf storage unit by sequentially filling the shelves from the highest shelf to the lowest shelf. The unloading process includes unloading a plurality of articles form the multi-shelf storage unit by sequentially emptying the shelves of articles from the lowest shelf to the highest shelf.

The loading process may include: driving the lift mechanism to vertically collapse the shelves so that the highest empty shelf is sufficiently accessible for article loading; loading articles to the highest empty shelf; driving the lift mechanism to vertically raise the loaded shelf and provide access to the subsequent shelf; and repeating the loading and raising steps until all of the shelves are loaded with articles (e.g. the maximum capacity of the cart is reached), or all of the articles to be loaded are loaded onto the cart.

The unloading process may include: unloading articles from the lowest article-occupied shelf until the shelf is emptying of articles; driving the lift mechanism to vertically lower the subsequent shelf to provide sufficient accessibility for unloading articles from the subsequent shelf; and repeating the unloading and driving steps until all of the articles are unloaded from the cart.

The present disclosure provides a system for managing article transportation and storage. The system includes a multi-shelf storage unit that has height adjustable trays to facilitate article loading and unloading to and from the trays. The multi-shelf storage unit may facilitate automatic loading and unloading of articles to and from the storage unit by bringing elevated shelves to an accessible region of a loader/unloader unit rather than increasing the accessibility region of the loader/unloader unit to cover elevated shelves. In other words, using the present system, the automatic loader/unloader unit, such as a robot or robotic lift truck, do not need to be tall or elevated. Instead, the elevated shelves of the storage unit can be lowered to reach the accessibility region of a shorter loader/unloader unit (which shorter height may be more typical). Moreover, loading/unloading to and from higher shelves and working in higher elevations can present a safety concern. Hence, the present system may reduce the complexity of loading/unloading robotic systems and increase the safety of material handling.

The article transport and storage management system may have application in various fields such as inventory management, warehousing, transportation of medical items, and transportation of potted plants in plant nurseries. In a warehouse, the proposed system may provide an alternative solution to cartesian, aisle, and shuttle robotic systems for which large and expensive infrastructures are required.

In another aspect, the present disclosure provides a multi-shelf storage unit for storing of a plurality of articles. The multi-shelf storage unit includes a frame and a plurality of spaced apart shelves disposed on the frame. The shelves provide a storage area for the articles. Each shelf may be configured to move in a vertical direction relative to the frame. The multi-shelf storage unit also includes a lift mechanism disposed on the frame and coupled to the plurality of the shelves. The lift mechanism is configured to cause collapse and extension of the shelves in a vertical direction.

In an embodiment, the storage unit is stationary and fixed to the ground.

In an embodiment, the frame is coupled to a wheeled structure and the storage unit is a mobile unit.

The maximum space between two adjacent shelves of the multi-shelf storage unit may be variable or fixed.

In an embodiment, the maximum space between the two adjacent shelves is determined based on the height of the tallest article that is being stored on the lower shelf.

In an embodiment, the lift mechanism utilizes at least one actuator to drive the vertical movement of the plurality of the shelves.

Examples of the actuator may include a hand operated crank and a reversible electrical motor.

In an embodiment, the actuator is disposed on the frame and the actuator and subsequently, the lift mechanism, is controllable via a user interface disposed on the frame or via a remote controller.

In an embodiment, the actuator is not disposed on the storage unit and is supplied from an external source such as a human hand, a robotic arm, or a hydraulic system.

In an embodiment, actuation of the actuator drives the lift mechanism according to the following procedure:
actuation in a first direction causes the collapse of the plurality of the shelves one by one and sequentially from the lowest shelf to the highest shelf; and
actuation in the opposite direction causes expansion of the plurality of the shelves one by one and sequentially from the highest shelf to the lowest shelf.

In an embodiment, during actuation of the lift mechanism in the first direction the distance between the adjacent shelves is not changed until one of the adjacent shelves reach the collapsed height.

In an embodiment, during actuation of the lift mechanism in the opposite direction the distance between the adjacent shelves changes until one of the adjacent shelves reaches a maximum distance between the adjacent shelves.

In an embodiment, a tray may be slidably coupled to each shelf. The tray provides storage area at each shelf. The tray is configured to slide in a lateral direction. The operation of the tray in this manner may improve the accessibility of the storage area.

In an embodiment, multi-shelf storage unit may include at least one sensor disposed on the frame. The sensor is configured to identify the location of the storage unit. Examples of the sensor may include an ultra-wideband sensor and a GPS (e.g. for outdoor uses).

In an embodiment, the storage unit may include an identifier tag. The identifier tag may be a barcode, QR code, radio frequency identifier, or the like. The identifier tag may be disposed on each shelf and is configured to identify each shelf of the storage unit and the articles disposed on each shelf.

In an embodiment, the storage unit may include a Wi-Fi module. The Wi-Fi module may be disposed on the frame. The Wi-Fi module is configured to communicate data with a network. The communicated data may include information such as a storage unit location and article data. Article data may include any one or more of an article type, an article quality, and an article quantity.

In order to further reduce the overhead and operations cost, the present disclosure provides a shelf management system that manages and simplifies the computing by using a cloud-based server or external network in communication with the system or the system network, including, but not limited to, communication with a warehouse management system (WMS), a robotic loader/unloader unit, and/or the multi-shelf storage unit. Using a networked or cloud system, the site operator or warehouse management company does not need to purchase the robots but instead can "recruit" the robotic devices and machines or storage unit shelving and pay only for the tasks that the robotic devices and machines perform or for the shelving space used. Such a system may allow the user to forgo expensive capital expenditures and the like associated with purchasing or otherwise accessing robotic or shelving devices, while still being able to access and use more modern technology options and not having to continue with less efficient operations. The cloud server aggregates data, such as the number of transported articles, and the transported distance, location, or other information related to the tracking and location of such articles located on the storage units. This may include data related to the robotic movement, such as LiDAR sensor data or vision cameras, which may aid in robot route planning or other operational control of the system in the warehouse, as well as shelving unit storage capacity which may aid in operational or storage capacity efficiencies.

The cloud server additionally may be configured to aggregate data related to the environment of the multi-shelf system (such as storage unit location data and article data, as well as paths moved by the robotics). This data may be analyzed, for example using machine learning algorithms, to determine warehouse efficiencies or system implementation costs, and in some cases, to determine whether the condition deviates from an accepted standard. Analysis of article data, robotic movement data, or shelf storage data by a device management server in the cloud may provide valuable information and insights regarding operation of the site (e.g. warehouse management efficiencies).

The cloud server may also be configured to aggregate data related to the articles, such as article type, quality, or quantity. This may also aid or control efficient inventory management of the warehouse or articles. Transported article data or article data itself may be used to determine warehouse management statistics or other relevant data required for management of the warehouse or production facility. This article data may be transmitted from the robotic device to the device management server, or directly from the multi-shelf storage unit to the network or server itself. In some cases, the device management server may analyze transported article data using a machine learning algorithm to determine the article condition or quality (such as using an article date or other data related to the article) and then analyze them in small and big scales (big data), for example using machine learning algorithms, to derive valuable information and insights regarding the operation of the warehouse or handling of the articles.

In an embodiment, the storage unit includes at least one rechargeable power bank. The power bank may be disposed on the frame. The power bank supplies electricity to any one or more of functional sensors or actuators that are operably attached to the storage unit (e.g. the WIFI-fi module), the articles that are stored on the shelves, or an external device such as a robotic apparatus or an electric power tool.

In another aspect, the present disclosure provides a system for automatically loading or unloading a plurality of articles to or from a storage area. The system includes a multi-shelf storage unit and a robotic unit. The multi-shelf storage unit has a plurality of vertically movable shelves which provide a storage area. The robotic unit is configured to automatically load or unload the articles to or from the multi-shelf storage unit. The robotic unit includes a base, at least one robotic manipulator disposed on the base, and a loading or unloading end effector operably disposed on the at least one robotic manipulator and configured to engage with an article to load or unload the article to or from the multi-shelf storage unit.

In an embodiment, the unit may further include a second end effector disposed on the at least one robotic manipulator and configured to engage with the lift mechanism of the multi-shelf storage unit and cause collapse or extension of the shelves of the storage unit.

In an embodiment, the examples of the end effector include forklift, mechanical gripper, vacuum cup, and pneumatic grippers.

In an embodiment, the end effector may be further configured to be able to engage with the trays of the multi-shelf storage unit and cause the lateral movement of a tray at each shelf.

In another aspect, the present disclosure provides a general method for automatic handling of a plurality of articles using the said system, the method comprising driving the robotic manipulator of the robotic unit to perform a: loading procedure configured to load a plurality of articles to the storage unit by sequentially filling the shelves from the highest shelf to the lowest shelf and where required actuate the lift mechanism of the storage unit to move the shelves in generally an upward motion; and unloading procedure configured to unload a plurality of articles from the storage unit by removing articles from the plurality of the shelves sequentially from the lowest shelf to the highest shelf and where required actuate the lift mechanism of the storage unit to move the shelves in generally a downward motion.

In an embodiment, actuation of the lift mechanism is done automatically and may be performed by the second actuator of the robotic unit or by a sending a command to the actuator which is disposed on the frame of the storage unit.

In an embodiment, loading a plurality of articles from a loading zone to the storage unit comprises the following steps: automatically driving the lift mechanism of the multi-shelf storage unit to vertically collapse the shelves so that the loading shelf, which is the highest shelf with empty storage area, is sufficiently accessible for the robotic manipulator of the robotic unit; driving the robotic manipulator and the loading end effector of the robotic manipulator to engage with the first article from a plurality of articles in the loading zone and transport the article to the loading shelf; if the loading shelf has adequate storage area, driving the robotic manipulator and the loading end effector to engage with the subsequent article from the plurality of articles in the loading zone and transporting the article to the loading shelf; if the loading shelf is filled with articles, automatically driving the lift mechanism to vertically raise the loaded shelf and provide access to the subsequent shelf with an empty storage area; and repeating steps c and d until either all of the shelves are loaded with articles (the maximum capacity of the storage unit is reached), or all of the plurality of the articles from the loading zone is loaded to the storage unit.

In an embodiment, unloading a plurality of articles from the multi-shelf storage unit to an unloading zone comprises the following steps: driving the robotic manipulator and the unloading end effector of the robotic manipulator to engage with the first article from possibly a plurality of articles in the unloading shelf, which is the lowest article-occupying shelf in the storage unit, and the article to the unloading zone; if the unloading shelf is storing an article, driving the robotic manipulator and the loading end effector to engage with the subsequent article from the unloading shelf and transporting the article to the unloading zone; if the unloading shelf is emptied from articles, automatically driving the lift mechanism to vertically lower the subsequent article-occupying shelf to provide sufficient access to the subsequent shelf; and repeating steps a to c until all of the articles are unloaded from the multi-shelf storage unit to the unloading zone.

The present disclosure provides a system and method for distribution planning of articles and goods that have at least one identical logistic attribute using a multi-shelf cart and a special procedure to load and unload articles to and from the articles. A logistic attribute is a label associated with a group of articles that justifies group handling of the articles or justifies handling each article from the plurality of the articles independent of the storage order. Examples of a logistic attribute include geometrical characteristics, grade, date of shipment, and recipient of articles.

The multi-shelf cart of the proposed system is configured to have height adjustable shelves to facilitate article loading and unloading to and from the cart's shelves. Using such a cart could facilitate automatic loading and unloading of articles to and from the storage unit by bringing elevated shelves to the accessible region of a loader/unloader unit rather than increasing the accessibility region of the loader/unloader unit to cover elevated shelves. In other words, the automatic loader/unloader unit such as robots or robotic lift trucks are not required to be tall or elevated, instead, the elevated shelves could be lowered to reach the accessibility region of a typical, short loader/unloader unit. Moreover, loading/unloading to and from higher shelves and working in higher elevations is always a safety concern. Hence, the proposed system could be used to reduce the complexity of the loading/unloading robotic systems and increase the safety of material handling as well.

Also, since the cart requires sequential loading or unloading from successive shelves (i.e. for loading, first the higher empty shelves should be loaded and then the lower shelves; for unloading, first the lower shelves should be unloaded and then the higher shelves), the storage and retrieval part of the disclosed system could be automated particularly for articles with at least one identical logistic attribute since, for example, for retrieval of a particular stored article from a cart, there is no difference between retrieving the article in the lowest shelf or the article in a shelf with a higher elevation.

Another particular situation where the disclosed system and method may be applicable is when all of the articles in one storage unit should be retrieved in a specific period of time with no obligation on the order of retrieval. For example, in an inventory warehouse, the storage unit could be used for storage of articles that need to be shipped in the same date. In this case, all of the articles in the storage unit should be retrieved in the specific date, no matter what the order of the retrieval is.

Another potential advantage of the proposed system and method is that since the multi-shelf cart can be configured to be automatically actuated and its actuation may be part of the automatic loading/unloading process, the loading/unloading process can potentially be performed faster. In other words, by using the proposed system the task of loading/unloading may be divided between the loader/unloader unit and the multi-shelf storage unit rather than just being on the loader/unloader unit entirely. Thus, the performance of the material handling potentially may be increased substantially. This advantage may result in reducing operating costs by reducing the storage and retrieval time.

Aspects of the systems, methods, and devices of the present disclosure may be applied in various fields such as inventory management, warehousing, transportation of medical articles, and transportation of potted plants in plant nurseries. In a warehouse, the present disclosure may provide an alternative solution to the cartesian, aisle, and shuttle robotic systems for which large and expensive infrastructures are required.

In an aspect, there is provided a system for distribution of a plurality of articles that have at least one logistic attribute in common from a primary facility to a destination facility, the system comprising: a primary facility configured to house a plurality of articles that have a plurality of logistic attributes; a multi-shelf cart configured to temporarily store a plurality of articles with at least one identical logistic attribute and facilitate transportation of the said articles; a loader unit disposed in the primary facility and configured to load articles with at least one identical logistic attribute from a loading zone in the primary facility to the multi-shelf storage unit; a destination facility; and an unloader unit disposed in the destination facility to unload articles from the multi-shelf cart to an unloading zone in the destination facility.

In an embodiment, the system further comprising a cart-pulling unit configured to transport a cart from the primary facility to a destination facility.

In an embodiment, examples of the primary facility include a storage area such as an inventory warehouse, a production facility such as a potting center in a greenhouse nursery, and a production line within a production facility such as production line of an engine part in an engine production facility.

In an embodiment, examples of the destination facility include a shipping center, a storage area such as an indoor greenhouse bay in a greenhouse nursery, and an assembly line within a production facility such as the assembly line of an engine in an engine production facility.

In an embodiment, each logistic attribute is defined as a label associated with a plurality of articles that justifies handling (loading, transporting, and unloading): the plurality of articles in one group, or each article from the plurality of articles independent of storage order. Examples of a logistic attribute include the type, geometrical characteristics, grade of a product, shipping date, and recipient associated with a plurality of articles.

In an embodiment, the multi-shelf cart comprises: a wheeled frame; a plurality of spaced apart shelves disposed on the wheeled frame and configured to provide a storage area for a plurality of articles and generally each shelf configured to be able to move in a vertical direction relative to the wheeled frame; and a lift mechanism disposed on the wheeled frame and coupled to the plurality of the shelves, the mechanism configured to cause collapse and extension of the shelves in the vertical direction.

In an embodiment, the lift mechanism requires at least one actuator to drive the vertical movement of the plurality of the shelves.

In an embodiment, examples of the actuator includes hand operated crank and a reversible electrical motor.

In an embodiment, the actuator is disposed on the wheeled structure and the actuator and subsequently the lift mechanism are controllable either using a user interface disposed on the wheeled structure or a remote controller.

In an embodiment, the actuator is not disposed on the cart and is supplied from an external source such as a human hand, a robotic hand, or a hydraulic system.

In an embodiment, actuation of the actuator drives the lift mechanism in the following procedure: actuation in one direction causes the collapse of the plurality of the shelves one by one and sequentially from the lowest shelf to the highest shelf; and actuation in the opposite direction causes expansion of the plurality of the shelves one by one and sequentially from the highest shelf to the lowest shelf.

In an embodiment, during actuation of the lift mechanism the distance between the adjacent shelves is not changed until one of the adjacent shelves reach the collapse or expanded height.

In an embodiment, the cart further comprises drive wheels configured to provide autonomous navigation of the cart.

In an embodiment, the cart is driven by an external cart-pulling unit.

In an embodiment, a tray may be slidably coupled to each shelf, the tray configured to provide storage area at each shelf and configured to slide in a lateral direction. Such movement may improve the accessibility of the storage area.

In an embodiment, the cart may further include at least one sensor disposed on the wheeled structure configured to identify the location of the cart. Examples of the sensor include ultra-wideband sensor and GPS (e.g. for outdoor uses).

In an embodiment, the cart may further include a Wi-Fi module disposed on the wheeled structure to communicate data with a network where the communicated data may include information such as a cart location (location of the cart), and the logistic attributes of the articles stored thereon.

In an embodiment, at least one rechargeable power bank is disposed on the wheeled structure to supply electricity to any one or more of the functional sensors or actuators that are operably attached to the cart such as the Wi-Fi module, the articles that are stored on the plurality of shelves, and an external device such as a robotic apparatus or an electric power tool.

In an embodiment, the loader unit is configured to load articles either autonomously using a robotic agent or manually for example using a human laborer.

In an embodiment, the unloader unit is configured to unload articles either autonomously using a robotic agent or manually for example using a human labor.

In an embodiment, the loader unit or the unloader unit or both could be a robotic agent configured to autonomously load or unload a plurality of articles to and from the multi-shelf cart and the robotic agent comprising: a base; at least one robotic manipulator disposed on the base; and a loading or unloading end effector operably disposed on the at least one robotic manipulator and configured to engage with articles to load or unload articles to and from the multi-shelf storage unit.

In an embodiment, the robotic agent may further include a second end effector disposed on the at least one robotic manipulator and configured to engage with the lift mechanism of the multi-shelf cart and cause collapse or extension of the shelves of the cart.

Examples of the end effector may include a forklift, a mechanical gripper, a vacuum cup, and a pneumatic gripper or grippers.

In an embodiment, the end effector may be further configured to engage with the trays of the multi-shelf storage unit and cause the lateral movement of a tray at each shelf.

In another aspect, a logistics method for distribution of articles that have at least one identical logistic attribute is provided. The method includes, at a primary facility, loading a plurality of articles that have at least one identical logistic attribute from a loading zone to a multi-shelf cart using at least one loader unit; driving the multi-shelf cart to a destination facility through a navigation route; and unloading the plurality of articles with the at least one identical logistic attribute from the multi-shelf cart to an unloading zone in the destination facility using at least one unloader unit.

In an embodiment, the method further includes driving the unloaded carts from the destination facility back to the primary facility through a navigation route.

In order to improve the productivity of the current solutions and further increase the efficiency of material handling within a facility, the present disclosure provides a mobile unit with multiple height adjustable conveyor shelves. The mobile unit can facilitate loading a plurality of articles onto conveyor shelves of the mobile unit at a loading station, transporting the articles to a destination location, and unloading the articles at the destination location. By transporting multiple shelves of articles, the systems described herein may improve the productivity and efficiency of material handling.

In another aspect, an apparatus to receive, store, transport, and deliver a plurality of articles is provided. The apparatus includes a wheeled base; a frame disposed on the wheeled base; a plurality of generally vertically spaced shelves disposed on the frame, wherein each shelf comprises a conveyor line to facilitate storage and transport for at least an article on the shelf, and generally each shelf is configured to move in generally a vertical direction relative to the frame; a lift mechanism disposed on the frame and coupled to the plurality of the shelves, the lift mechanism configured to cause collapse and extension of the shelves in generally a vertical direction; and at least one conveyor drive mechanism disposed on the frame and configured to engage with and drive the conveyor line of a shelf to cause the surface of the shelf to move in generally a horizontal direction.

In an embodiment, the maximum space between two adjacent shelves from the plurality of the spaced apart shelves may be variable or fixed.

In an embodiment, the maximum space between two subsequent shelves from the plurality of the spaced apart shelves is determined based on the height of the tallest article that is being received on the lower shelf.

In an embodiment, the frame may be movably attached to the wheeled base, the attachment configured to provide multiple degrees of freedom for the frame with respect to the wheeled base.

In an embodiment, the apparatus may further comprise at least one frame actuator coupled to the frame to cause 3-dimensional displacement and orientation adjustment of the frame with respect to the wheeled base.

In an embodiment, a conveyor drive mechanism is fixedly disposed at an operating height on the frame and the conveyor drive mechanism is configured to engage with the conveyor line of each shelf once each shelf is moved to the operating height using the lift mechanism.

In an embodiment, the lift mechanism engages with an actuator to drive the generally vertical movement of the shelves.

In an embodiment, examples of the actuator may include a hand operated crank and a reversible electrical motor.

In an embodiment, the actuator is disposed on the wheeled structure and the actuator and the lift mechanism are controllable using a user interface disposed on the wheeled structure or a remote controller.

In an embodiment, the actuator is not disposed on the frame and is supplied from an external source such as a human hand, a robotic hand, or a hydraulic system.

In an embodiment, actuation of the actuator drives the lift mechanism in the following manner: actuation in one direction causes the collapse of the plurality of the shelves one by one and sequentially from the lowest shelf to the highest shelf; and actuation in the opposite direction causes expansion of the plurality of the shelves one by one and sequentially from the highest shelf to the lowest shelf.

In an embodiment, during actuation of the lift mechanism, the distance between the subsequent shelves is not changed until one of the adjacent shelves reach the collapse or expanded height.

The multi-shelf apparatus may include a processing unit comprising a processor and a memory, the processor configured to autonomously execute instructions stored on the memory.

The apparatus may include at least one sensor disposed on the wheeled base that is configured to send signals regarding the location of the apparatus to the processing unit. Examples of the sensor may include ultra-wideband sensor and GPS (e.g. for outdoor uses).

The apparatus may include a Wi-Fi module, which may be disposed on the wheeled base and connected to the processing unit to communicate data with a wireless network external to the apparatus. The communicated data may include information such as an apparatus location and article data. Article data may include the type, quality, and quantity of the articles on the shelves of the apparatus.

The apparatus may include at least one rechargeable power bank disposed on the wheeled base to supply electricity to any one or more of: the processing unit, functional sensors or actuators that are operably attached to the apparatus such as the Wi-fi module; the articles that are stored on the plurality of shelves; or an external device such as a robotic apparatus or an electric power tool.

The drive mechanism may be further configured to couple to a conveyor actuator such as a reversible electrical motor. The conveyor actuator may be disposed on the apparatus frame or may be disposed on an external apparatus.

The actuation of the conveyor actuator in one direction may cause the actuation of the drive mechanism in a first direction, which may subsequently cause the engaged conveyor line of a shelf to be driven in generally an inward direction with respect to the apparatus. This action may allow for the receiving of an article on the respective shelf.

The actuation of the conveyor actuator in an opposite direction may cause the actuation of the drive mechanism in a second direction which subsequently causes the engaged conveyor line of a shelf to be driven in generally an outward direction with respect to the apparatus. This may allow for delivering of an article from the respective shelf.

The conveyor line may comprise a plurality of roller conveyors.

The plurality of roller conveyors of a shelf may be coupled together such that the rotation of a first roller results in rotation of the other rollers of the shelf.

The conveyor drive mechanism of the apparatus may be configured to engage with the first roller of the plurality of rollers and cause rotation of the plurality of roller conveyors.

The wheeled base may be configured to include drive wheels to facilitate self-transportation of the apparatus.

The wheeled base may include an autonomous navigation sensory system such as LiDAR and a vision camera to facilitate autonomous navigation of the apparatus.

In an embodiment, the wheeled base includes idler wheels and the apparatus is configured to be driven by an external driving unit, such as a human operator or a robotic towing vehicle.

A method for loading and unloading articles to and from an apparatus comprising a plurality of conveyor shelves is provided. The method includes: loading articles to the apparatus by sequentially filling the shelves from the highest empty shelf to the lowest shelf; and unloading articles from the apparatus by sequentially emptying the plurality of the shelves from the lowest article-occupying shelf to the highest shelf.

The loading process may include: moving the apparatus to an article delivering facility; driving the lift mechanism to vertically collapse the shelves so that the highest empty shelf is sufficiently accessible for receiving at least one article from the delivering facility; receiving at least one article from the article delivering facility and loading it to the receiving shelf by driving the roller conveyor in generally an inward direction by engaging the conveyor drive mechanism with the roller conveyors of the receiving shelf; driving the lift mechanism to vertically raise the loaded shelf to provide sufficient accessibility for loading articles to the subsequent shelf from the delivering facility; and repeating the receiving and driving steps until all of the shelves of the apparatus are loaded with articles, or until all of the articles to be loaded from the delivering facility are loaded to the apparatus.

The unloading process may include: moving the apparatus to an article receiving facility; driving the lift mechanism to adjust the height of the shelves so that the lowest article-occupied shelf is sufficiently accessible for delivering at least one article to the article receiving facility; delivering the at least one article from the delivering shelf to the article receiving facility by running the roller conveyors in generally an outward direction by engaging the conveyor drive mechanism with the roller conveyors of the delivering shelf; driving the lift mechanism to vertically lower the subsequent article-occupied shelf to provide sufficient accessibility for unloading articles from the subsequent shelf to the receiving facility; repeating the delivering and driving steps until all of the articles are unloaded from the apparatus to the receiving facility.

A system for transportation of a plurality of articles is provided. The system includes, the system comprising: A multi-shelf apparatus described herein; at least one delivering facility configured to deliver a plurality of articles to the apparatus; and at least one receiving facility configured to receive a plurality of articles from the apparatus.

The delivering facility may include a fixed conveyor line or a mobile forklift.

The receiving facility may include a fixed conveyor line or a mobile forklift.

A method for transporting a plurality of articles is provided. The method includes: moving the apparatus sufficiently close to a delivering facility; receiving the plurality of articles from at least one delivering facility and loading the multiple conveyor shelves of the apparatus with the plurality of articles; and transporting the plurality of articles to at least one receiving facility and unloading the plurality of articles to the at least one receiving facility by unloading the multiple conveyor shelves of the apparatus.

A mobile self-propelled multi-shelf unit for transport and storage of a plurality of articles is provided. The mobile transport and storage unit includes a chassis, the chassis comprising: a plurality of motorized wheels; a processing unit; and one or more sensors configured to send signals to the processing unit; a multi-shelf unit attached to the chassis, the multi-shelf unit comprising: a frame; a plurality of spaced apart shelves disposed on the frame along an axis normal to the surface of the shelves, each shelf configured to provide a storage area for a plurality of articles and slidably adjustable along the axis; and a lift mechanism disposed on the frame and coupled to the plurality of shelves, the lift mechanism configured to slidably adjust the position of the shelves along the axis.

The multi-shelf unit may be removably attached to the chassis.

The processing unit may be configured to autonomously navigate the storage unit by actuating one or more of the motorized wheels.

The chassis may include a robotic arm, the robotic arm configured to load and unload articles from the multi-shelf unit.

The robotic arm may be configured to receive instructions from the processing unit.

The lift mechanism may be configured to receive instructions from the processing unit.

The transport and storage unit may also include an actuator for driving the lift mechanism disposed on the chassis.

The transport and storage unit may also include an actuator for driving the lift mechanism disposed on the multi-shelf unit.

Each shelf may comprise: a support surface oriented to support an underside of an article to be transported; a plurality of pins distributed over at least a portion of the support surface and movable between an extended position and a retracted position, the plurality of pins being urged into the extended position such that a lateral retaining portion of each pin protrudes above the support surface; and wherein the underside of the article, when received on the support surface, causes a first portion of the plurality of pins underlying the article to be depressed into the retracted position while a second portion of the plurality of pins remain in the extended position such that the lateral retaining portions of pins disposed adjacent to the article constrain the article to prevent movement of the article on the support surface while being transported.

An autonomous method for loading a plurality of articles onto a mobile storage unit is provided. The method includes: detecting, by one or more sensors, the plurality of articles in a pick-up location, and sending a signal to a processing unit on the mobile storage unit; causing, by the processing unit, motorized wheels on the mobile storage unit to navigate the mobile storage unit such that the unit is sufficiently close to the plurality of articles; sending one or more drive signals, from the processing unit to the drive unit, to cause the lift mechanism to vertically collapse shelves on the mobile storage unit so that the loading shelf is accessible for article loading; loading, by a robotic arm of the mobile storage unit, at least one article on the loading shelf; checking, with the one or more sensors, if there is at least one more article to load; if there is an additional article, checking, with the one or more sensors, if there is available space on the current shelf; if there is no available space, checking if there is another empty shelf; and if there is an empty shelf, driving, by the processor, the lift mechanism to raise the loaded shelf to provide access to the subsequent loading shelf.

A method for using the mobile storage unit described herein as a buffer storage for a second multi-shelf storage unit is provided. The method includes receiving, by the processing unit on the mobile storage unit, a task of providing accessibility for an article which is in an elevated shelf of the separate multi-shelf unit comprising a plurality of shelves; causing, by the processing unit, the motorized wheels on the mobile storage unit to navigate the mobile storage unit such that the unit is sufficiently close to the separate multi-shelf unit; unloading at least one article from a lowest article-loaded shelf of the multi-shelf unit until the shelf is empty; loading the at least one article onto a highest shelf of the mobile storage unit with sufficient space; lowering a subsequent shelf of the multi-shelf unit onto the emptied shelf; and repeating from unloading at least one article until accessibility for the target shelf is provided.

The method may include: after accessibility for the target shelf is no longer required, raising shelves of the multi-shelf unit by until there is an empty shelf; returning articles from the mobile storage unit to the multi-shelf unit until there is insufficient space on the shelf of the multi-shelf unit; and repeating from raising shelves until all articles on the mobile storage unit have been returned.

The method may include: unloading the at least one article, the processing unit causing a robotic arm disposed on the mobile storage unit to move the at least one article from the lowest shelf of the multi-shelf unit; loading the at least one article, the processing unit causing the robotic arm disposed on the mobile storage unit to move the at least one article to the highest shelf of the mobile storage unit with sufficient space; and lowering the subsequent shelf, the processing unit causing the robotic arm to engage with a lift mechanism of the multi-shelf unit to.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIGS. 3A to 3D are a series of views showing a lift mechanism of the multi-shelf cart of FIG. 1;

FIGS. 5A to 5D are partial close-up top views of the shelves of the multi-shelf cart of FIG. 1;

FIGS. 7A to 7E are side views illustrating an actuation process of the flow diagram of FIG. 6, according to an embodiment;

FIGS. 19A to 19J are perspective views illustrating the unloading process of FIG. 18, according to an embodiment;

FIGS. 37A-37G are views illustrating a process of loading a plurality of articles on the multi-shelf unit of FIGS. 34A and 34B, according to an embodiment;

FIG. 43A is a flow diagram of a method of using a mobile unit of the present disclosure as a buffer storage unit, according to an embodiment;

FIGS. 44A-44G are perspective views of the method of using the mobile unit of the present disclosure as a buffer storage unit, according to an embodiment.

DETAILED DESCRIPTION

Figure 1:
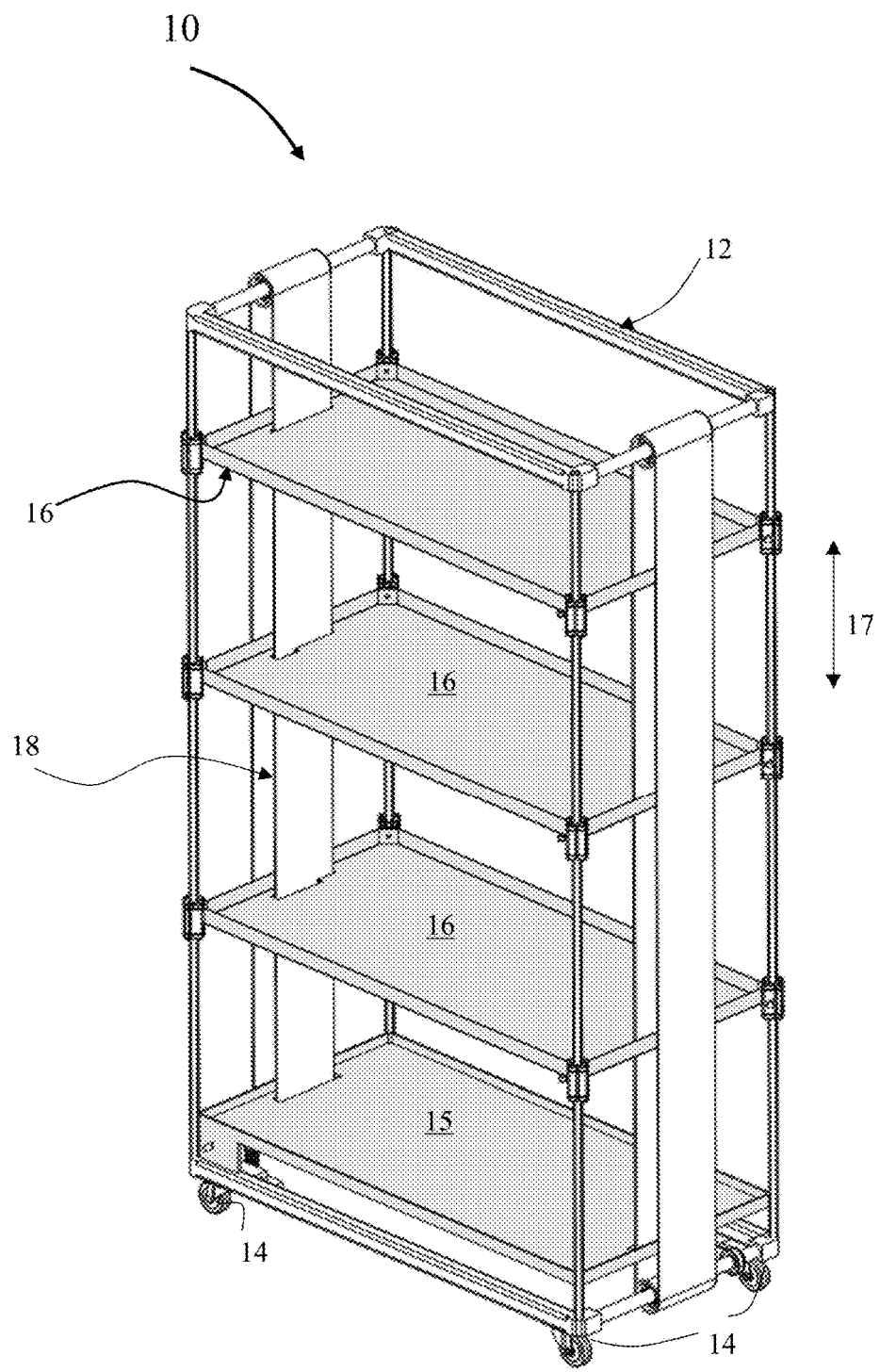
FIG. 1 is a perspective view of a multi-shelf cart, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to article management including transportation and storage, and more particularly to transportation and storage of articles using a multi-shelf cart.

In accordance with one aspect of the present disclosure, there is provided a multi-shelf cart for article transportation and storage.

In accordance with one aspect of the present disclosure, there is provided a system and method for automatic article handling using a multi-shelf storage unit.

In accordance with another aspect, the systems and methods disclosed herein may be used for article loading and unloading to and from a multi-shelf storage unit with adjustable heights.

In accordance with one aspect of the present disclosure, there is provided a system and method for distribution of articles having one or more identical attributes.

In accordance with one aspect of the present disclosure, there is provided a system and method for article transportation using a mobile unit having a plurality of conveyor shelves.

In accordance with one aspect of the present disclosure, there is provided a mobile robot having a collapsible multi-shelf storage module and methods of use thereof.

In accordance with an aspect, a cart for transporting a plurality of articles is provided. The cart includes a plurality of shelves. The plurality of shelves may increase an article capacity of the cart. The cart may facilitate improved loading and unloading of the articles to and from the cart.

The cart includes a wheeled structure and a plurality of vertically spaced apart shelves disposed on the wheeled structure. The shelves are configured to store articles. Each shelf is movably coupled to the wheeled structure. The cart also includes a lift mechanism disposed on the wheeled structure and coupled to the plurality of the vertically spaced apart shelves. The lift mechanism is configured to cause collapse and extension of the shelves in a vertical direction. The operation of the lift mechanism may assist in the article loading or unloading process by improving accessibility to each shelf.

The cart utilizes a drive system, such as a hand operated crank or a reversible electrical motor, to actuate the lift mechanism to adjust the height of the shelves. The drive system may be a component of the cart (e.g. included on or in the cart) or may be supplied externally.

The cart may further include a tray at each shelf. The tray is slidably coupled to the shelf and configured to slide in a lateral direction. Operation of the tray in this manner may provide improve access to the storage area of a given shelf.

In an embodiment, the cart may include a Wi-Fi module. The Wi-Fi module communicates data with a network. The communicated data may include various information such as a cart location and article data describing the articles stored on (or to be stored on) the shelves. Article data may include any one or more of an article type, article quality, or an article quantity.

In an embodiment, the cart may include at least one sensor configured to identify the location of the cart. The sensor may be disposed on the wheeled structure. Examples of the sensor may include an ultra-wideband sensor or a GPS (e.g. for outdoor uses).

In an embodiment, the cart may include a rechargeable power bank. The rechargeable power bank supplies electricity to any one or more of the functional sensors or actuators that are operably attached to the cart such (e.g. the Wi-fi module), the articles stored on the shelves, or one or more external devices, such as an external robot driving the lift mechanism.

In accordance with another aspect, there is provided a method of operating the multi-shelf cart. The method includes loading articles onto the cart by sequentially filling the shelves from the highest shelf to the lowest shelf, and unloading articles from the cart by sequentially emptying the plurality of the shelves from the lowest shelf to the highest shelf.

The loading process may further include driving the lift mechanism to vertically collapse the shelves so that the highest empty shelf is sufficiently accessible for the loading process, loading articles to the highest empty shelf, and driving the lift mechanism to vertically raise the loaded shelf and provide access to the subsequent shelf. The loading and driving steps may be repeated until all of the shelves are loaded with articles, or all of the articles to be loaded are loaded onto the cart.

The unloading process may further include unloading articles from the lowest article-occupied shelf until the lowest article-occupied shelf is empty and driving the lift mechanism to vertically lower the subsequent shelf to provide sufficient accessibility for unloading articles from the subsequent shelf. The unloading and driving steps may be repeated until all of the articles are unloaded from the cart.

In accordance with an aspect, a multi-shelf storage unit is provided. The multi-shelf storage unit can store a plurality of articles. The multi-shelf storage unit includes a plurality of vertically movable shelves. The vertically movable shelves may increase the storage capacity of the unit. The vertically movable shelves are configured to facilitate article loading or unloading to and from the multi-shelf storage unit.

The multi-shelf storage unit includes a structural frame and a plurality of vertically spaced apart shelves disposed on the frame. The shelves include a storage area for storing at least one article. Each shelf is movably coupled to the frame. The multi-shelf storage unit also includes a lift mechanism disposed on the frame and coupled to the plurality of the vertically spaced apart shelves. the lift mechanism is configured to cause collapse and extension of the shelves in vertical direction. The operation of the lift mechanism in this manner may assist in article loading or unloading by improving accessibility to one or more shelves.

The frame of the multi-shelf storage unit may be a wheeled frame. The wheeled frame may facilitate mobility of the storage unit. In other variations, the frame may be stationary.

The multi-shelf storage unit utilizes a drive system, such as a reversible electrical motor, to actuate the lift mechanism to adjust the height of the shelves. The drive system may be a component of the multi-shelf storage unit (e.g. included on or in the cart) or may be supplied externally.

The multi-shelf storage unit may further include a tray at each shelf. The tray is slidably coupled to the shelf and configured to slide in a lateral direction. The operation of the tray in this manner may provide improved access to the storage area of a given shelf.

In an embodiment, the multi-shelf storage unit may include a Wi-Fi module. The Wi-Fi module communicates data with a network. The communicated data may include various information such as a storage unit location and article data about the articles stored using the storage unit. The article data may include any one or more of an article type, an article quality, and an article quantity. The multi-shelf storage unit may further include at least one sensor configured to identify a storage unit location (i.e. the location of the storage unit). The sensor may be disposed on the frame. Examples of the sensor may include an ultra-wideband sensor and a GPS sensor (e.g. for outdoor uses).

In an embodiment, the multi-shelf storage unit may include a rechargeable power bank. The rechargeable power bank may supply electricity to any one or more of the functional sensors or actuators that are operably attached to the multi-shelf storage unit (e.g. the WIFI-fi module), the articles that are stored on the shelves, or one or more external devices, such as an external robot driving the lift mechanism.

In accordance with another aspect, a system for automatic loading and unloading of articles to and from a multi-shelf storage unit is provided. The system includes a multi-shelf storage unit for storing a plurality of articles and a robotic loader/unloader unit configured to automatically load or unload articles to and from the multi-shelf storage unit. The loader/unloader unit includes a robotic manipulator equipped with a suitable loading or unloading end effector and configured to automatically load and unload articles to and from the multi-shelf cart. The robotic manipulator may be affixed to a stationary base or may be disposed on a mobile base. The mobile base may facilitate transport of the articles.

In an embodiment, the lift mechanism of the multi-shelf cart may be actuated by an actuator. The actuator may be located onboard the cart or may be an external actuator disposed on the loader/unloader unit. In an embodiment, the lift mechanism is actuated using the robotic manipulator of the loader/unloader unit. The robotic manipulator may further include an end effector. The end effector may be operably disposed on the robotic manipulator to engage with and actuate the lift mechanism of the multi-shelf cart to adjust the height of the shelves of the cart.

In an embodiment, the multi-shelf storage unit may include a rechargeable power bank to supply electricity to the robotic loader/unloader unit.

In embodiments where the multi-shelf storage unit includes slidable trays, the robotic manipulator may be further configured to engage with each tray to cause slidable movement of the trays. This operation may provide a different level of accessibility for the storage area on each shelf.

Features related to the automatic loading and unloading of the multi-shelf storage unit will now be described. In accordance with another aspect, there is provided a method for automatic loading and unloading of a plurality of articles to and from the multi-shelf cart using a robotic loader/unloader unit.

The method includes driving the robotic manipulator of the robotic loader/unloader unit to load a plurality of articles to the multi-shelf storage unit by sequentially filling the shelves from the highest shelf to the lowest shelf and, where required, actuate the lift mechanism of the multi-shelf storage unit to move the shelves in a generally upward motion. The method also includes driving the robotic manipulator of the robotic loader/unloader unit to unload a plurality of articles from the multi-shelf storage unit by removing articles from the shelves sequentially from the lowest shelf to the highest shelf and, where required, actuate the lift mechanism of the multi-shelf storage unit to move the shelves in a generally downward motion.

The loading process may further include driving the lift mechanism of the multi-shelf storage unit to vertically collapse the shelves so that the highest empty shelf is sufficiently accessible to the robotic manipulator of the loader/unloader unit, driving the robotic manipulator of the loader/unloader unit to load at least one article to the highest empty shelf, repeating the driving the robotic manipulator step to fill the highest empty shelf, driving the lift mechanism to vertically raise the filled shelf and provide access to the subsequent shelf. The driving the robotic manipulator steps and driving the lift mechanism step can be repeated until all of the shelves are filled with articles or all of the articles to be loaded are loaded onto the cart.

The unloading process may further include driving the robotic manipulator of the loader/unloader unit to unload at least one article from the lowest article-occupied shelf, repeating the driving step until the shelf is empty of articles, and driving thelift mechanism to vertically lower the subsequent article-occupied shelf to provide sufficient accessibility for unloading articles from the subsequent shelf. The driving the robotic manipulator, repeating the driving, and driving the lift mechanism steps can be repeated until all of the articles are unloaded from the cart.

Since the loading and unloading processes use sequential movement of the shelves of the multi-shelf storage unit (i.e. for loading, first the higher empty shelves can be loaded and then the lower shelves; for unloading, first the lower shelves can be unloaded and then the higher shelves), the automatic material handling system of the present disclosure may particularly work for situations where the stored articles on each multi-shelf storage unit are identical (or substantially identical) so that for retrieval of a particular stored article from a multi-shelf storage unit, there is little or no difference between retrieving the article in the lowest shelf or the article in a shelf with a higher elevation (i.e. from a higher shelf).

Another particular situation in which the disclosed system and method may be applicable is when all of the articles in one multi-shelf storage unit are to be retrieved in a specific period of time with no obligation on the order of retrieval. For example, in an inventory warehouse, the multi-shelf storage unit may be used to store articles that are to be shipped on the same date. In this case, all items in the multi-shelf storage unit may be retrieved on the specific date, no matter what the order of the retrieval.

In some cases, the system and method may be used to reduce the complexity of article loading/unloading robotic systems and increase the safety of material handling. Another advantage of the proposed system and method may be that since the multi-shelf storage unit is actuated and its actuation is part of an automatic loading/unloading process, the loading/unloading process may be completed faster. In other words, by using the proposed system, the task of loading/unloading may be divided between the loader/unloader unit and the multi-shelf storage unit rather than just being by the loader/unloader unit. Thus, the performance (e.g. efficiency) of material handling may be increased substantially. This advantage may reduce operating costs by reducing article storage time and article retrieval time.

In accordance with an aspect, a system is provided for distribution of articles that have at least one logistic attribute in common. Examples of a logistic attribute may include any one or more of an article type, one or more geometrical characteristics of the article, an article shipping date, and an article recipient associated with a plurality of articles.

The system includes a primary facility and a destination facility. The primary facility houses a plurality of articles with a plurality of logistic attributes. The primary facility may be an inventory warehouse or a production facility such as a potting center in a greenhouse nursery. The destination facility is a location at which an article unloading process is performed. The article unloading process includes unloading a plurality of articles from a multi-shelf cart. The destination facility may be a shipping center or a potting bay in a greenhouse nursery. The system also includes a mobile multi-shelf storage unit (which may be referred to herein as multi-shelf cart or cart), configured to temporarily store a plurality of articles on multiple shelves, a loader unit, located at the primary facility, for loading articles from the primary facility to the multi-shelf cart, and an unloader unit, located at the destination facility, which is configured to unload articles from the multi-shelf cart to the destination facility.

The primary facility houses the process of storing (i.e. process of loading) a plurality of articles onto the multi-shelf cart.

The system may further include a cart-pulling unit. The cart-pulling unit transports the multi-shelf cart through a navigation route from the primary facility to the destination facility.

The multi-shelf cart includes a wheeled frame and a plurality of vertically movable shelves disposed on the wheeled frame to increase the storage capacity of the storage unit. Each of the plurality of shelves includes a storage area. The cart also includes a lift mechanism disposed on the wheeled frame and coupled to the plurality of the shelves. The lift mechanism facilitates movement of the shelves, which may provide improved accessibility to each shelf. The multi-shelf cart facilitates the process of article loading and unloading to and from the storage unit by lowering each shelf to an elevation near a ground surface. By actuating the lift mechanism, the shelves can be completely collapsed on top of each other or may be fully extended and vertically separated apart from one another. The multi-shelf cart interfaces with or includes a drive system, such as a reversible electrical motor, which actuates the lift mechanism and adjust the height of the shelves. The drive system may be included as a component of the multi-shelf cart (e.g. on the cart) or may be supplied externally.

The loader unit (located in the primary facility) may be a robotic agent configured to automatically load articles onto the multi-shelf storage unit, a human agent to manually place the articles into the shelves, or a loading vehicle such as a lift truck operated by a human agent to load articles onto the shelves. The robotic loader unit may be preferred, as it may advantageously automate the loading process.

The multi-shelf cart navigates through a navigation route using drive wheels disposed on the cart or via the cart-pulling unit. The cart-pulling unit may be configured to transport the multi-shelf carts automatically, for example, by using a cart-pulling autonomous robot, or manually, for example, using a human-operated truck.

The unloader unit may be a robotic agent, a human agent, or a human-operated vehicle to unload articles from the shelves of the multi-shelf cart. The robotic unloader unit may be preferable, as it may advantageously automate the unloading process.

In accordance with another aspect, there is provided a method for distributing a plurality of articles that have at least one identical logistic attribute. The method can be performed using the article distribution system. The method includes loading, at a primary facility, a plurality of articles that have at least one identical logistic attribute from a loading zone to the multi-shelf cart using a loader unit, driving the multi-shelf cart storing the articles to a destination facility through a navigation route, and unloading the articles from the multi-shelf cart to an unloading zone at the destination facility using an unloader unit.

The method may further include a method for loading or unloading articles to and from the storage areas of the multi-shelf cart. The method may utilize unique design features of the multi-shelf cart. The method includes loading a plurality of articles onto the storage unit by sequentially filling the shelves from the highest shelf to the lowest shelf and, where required, actuating the lift mechanism of the storage unit to move the shelves in a generally upward motion, and unloading a plurality of articles from the storage unit by removing the articles from the shelves sequentially from the lowest shelf to the highest shelf and, where required, actuating the lift mechanism of the storage unit to move the shelves in a generally downward motion.

The method may include returning unloaded multi-shelf carts to the primary facility.

The article distribution systems and methods of the present disclosure may have various applications, of which examples will now be provided. The system may be used to collect a plurality of articles that are to be shipped on a specific date (identical attribute, article shipping date) from an inventory warehouse (i.e. primary facility) and load the articles to the multi-shelf cart using a conveying belt and a robotic arm (i.e. loader unit), transport the cart to a shipping center (i.e. destination facility) using an automated guided vehicle (i.e. cart-pulling unit) on the specific date, and unload the stored articles from the cart, shelf by shelf, at the shipping center using a mobile robotic arm (i.e. unloader unit).

In another example, the system may be used within a greenhouse nursery, and in particular in a potting center (i.e. primary facility), to load a plurality of 2-gallon potted *Begonia* plants (i.e. a plurality of articles with at least one identical logistic attribute) to the multi-shelf cart using a conveying belt and a robotic arm (i.e. loader unit), transport the loaded cart from the potting center to an indoor greenhouse bay (e.g. destination facility) using an autonomous cart-pulling robot, and unload the potted *Begonia* plants from each shelf of the cart to the greenhouse bay using a mobile robot equipped with a manipulator and a storage platform (e.g. unloader unit).

In yet another example, the system may be used within a production facility, such as an automotive manufacturing facility, to collect a plurality of chassis parts (i.e. a plurality of articles with at least one identical logistic attribute) from a production line-1 (i.e. primary facility) and load the chassis parts onto a multi-shelf cart using a robotic arm (i.e. loader unit), transport the cart from the production line-1 to an assembly line-1 (i.e. destination facility) using an automated guided vehicle, and unload the chassis parts one by one from the cart to the assembly line-1 using a second robotic arm at the assembly line-1 (i.e. unloader unit).

The design of the multi-shelf cart, including the sequential loading or unloading of the shelves feature, may make the cart suitable for automated storage, distribution, and retrieval of stored articles to and from the cart while increasing the capacity of the storage area. In addition to increasing the capacity of the temporary storage during transportation of articles and enabling the automation of the loading/unloading process, the movable shelves of the multi-shelf cart and the method of operating the cart may reduce the complexity of loading/unloading robotic systems and increase the safety of material handling, as the lift mechanism of the cart may eliminate the need for loading/unloading at an elevation.

Though the distribution operation of the disclosed system (or a portion thereof) may be performed in an unautomated manner (i.e. manually), the disclosed system may provide a basis for fully automatic distribution of articles with at least one identical logistic attribute from a primary facility to a destination facility.

In accordance with one aspect of the present disclosure, there is provided an apparatus which is configured to receive, store, transport, and deliver a plurality of articles via a mobile unit which includes multiple conveyor shelves. The apparatus may facilitate transfer of the articles between an article delivering or receiving facility (such as a fixed conveyor line or a mobile forklift) and the multiple conveyor shelves of the apparatus.

The apparatus may be configured to move sufficiently close to a first fixed conveyor line, receive a plurality of articles from the first fixed conveyor line and load the multiple conveyor shelves with the articles, transport the articles to a second fixed conveyor line, and deliver the plurality of articles to the second fixed conveyor line by unloading the multiple conveyor shelves.

In an embodiment, the apparatus includes a wheeled base, a frame disposed on the wheeled base, and a plurality of generally vertically spaced shelves disposed on the frame. Each shelf comprises a plurality of roller conveyors. The apparatus further includes a lift mechanism disposed on the frame and coupled to the plurality of the vertically spaced apart shelves. The lift mechanism is configured to cause collapse and extension of the shelves in generally a vertical direction to assist in the article loading or unloading process, such as by improving accessibility in a generally vertical direction to each shelf. The apparatus further includes a roller conveyor drive mechanism disposed on the frame. The roller conveyor drive mechanism is configured to engage with the roller conveyors of a shelf to cause the roller conveyors to rotate to facilitate loading and unloading an article to and from the engaged conveyor rollers.

The roller conveyors of a shelf may be coupled to each other in such a way that rotation of a first roller results in rotation of the one or more additional rollers. The drive mechanism may be further configured to engage with the first roller to cause rotation of the plurality of roller conveyors for the purpose of automated article loading and unloading.

The roller conveyor drive mechanism may be coupled to an actuator, such as a reversible electrical motor. The actuator may be disposed on the apparatus frame or may be disposed on an external apparatus. The apparatus may further include a drive system, such as a hand operated crank or a reversible electrical motor, coupled to the lift mechanism and configured to actuate the lift mechanism in order to adjust the height of the shelves. The drive system may be included in the system/apparatus or may be external to the apparatus/system.

In an embodiment, the wheeled base of the multi-shelf apparatus may include motorized wheels to facilitate powered transportation of the apparatus. In such a case, the wheeled base may include a processing unit and sensory system. The sensory system may include LiDAR, a vision camera, or the like. The processing unit and sensory system may facilitate autonomous navigation of the apparatus within a workspace. For example, the processing unit and sensory system may facilitate navigation of the apparatus from a first location, such as a first conveyor line (e.g. production line), to a second location, such as a second conveyor line (e.g. assembly line). The first and second locations may be located in the same facility or in different facilities.

In an embodiment, the wheeled base may include idler wheels. In such a case, the apparatus may be configured to be driven by an external driving entity such a human operator or a robotic cart-pulling apparatus.

The frame may be movably attached to the wheeled base in such a way as to provide multiple degrees of freedom for the frame with respect to the wheeled base. The apparatus may further include at least one frame actuator disposed on the wheeled base and coupled to the frame to cause three-dimensional displacement and orientation adjustment of the frame with respect to the wheeled base. The frame actuator may facilitate general alignment of a conveyor shelf with an external receiving or delivering facility.

In accordance with another disclosed aspect of the present disclosure, there is provided a method of loading and unloading articles to and from the conveyor shelves of the apparatus. The method includes loading articles to the apparatus by sequentially filling the shelves from the highest empty shelf to the lowest shelf, and unloading articles from the apparatus by sequentially emptying the shelves from the lowest article-occupying shelf to the highest shelf.

In an embodiment, the loading method may include moving the apparatus to an article delivering facility, driving the lift mechanism of the apparatus to vertically collapse the shelves so that the highest empty shelf is sufficiently accessible for receiving an article, receiving an article from the article delivering facility and loading the article onto the receiving shelf by driving the roller conveyor in a generally inward direction by engaging the conveyor drive mechanism with the roller conveyors of the receiving shelf, driving the lift mechanism of the apparatus to vertically raise the loaded shelf and provide access to the subsequent (unloaded) shelf, and repeating the loading and driving steps until either all of the shelves of the apparatus are loaded with articles, or all of the articles to be loaded have been loaded to the apparatus.

In an embodiment, the unloading process may include moving the apparatus to an article receiving facility, driving the lift mechanism of the apparatus to adjust the height of the shelves so that the lowest article-occupied shelf is sufficiently accessible for delivering an article to the article receiving facility, delivering the article from the delivering shelf to the article receiving facility by running the roller conveyors in generally a generally outward direction by engaging the conveyor drive mechanism with the roller conveyors of the delivering shelf, driving the lift mechanism to vertically lower the subsequent article-occupied shelf to provide sufficient accessibility for unloading articles from the subsequent shelf, and repeating the delivering and driving steps until all of the articles are unloaded from the apparatus.

The mobile apparatus having a plurality of conveyor shelves may provide various advantages. For example, the apparatus may provide a means of transporting a plurality of articles around a workspace without the need for extensive and complicated conveyor belts and other fixed systems. The apparatus may save time and energy by moving multiple articles at a time rather than transporting only a single article. The apparatus may eliminate the need for a robotic or other manipulator to load and unload articles to and from the mobile apparatus. The apparatus may facilitate a fully autonomous article transportation process by eliminating labor components (e.g. human laborers), which can be costly, slow, time-consuming, inefficient, inaccurate, and sometimes difficult to find.

In accordance with one aspect of the present disclosure, there is provided an apparatus which is configured to store and transport a plurality of articles via a mobile robot and a multi-shelf storage module.

The apparatus includes a wheeled chassis and a multi-shelf storage module disposed on the wheeled chassis. The multi-shelf storage module may be removably attached to the wheeled chassis or may be integrated with the wheeled chassis. The multi-shelf storage module includes a frame, a plurality of vertically spaced shelves disposed on the frame, and a lift mechanism disposed on the frame and coupled to the plurality of the vertically spaced apart shelves. The lift mechanism is configured to cause collapse and extension of the shelves in a vertical direction, which may assist in an article loading or unloading process by improving accessibility to one or more shelves. The wheeled chassis may include a drive system, such as motorized wheels, and a processing unit to autonomously propel and navigate the wheeled chassis to a desired location.

The multi-shelf module may interface with or include a drive system, such as a hand operated crank or a reversible electrical motor, to actuate the lift mechanism and change the height of one or more shelves. The drive system may be included as a component of the wheeled chassis or may be supplied externally.

The apparatus may further include a base platform disposed on the wheeled chassis. The base platform may be configured to rotate with respect to the wheeled chassis. The apparatus may further include an actuator coupled to the base platform. The actuator may cause rotation of the base platform with respect to the wheeled chassis. The apparatus may include at least one SCARA manipulator coupled to the base platform. The SCARA manipulator may be configured to move an end effector (e.g. mechanical gripper). The end effector is configured to pick up an article (e.g. from a pickup location) and load the article on an available space on a shelf of the multi-shelf module. The end effector is also configured to unload an article from the multi-shelf module, for example to a drop-off location. The end effector may be configured to assist generally in article manipulation.

The wheeled chassis may include a rotary platform disposed thereon. The rotary platform may be configured to rotate with respect to the wheeled chassis. The apparatus may further include an actuator coupled to the rotary platform. The actuator is configured to cause rotation of the rotary platform with respect to the wheeled chassis. The multi-shelf module may be disposed on the rotary platform, which may enable the rotation of the multi-shelf module with respect to the wheeled chassis and the base platform. Such arrangement may facilitate improved accessibility to the shelves of the multi-shelf module.

Each shelf in the multi-shelf unit may include a support surface. The support surface may be oriented to support an underside of an article to be transported. The multi-shelf unit may include a plurality of pins distributed over at least a portion of the support surface of a shelf. The pins may be movable between an extended position and a retracted position. The pins may be urged into the extended position such that a lateral retaining portion of each pin protrudes above the support surface. The underside of the article, when received on the support surface, may cause a first subset of the pins underlying the article to be depressed into the retracted position while a second subset of the pins remains in the extended position such that the lateral retaining portions of pins disposed adjacent to the article constrain the article to prevent movement of the article on the support surface while being transported.

In accordance with another aspect of the present disclosure, there is provided a method of operating the apparatus for article transportation and storage within a workspace. The method includes detecting a plurality of target articles in a pickup location of the workspace, navigating the apparatus sufficiently close to the articles by driving the wheeled chassis of the apparatus, and loading articles onto the multi-shelf module. Loading includes sequentially filling the shelves from the highest shelf to the lowest shelf. The method also includes detecting a drop-off location within a workspace, navigating the apparatus sufficiently close to the drop-off location, and unloading articles from the multi-shelf module by sequentially emptying the plurality of shelves from the lowest article-occupying shelf to highest article-occupying shelf.

In an embodiment, the loading process may include driving the lift mechanism to vertically collapse the shelves so that the highest empty shelf is sufficiently accessible for the loading process (e.g. to the elevation or height range of a loading human agent or robotic agent), loading articles to the highest empty shelf by manipulating the articles from the pickup location to an empty space on the shelf until the shelf is filled, and driving the lift mechanism to vertically raise the loaded shelf and provide access to the subsequent shelf. The loading and driving steps may be repeated until either all of the shelves are loaded with articles, or all of the plurality of the articles to be loaded are loaded onto the apparatus.

In an embodiment, the unloading process may include unloading articles from the lowest article-occupying shelf to the drop-off location until the shelf is empty of articles to be unloaded and driving the lift mechanism to vertically lower the subsequent shelf to provide sufficient accessibility for unloading articles from the subsequent shelf. The unloading and driving steps may be repeated until all of the articles to be unloaded are unloaded from the apparatus.

In accordance with another aspect of the present disclosure, there is provided a method for using the disclosed apparatus as a buffer storage unit for articles in a collapsible multi-shelf storage unit. The method includes receiving a task to provide accessibility to an article which is in an elevated target shelf of a multi-shelf storage unit, navigating the apparatus to a spot sufficiently close to the collapsible multi-shelf storage unit, unloading at least one article from the lowest article-loaded shelf, loading the unloaded article to the highest shelf of the buffer storage unit having sufficient available storage space, lowering the subsequent shelf of the multi-shelf storage unit to provide access to the subsequent shelf, and raising the loaded shelf of the buffer storage unit to provide access to the subsequent shelf of the buffer storage unit. The unloading, loading, lowering, and raising steps may be repeated until the target shelf is accessible.

The method may further include collecting the article from the target shelf and transporting the collected article to a destination location using the apparatus. The method may further include returning articles from the buffer storage unit to the multi-shelf storage unit.

Referring now to FIG. 1, a multi-shelf cart for transporting a plurality of articles according to a first disclosed embodiment is shown generally at 10.

The cart 10 includes a wheeled structure 12. In the embodiment shown, the wheeled structure 12 includes a castor wheel 14 on each corner of the structure (only 3 are shown in FIG. 1). The castor wheels can swivel to allow the navigation of the cart in any direction. In other embodiments, powered wheels could be used instead of all or some of the castor wheels in order to give navigation directions to the cart.

The cart 10 includes a plurality of vertically spaced apart shelves 16 which are movably disposed on the wheeled structure and are configured to provide storage areas for the cart. Each shelf 16 is configured to move in vertical direction 17.

The cart 10 also includes a lift mechanism 18 disposed on the wheeled structure 12 and coupled to the plurality of the shelves to drive the shelves in vertical direction 17.

The cart 10 may include a fixed shelf 15 disposed on the wheeled cart 12. The fixed shelf 15 provides a storage area but is not movable.

Figure 2:
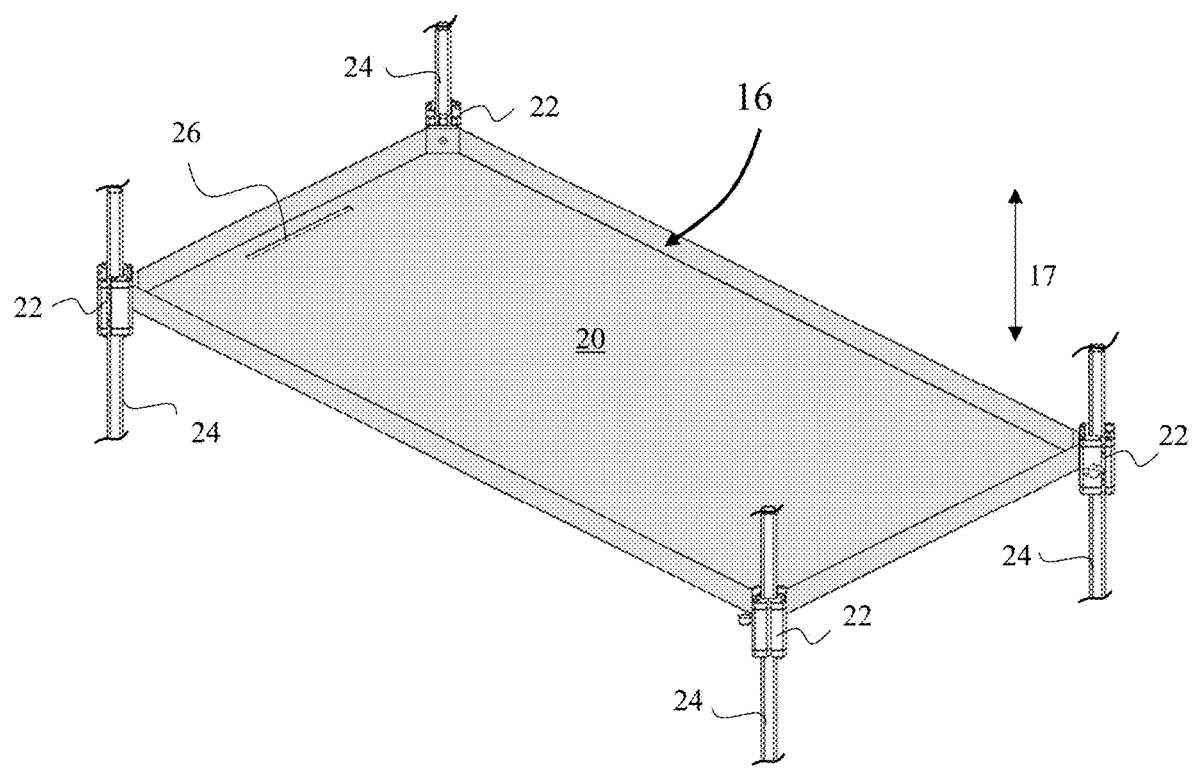
FIG. 2 is a perspective view of one shelf of the multi-shelf cart of FIG. 1.

Referring now to FIG. 2, a shelf 16 includes a storage area 20.

The shelf includes four linear guides 22 affixed to the corners of the shelf to facilitate movement of the shelf 16 in the linear columns 24 of the wheeled structure 12 in vertical direction 17.

The shelf 16 also includes at least one groove 26 to engage the shelf 16 with the lift mechanism.

Referring now to FIG. 3, a series of views generally show the details of the lift mechanism according to a disclosed embodiment.

The lift mechanism 18 includes a rotating shaft 30 disposed on the fixed shelf 15. In other embodiments, the rotating shaft could be disposed on the wheeled structure 12.

Two rotating shaft inputs 32 are disposed on both sides of the wheeled structure to engage a drive system 33 to the rotating shaft 30. In the shown embodiment, the drive system 33 is a hand operated crank but in other embodiments, other drive systems such as a robotic arm equipped with a reversible motor may be used.

A pair of engaged helical gears 34 and 35 are disposed on the rotating shaft 30 to transfer the torque of the drive system 33 to a first belt drive shaft 40 through a worm 36 (shown in FIG. 3C) and worm gear 38 set.

A first driving pulley 42 is coupled to the first belt drive shaft 40 to drive a first belt 44.

Referring now to FIG. 3B, the other end of the first belt 44 is supported on an idler pulley 46, the idler pulley 46 rotatably coupled to a non-rotating shaft 47 at the top of the cart.

Referring now to FIG. 3D, a third driving pulley 48 is disposed on the first belt drive shaft 40.

A twisted belt 50 is coupled to the third driving pulley 48 and a driven pulley 49 to transfer the drive torque from the first belt drive shaft 40 to a second belt drive shaft 52 and cause the rotation of the second belt drive shaft 52 in a reverse direction of the rotation of the first belt drive shaft 40.

A second driving pulley 54 is driving a second belt 56 (both shown in FIG. 3B).

It should be noted that the movement of the belts 44 and 56 are simultaneous and synced together to ensure the proper operation of the lift mechanism. To promote this, there should be no slippage between the mentioned belts and the driven or driving pulleys.

Referring again to FIG. 3B, both belts 44 and 56 are passed through the grooves 70 to 73 on the shelves 65 to 58 respectively from bottom to top (on each shelf, the grooves are disposed on both ends of the shelf to allow passing both belts 44 and 56; in FIG. 3 only one groove on one side of each shelf is shown).

Figure 4:
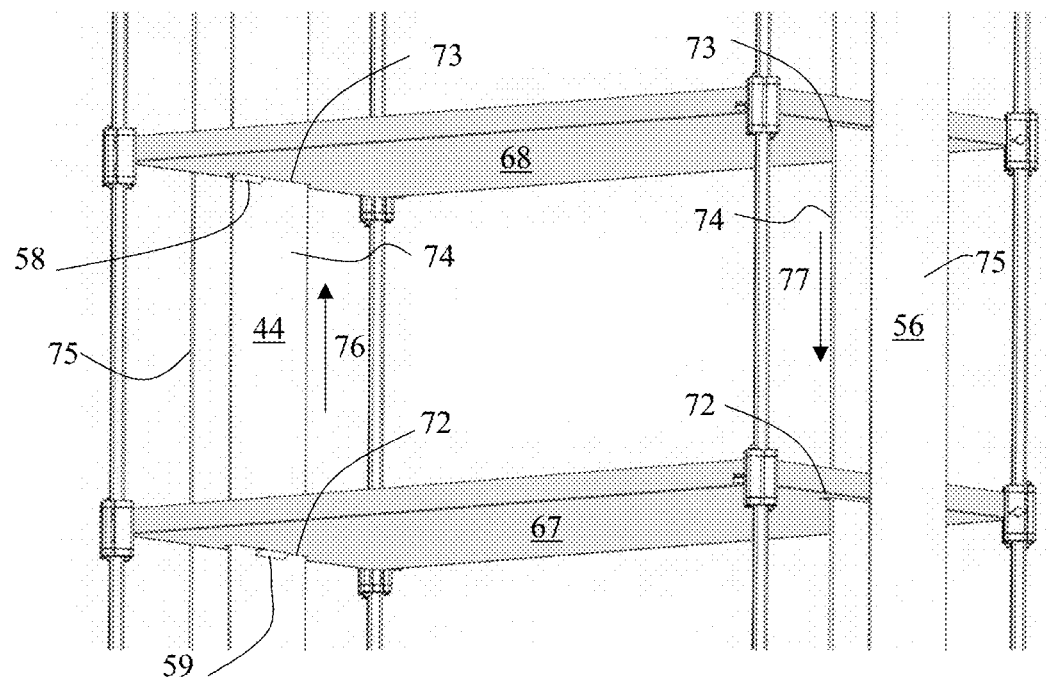
FIG. 4 is a partial close-up perspective view of the lift mechanism of the multi-shelf cart of FIG. 1.

Referring now to FIG. 4, a close-up perspective view of the cart 10 is provided showing the top two shelves of the cart, shelf 67 and shelf 68, to better explain the operation of the lift mechanism 18.

The belts 44 and 56, each, have two sections, an inward section 74 facing toward the inside of the cart and an outward section 75 facing toward the outside of the cart.

The belts 44 and 56, each, further include a set of three vertically and horizontally spaced apart stoppers (in FIG. 4 only the first stopper 58 and the second stopper 59 are shown on belt 44) affixed to each belt 44 and 56.

As the inward sections 74 of the belts 44 and 56 are driven simultaneously in directions 76, the stoppers 58, on both belts 44 and 56 (the first stopper 58 attached to the belt 56 is not shown in figures but is at the same height as the first stopper 58 attached to belt 44), pass through the grooves 70 to 72 (grooves 70 and 71 are shown in FIG. 3B and FIG. 5) but interconnect with groove 73 simultaneously. Hence, the belts 44 and 56 are coupled to the shelf 68 and the movement of belts drive the shelf 68 in direction 76. Likewise, the second stoppers 59 on both belts 44 and 56 (the second stopper 59 attached to belt 56 is not shown in the figures) passes through grooves 70 and 71 but interconnects with groove 72 and hence the movements of the belts 44 and 56, drive the shelf 67 in direction 76.

In the embodiment shown in FIG. 4, it is evident that the vertical distance between the adjacent first and second stoppers 58 and 59 determines the vertical distance between the adjacent shelves 67 and 68.

Still referring to FIG. 4, if the inward sections 74 of the belts 44 and 56 are driven in direction 77, the first and second stoppers 58 and 59 disengage from the grooves 73 and 72 respectively and hence the weight of the shelves 68 and 67 drive the shelves in direction 77.

Thus, in general, the upward motion of the shelves is provided by engagement of the belt stoppers with the grooves on the shelves and the downward motion of the shelves is caused by the weight of the shelves and in the same time, the disengagement of the belt stoppers from the grooves of the shelves.

In the embodiment shown in FIG. 3, a worm 36 and gear 38 set is used to make sure that the belt drive shaft 40 is driven by the drive system 33 and not the weight of the shelves 16.

Referring now to FIGS. 5A to 5D, a series of close-up top views from each shelf are shown.

Referring to FIG. 5A, the lowest shelf 65 is shown. According to the embodiment shown in FIG. 3B, the shelf 65 is fixed to the wheeled structure 12. The groove 70 on the shelf 65 is wide enough to allow the passage of the belt stoppers from the fixed shelf 65.

Referring to FIG. 5B, the second shelf from the bottom, shelf 66, is shown. Looking from the top, the groove 71 on the shelf 66 has a thin groove on the left side to interconnect with the third stopper but a wider groove on the right side to allow for the first and second stoppers to pass.

Referring to FIG. 5C, the third shelf from the bottom, shelf 67, is shown. Looking from the top, the groove 72 on the shelf 67 has a thin groove on the left side to interconnect with the second stopper but a wider groove on the right side to allow for the first stoppers to pass.

Referring to FIG. 5D, the highest shelf, shelf 68, is shown. The groove 71 on the shelf 68 has a small width to interconnect with the first stopper.

Figure 6:
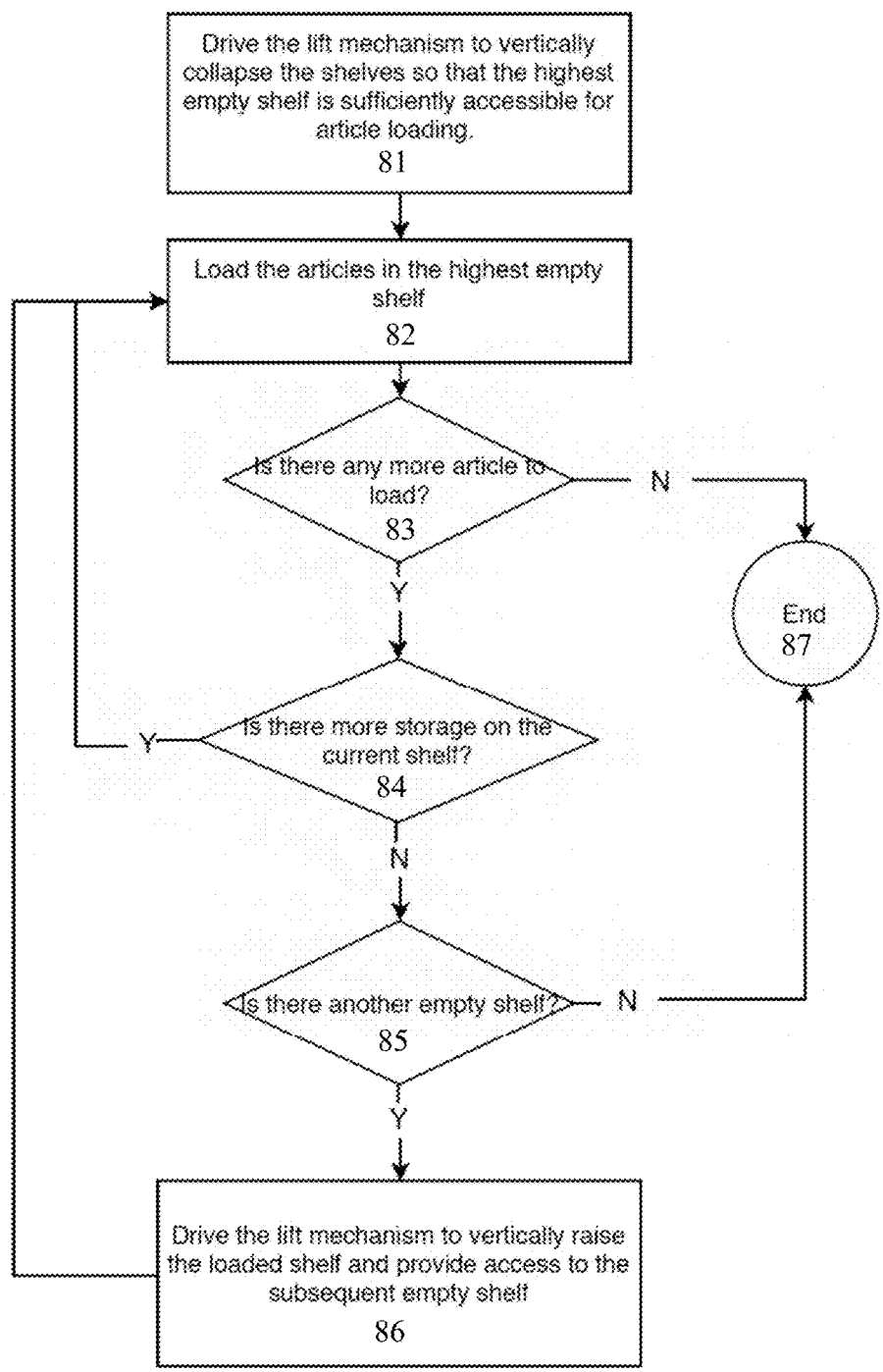
FIG. 6 is a flow diagram of a loading process of the lift mechanism, according to an embodiment.

Referring now to FIG. 6, a flowchart diagram showing an embodiment of directions for loading a plurality of articles to the multi-shelf cart of the current invention is shown generally at 80.

A side view of the loading process using the cart 10 is shown in FIGS. 7A to 7E as an example of the loading operation using the cart 10.

The loading process starts at block 81 by driving the lift mechanism to cause the collapse of the shelves so that the highest empty shelf is sufficiently accessible for article loading.

Referring to FIG. 7A, the lift mechanism 18 drives the shelves in direction 77 so that the first shelf 68 is in its lowest height possible and is sufficiently accessible for article loading.

At block 82 a plurality of articles are loaded to the highest empty shelf.

At block 83 availability of more articles for loading is checked. If there are more articles to be loaded, directions 80 proceeds to block 84, otherwise the loading process is finished at block 87.

At block 84 the storage area on the current shelf is checked. If there is more storage area on the current shelf the directions 80 proceeds to block 82 to load more articles into the current shelf, otherwise, if the current shelf is full, the directions 80 proceed to block 85.

Referring to FIG. 7B, a plurality of articles 88 are loaded to the first shelf 68 and no additional storage is left on first shelf 68.

At block 85 the direction 80 checks if there is an empty shelf from the subsequent shelves in the cart.

At block 85 if there is an additional empty shelf the process of article loading 80 proceeds to block 86.

At block 86, the lift mechanism raises the filled shelf or shelves and provides access for the next empty shelf.

Referring to FIG. 7C, the lift mechanism vertically lifts the first shelf 68 in direction 76 and provides access to the second shelf 67. Then, the second shelf 67 is fully loaded with a plurality of articles 89.

Referring to FIG. 7D, the lift mechanism vertically lifts the loaded shelves 68 and 67 in direction 76 and provide access for the third shelf 66. Then the third shelf 66 is fully loaded with a plurality of articles 90.

Referring again to FIG. 6, at block 85 if all of the storage shelves are filled, the loading process is finished at block 87.

Referring to FIG. 7E, the shelves 65 to 68 are filled with a plurality of articles and hence the loading process is done.

Figure 8:
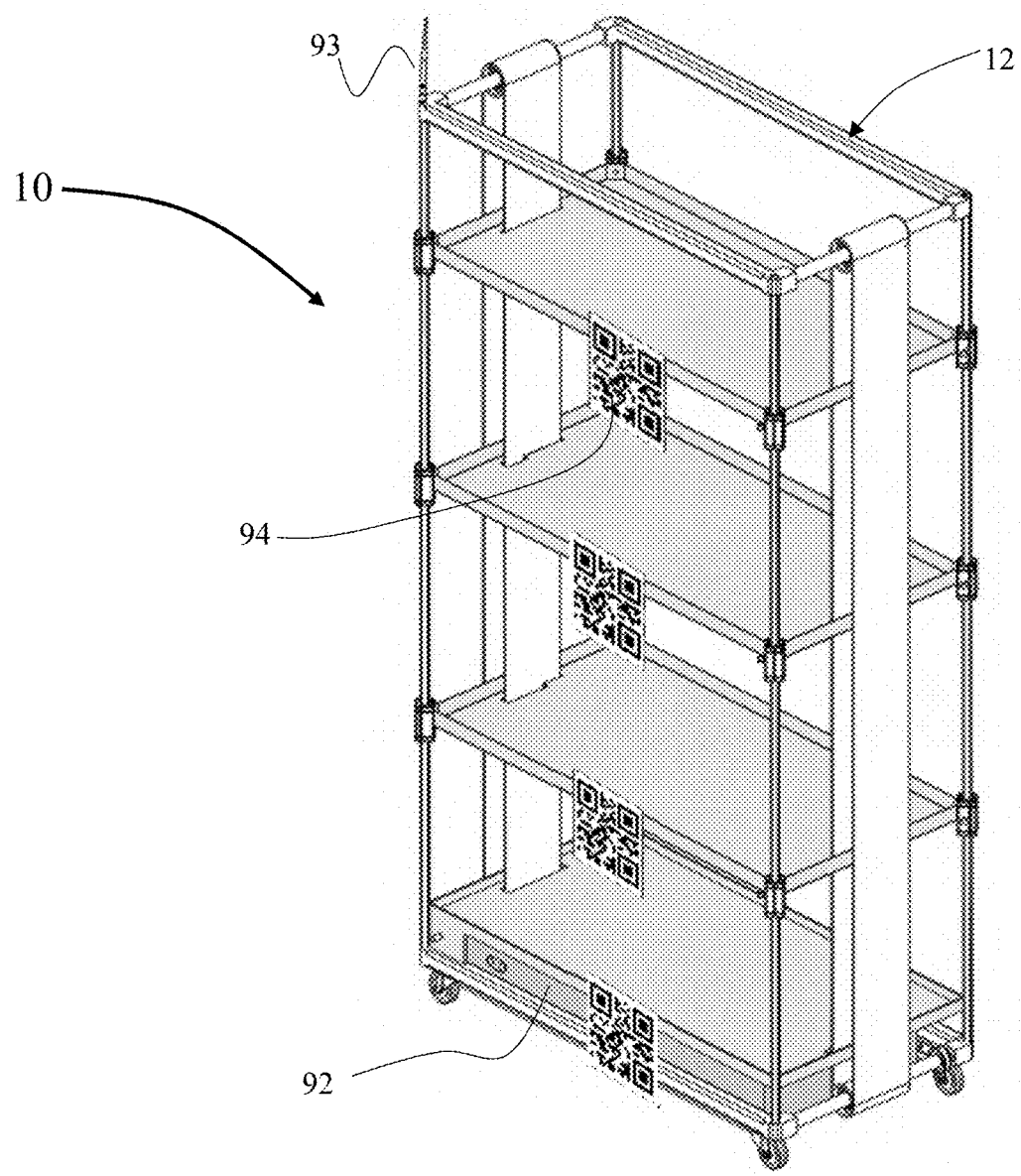
FIG. 8 is a perspective view of the multi-shelf cart of FIG. 1 further comprising a rechargeable power bank, a Wi-Fi module, and a unique QR code corresponding to each shelf, according to an embodiment.

Referring now to FIG. 8, shown therein is a cart, according to another embodiment.

The cart 10 may include a researchable battery bank 92 disposed on the wheeled structure 12 and configured to provide electricity for electronics devices on the shelves or devices near the cart 10.

The cart 10 also includes a unique QR code 94 affixed to each shelf and configured to associate the corresponding shelf with the articles stored on each shelf. In other embodiments, a different type of code or unique identifier may be used. The code or unique identifier may be machine-readable.

The cart 10 also includes a Wi-Fi module 93. As shown, the Wi-Fi module 93 may be disposed on the wheeled structure 12 and configured to communicate data with a network. The communicated data may include information such as cart location data (i.e. a location of the cart) and article data (i.e. data about the articles stored by the cart 10). The article data may include any one or more of an article type, an article quality or article condition, and an article quantity.

The cart 10 may further include a control unit (not shown in the figures). The control unit is configured to control the process of the sensors and actuators disposed on the cart 10.

In some cases, the multi-shelf storage unit 10 may be part of a shelf management system. The shelf management system may further reduce overhead and operations cost associated with article storage, transportation, and management. The shelf management system may manage (and simplify) computing and processing of data related to article storage, transport, and management, including in respect of the multi-shelf storage unit 10.

The shelf management system includes a cloud-based server that may be connected to one or more onsite components via an external network. The onsite components include onsite devices or systems that are used to perform operations related to article management at a site, such as a warehouse or article management facility. The onsite components may include any one or more of the multi-shelf storage unit 10, a robotic unit for performing article loading, unloading, or transport tasks (e.g. robotic unit 130 of FIG. 12, below), and a warehouse management system (WMS). In some cases, the WMS, or a portion thereof, may be implemented at the cloud-based server. The warehouse management system includes one or more computing devices configured to store and process data related to article storage, transport, and management and may be configured to communicate, via a communication network (e.g. local network at the site), with one or more other onsite components. Communication between the WMS and onsite components may include the transmission of data relating to the storage, transport, and management of articles at the site.

The cloud-based server may be configured to aggregate data such as the number of transported articles (e.g. articles 118 of FIG. 11), and the transported distance, location, or other information related to the tracking and location of such articles 118 located on the storage units 10. This may include data related to robotic movement, such as in the case of a robotic loader/unloader unit or a storage unit 10 having a robotic component (e.g. storage unit 510 of FIG. 41, below). Robotic movement related data may include, for example, LiDAR sensor data or vision camera data. The robotic movement related data may aid in robot route planning or other operational control of the system in the warehouse, as well as storage unit 10 storage capacity, which may aid in operational or storage capacity efficiencies.

The cloud-based server may be configured to aggregate data related to the environment of the storage unit 10. This data may include, for example, any one or more of storage unit 10 location data (i.e. data indicating the location of the storage unit 10), article data (e.g. data related to the storage, transport, management, quality, quantity, condition, etc. of the articles), and robot movement data (i.e. data relating to navigation of and paths or routes travelled by robotic onsite components). This data may be analyzed by the cloud-based server to determine warehouse efficiencies or system implementation costs, or to determine whether a condition deviates from an accepted standard. In some cases, such data analysis may be performed by the cloud-based server using one or more machine learning algorithms or models.

In some cases, the cloud-based server may be configured to analyze any one or more of the article data, the robot movement data, or shelf storage data (i.e. data related to the storage capacity of shelves of the storage unit 10). Such analysis may be performed by a device management module of the cloud-based server. This analysis by the cloud-based server may provide valuable information and insights regarding operation of the site (e.g. warehouse management efficiencies), and in particular with respect to article storage, transport, and management.

The cloud-based server may be configured to aggregate or analyze article data (i.e. data related to the articles stored, transported, or managed using the storage unit 10, or articles to be stored, transported, or managed using the storage unit 10). The article data may include, for example, any one or more of article type, article quality, article condition, and article quantity. Such processing of article data by the cloud-based server may aid or control efficient inventory management of the warehouse or articles.

The cloud-based server may process transported article data or article data itself to determine warehouse management statistics or other relevant data useful for management of the warehouse or production facility. The article data may be transmitted from a robotic device to the cloud-based server, or directly from the storage unit 10 to the cloud-based server (e.g. via WiFi module 93).

In some cases, the cloud-based server may analyze article data using a machine learning algorithm or model to determine an article condition or quality (such as using an article date or other data related to the article) and then analyze the article condition or quality data in small or big scales (e.g. big data), such as via machine learning algorithms or models, to derive valuable information and insights regarding the operation of the warehouse or handling of the articles.

Figure 9:
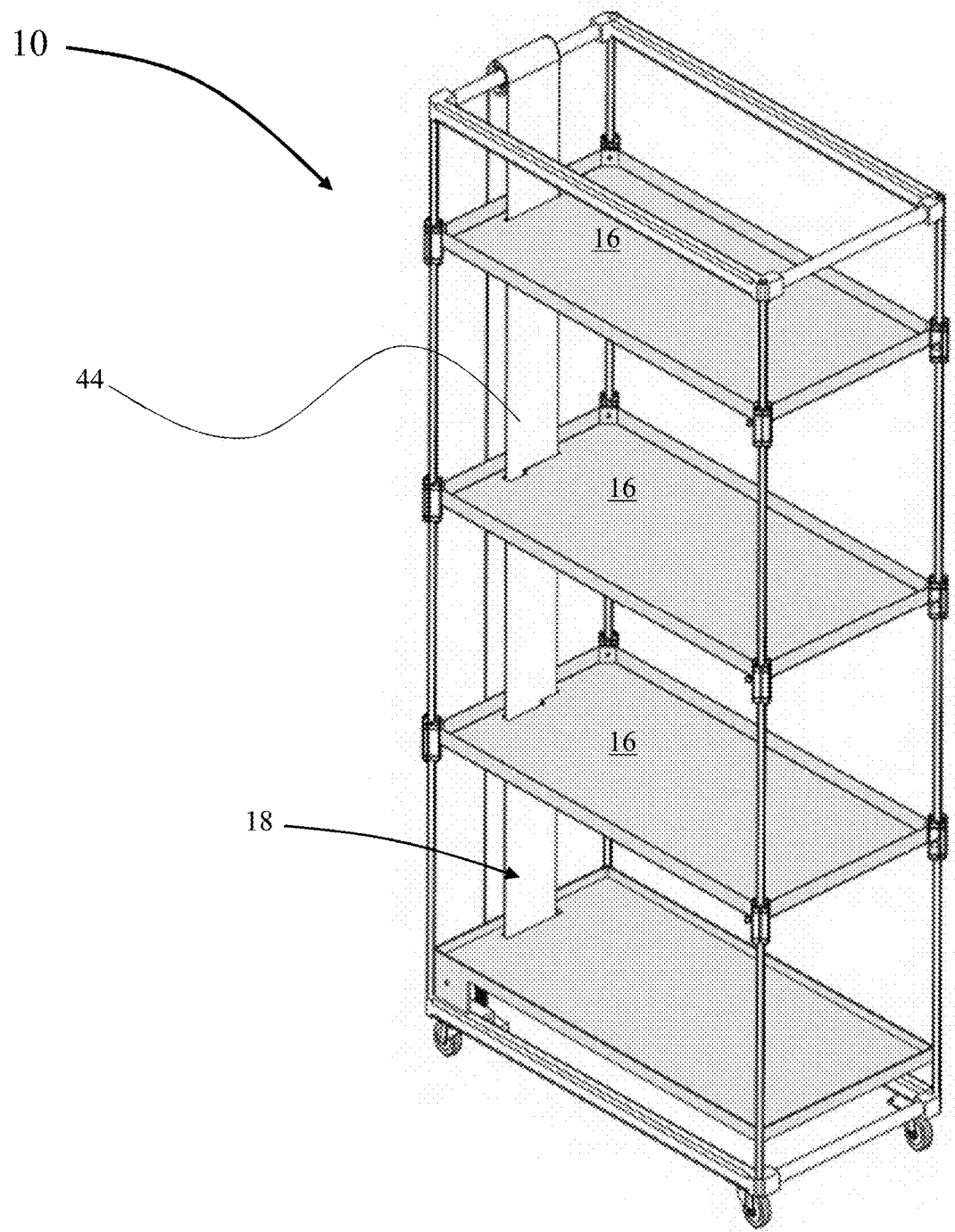
FIG. 9 is a perspective view of a multi-shelf cart of the present disclosure having a single belt drive engaged with one side of the shelves, according to an embodiment.

Referring now to FIG. 9, another embodiment of the lift mechanism 18 of the cart 10 is shown. In this embodiment, each movable shelf 16 is driven by only one belt 44 on one side of the shelves 16 of the cart 10.

Figure 10:
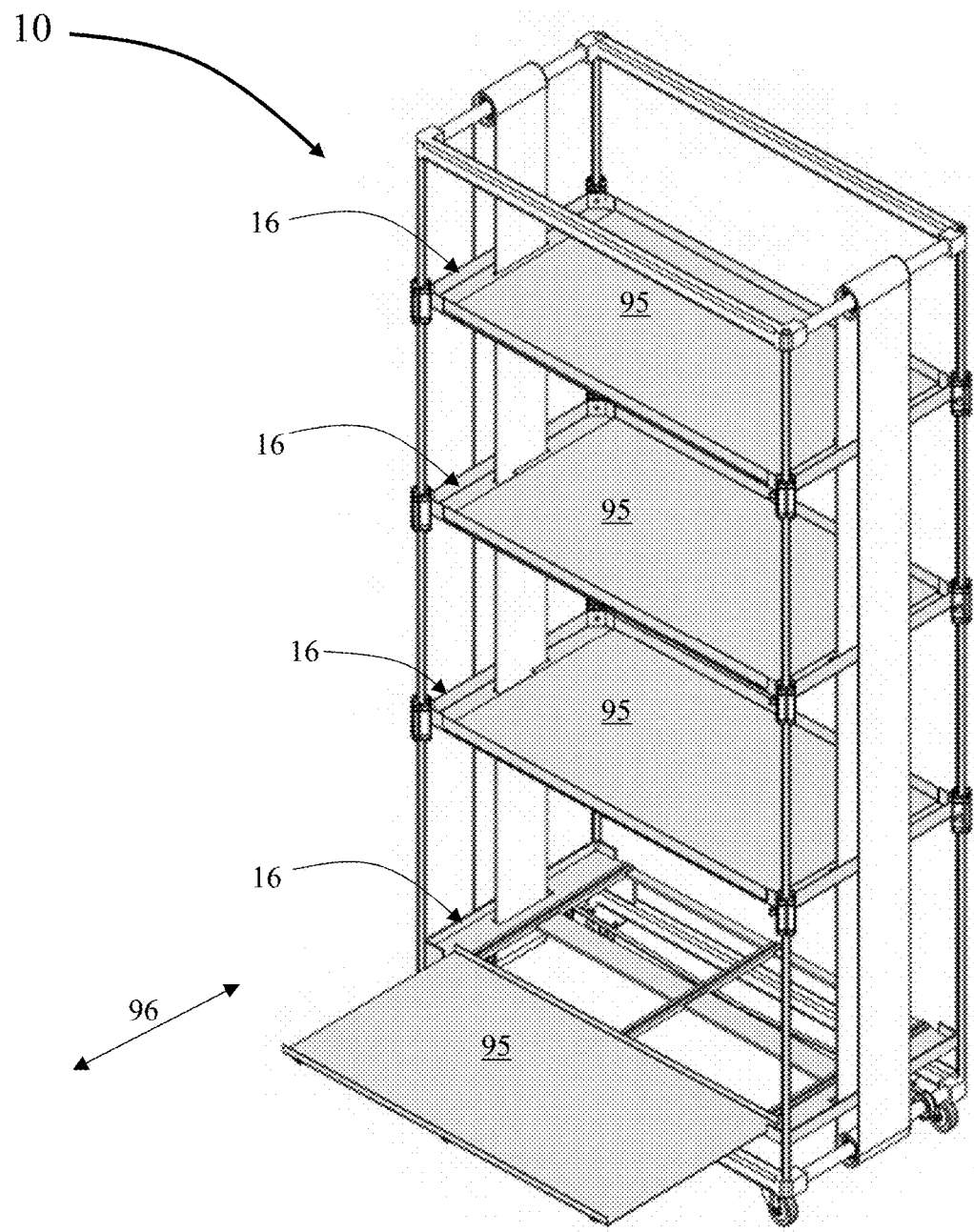
FIG. 10 is a perspective view of a multi-shelf cart of the present disclosure including slidable trays on each shelf, according to an embodiment.

Referring now to FIG. 10, another embodiment of the cart 10 is provided. In this embodiment, a slidable tray is disposed on each shelf 16. The slidable tray 95 provides the storage area on each shelf and is configured to slide in direction 96 to improve the accessibility of the storage area for loading and unloading of articles to and from the cart 10.

In some embodiments of the multi-shelf storage unit of the present disclosure (e.g. cart 10), the actuator may not be powered by an energy storage on the cart. For example, an electrical power source for driving the reversible electrical motor may be externally supplied, as can compressed air for driving one or more pneumatic actuators. For example, the lift mechanism may include pneumatic actuators instead of electrical motors to supply the force for lifting, supporting, and lowering multiple shelves. For instance, one or more pneumatic linear actuators may be used on the bottom of the cart. The pneumatic linear actuators may be connected to the shelves using a transmission system, such as using pulley/cable transmission or rigid linkages.

While a rechargeable battery supplying electrical power to a reversible electric motor is described, the power bank may be a power bank for other forms of power and the actuator may be one configured to convert this form of power into motion. For example, a pressurized gas cylinder may be used in place of the battery, and pneumatic actuators. The pressurized gas cylinder may have the advantage of faster recharge rate and overall lower downtime over the electrical power bank. For example, if a pressurized gas cylinder is included in the cart, a mobile robot, which includes a pneumatic source, may approach the cart, couple to the gas cylinder on-board the cart through a pneumatic port, and quickly pressurize the cylinder for further shelf lifting actuations.

The energy storage may be sufficient for several cycles of moving the shelves, before being recharged, such as by recharging batteries or refilling compressed gas.

Actuation based on stored energy may be triggered by an external actor, such as a robot. The trigger may be electrical or may be purely mechanical.

It should be added that a person skilled in the art can appreciate that many different embodiments are available to realize the different parts of the proposed multi-shelf system including the lift mechanism, the power source, and the actuation system.

In some embodiments, the multi-shelf storage unit includes a pneumatic or electrical actuator.

Figure 11:
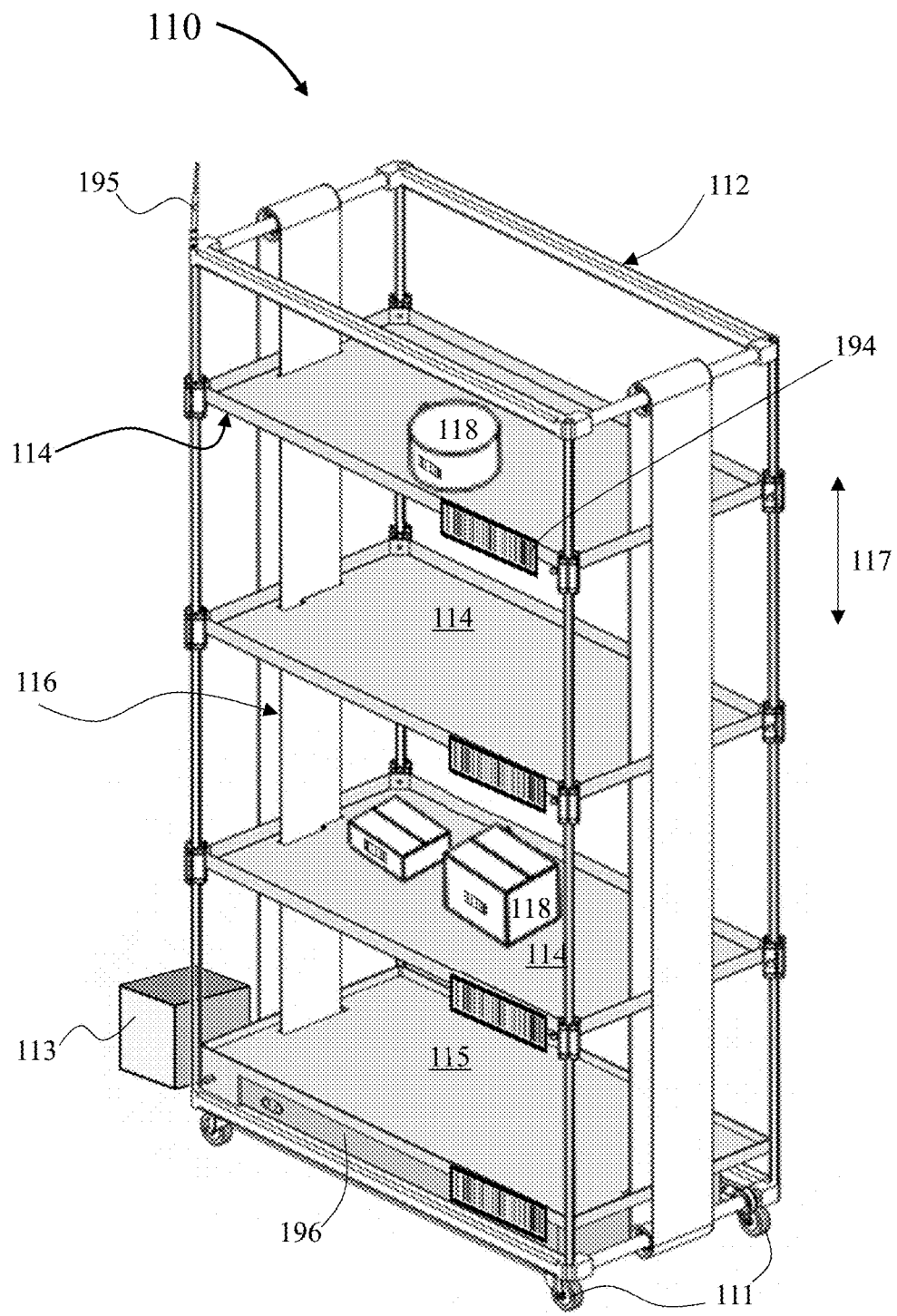
FIG. 11 is a perspective view of a multi-shelf storage unit of the present disclosure, according to an embodiment.

Referring now to FIG. 11, a multi-shelf storage unit for storage of a plurality of articles according to a first disclosed embodiment is shown generally at 10.

The storage unit 110 includes a frame 112. The frame 112 may be a wheeled frame or otherwise mobile frame, which may facilitate transportation of the storage unit 110. In the embodiment shown, the frame 112 is a wheeled frame where a plurality of caster wheels 111 are disposed on the frame 112 to facilitate mobility of the storage unit 10, but in other embodiments, the frame may be stationary.

The storage unit 110 includes a plurality of vertically spaced apart shelves 114. The shelves 114 are movably disposed on the frame 112 and are configured to provide storage areas for a plurality of articles 118. Each shelf 114 may be moveably coupled to the frame 112.

Each shelf 114 is configured to move in a vertical direction 117.

The storage unit 110 also includes a lift mechanism 116. The lift mechanism 116 is disposed on the frame 112. The lift mechanism 116 is coupled to the plurality of shelves 114 to drive the shelves 114 in vertical direction 117. The lift mechanism 116 is configured to cause collapse and extension of the shelves 114 in vertical direction 117. Such collapse and extension may assist in an article loading or unloading process, for example by improving accessibility to one or more shelves 114.

The storage unit 110 may include a fixed shelf 115 disposed on the frame 112. The fixed shelf 115 provides a storage area but is not movable.

In an embodiment, the storage unit 110 may be used to load articles to the storage unit 110 by sequentially filling the shelves 114 from the highest shelf to the lowest shelf and may be used to unload articles from the storage unit 110 by sequentially emptying the shelves 114 from the lowest shelf to the highest shelf. In doing so, the storage unit 110 may facilitate loading, transporting, storing, and unloading articles. In a particular case, the storage unit 110 may facilitate loading, transporting, storing, and unloading a plurality of articles having an identical attribute.

The lift mechanism 116 may be driven using an actuator 113 (which may also be referred to a lift mechanism actuator). The actuator 113 may be a reversible electrical motor.

The actuator 113 may be disposed on the frame 112 as shown in FIG. 11. In other embodiments, the actuation of the lift mechanism 116 may be supplied from an external device. The external device may be, for example, a human-operated hand crank or a robotic device (e.g. robotic device 130 of FIG. 12).

The command signals for actuating the actuator 113, which is onboard the storage unit 110 in the embodiment shown in FIG. 11, may be received from a remote device through a Wi-Fi module 195 disposed on the frame 112. In other cases, the command signals for actuating the actuator 113 may be generated onboard the unit 110 using, for example, a user interface unit or a control system (both are not shown in the figures).

The storage unit 110 may further include an identifier tag 194 disposed on each shelf 114. The identifier tag 194 may facilitate tracking the articles 118 that are being loaded to or unloaded from each shelf 114. The identifier tag 194 may be a barcode, QR code, or radio frequency identifier (RFID) tag.

The Wi-Fi module 195 further may be configured to send or receive signals to and from a warehouse management system (WMS) regarding tracking the articles 118 on the storage unit 110.

The storage unit 110 may also include a power bank unit 196 disposed on the frame 112. The power bank unit 196 is configured to supply power for the electrical components onboard the storage unit 110. The power bank unit 196 may supply power for other external electrical devices such as a mobile robotic loader/unloader unit (e.g. robotic device 130 of FIG. 12).

Each article 118 may include a unique identifier (for example, an identifier similar to identifier tag 194) to facilitate tracking of the article 118.

The storage unit 110 may be configured to be pulled by an external cart-pulling unit such as an automated guided vehicle (AGV). In other embodiments, the storage unit 110 may include drive wheels to move the storage unit 110 in accordance with an autonomous navigation system. The autonomous navigation system may be an onboard system or may include onboard components in communication with one or more external components.

Figure 12:
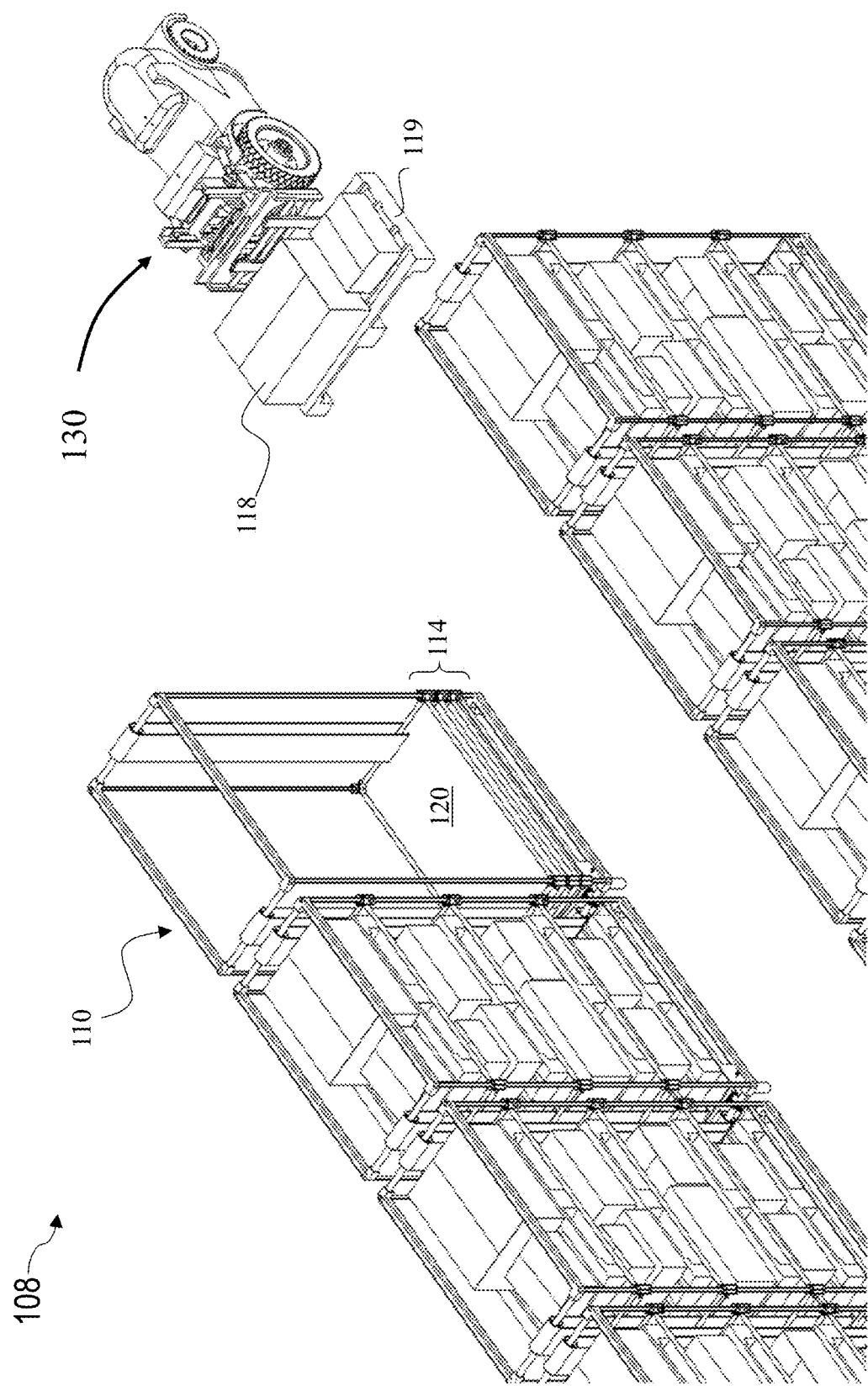
FIG. 12 is a perspective view of an embodiment of a material handling system of the present disclosure in a warehouse environment, according to an embodiment.

Referring now to FIG. 12, an automated system 108 for material handling is shown according to a first disclosed embodiment.

The system 108 comprises at least one multi-shelf storage unit 110 with generally movable shelves 114 and a robotic unit 130 configured to load or unload at least one article 118 to or from the storage unit 110. The loader/unloader unit 130 may be configured to carry at least one article 118 on a pallet 119.

In some cases, the robotic unit 130 may be configured to perform both loading and unloading of articles 118.

While the embodiment shown in FIG. 12 is in a warehousing environment, the automatic material handling system 108 of the present disclosure may be used in other environments, such as a greenhouse nursery or a medical facility.

Figure 13:
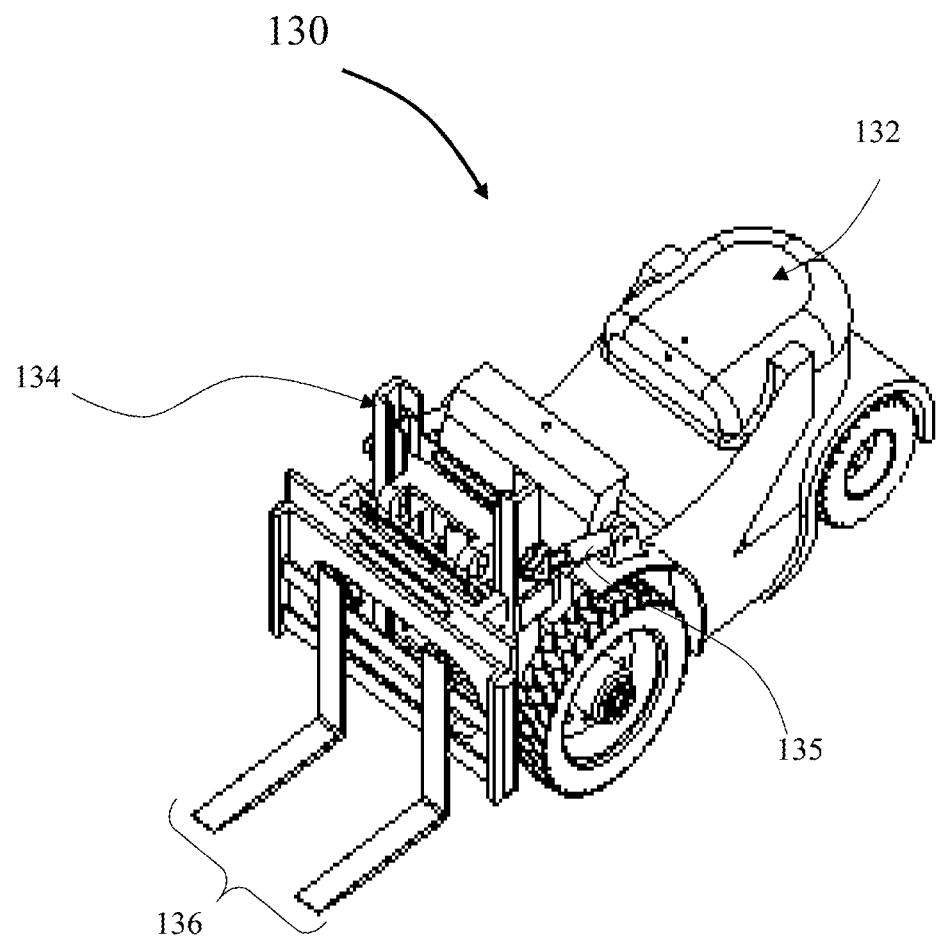
FIG. 13 is a perspective view of an embodiment of a loader/unloader unit of the material handling system of FIG. 12.

Referring now to FIG. 13, an embodiment of the robotic loader/unloader unit 130 of FIG. 12 is shown.

The unit 130 comprises a base 132, a robotic manipulator 134 disposed on the base 132, and a loading or unloading end effector 136 disposed on the robotic manipulator. The end effector 136 is configured to engage with an article 118 for the purpose of loading, unloading or transporting the article 118.

Unit 130 includes at least one manipulator actuator 135 configured to actuate the robotic manipulator 134. The unit 130 also includes at least one primary end effector actuator (not shown in figures) configured to actuate the loading or unloading end effector 136.

The base 132 may be a mobile base capable of moving autonomously within a workspace. At least one actuator (not shown in figures) may be disposed on the base 132 to cause controlled mobility of unit 130.

The unit 130 may include navigation or perception sensors (not shown in figures) to provide navigation and perception, respectively. The navigation and perception sensors may include, for example, LiDAR, motor encoders, ultra-wide band (UWB), or vision cameras.

The unit 130 further includes a control unit (not shown in figures) configured to receive signals from sensors and send a command to the actuators of unit 130.

Unit 130 further includes a power unit (not shown in figures) such as a rechargeable battery configured to supply power for different components of unit 130.

Figure 14:
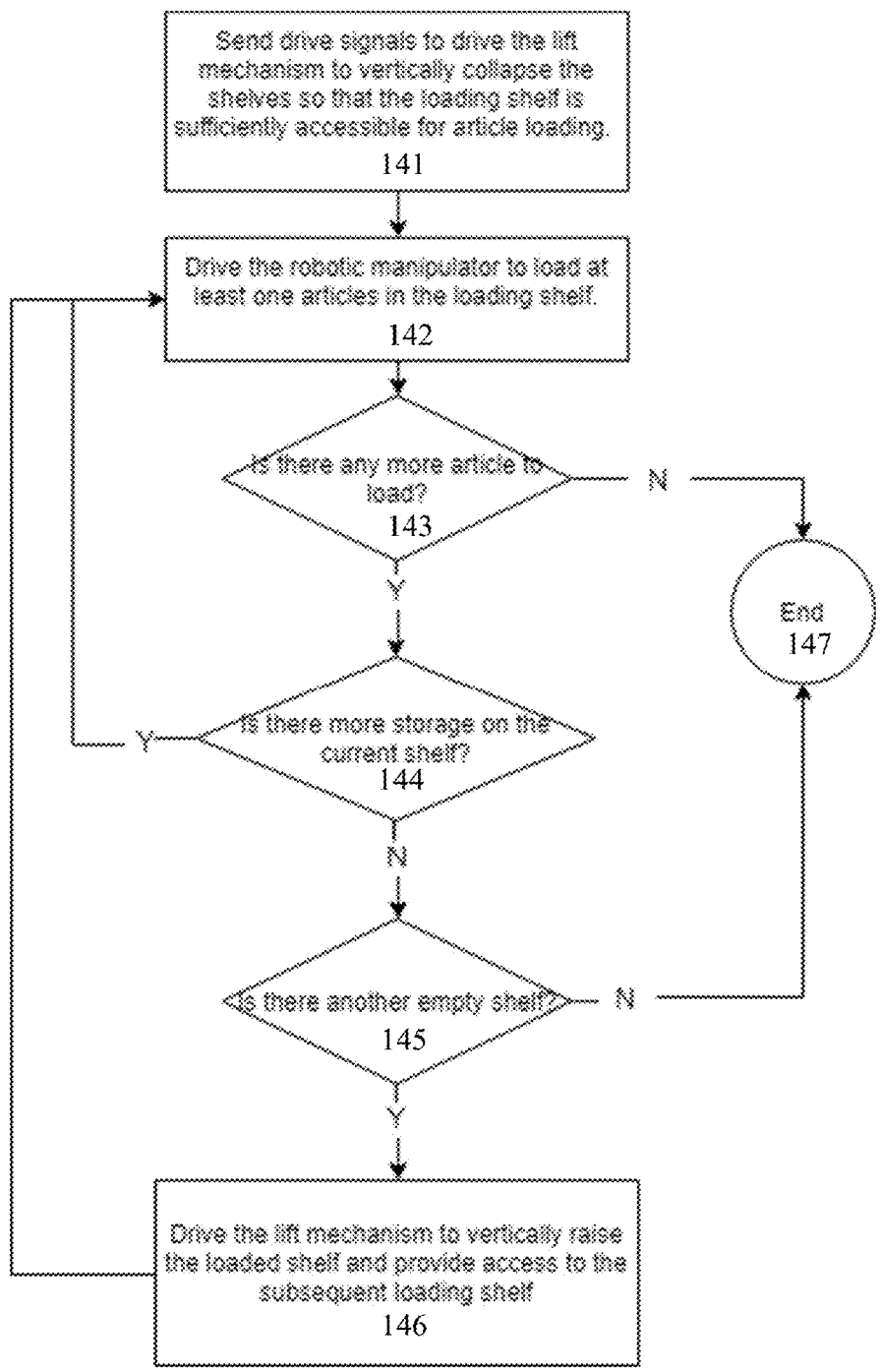
FIG. 14 is a flow diagram of an automatic loading process of the present disclosure, according to an embodiment.

Referring now to FIG. 14, shown therein is a flowchart diagram showing an embodiment of directions for an automatic loading process 140 of the material handling system of the present disclosure.

A series of perspective views illustrating the automatic loading process 140 of a plurality of articles to the multi-shelf storage unit 110 using the loader unit 130 is shown in FIGS. 15A to 15D as an example of the loading operation 140 using the proposed automatic material handling system.

The loading process 140 starts at block 141 by driving the lift mechanism of the multi-shelf unit to cause the collapse of the shelves so that the loading shelf, which is the highest empty storage shelf, is sufficiently accessible for article loading using the automatic loader unit.

For this step, the lift mechanism may be driven by sending drive signals to an actuator disposed on the storage unit, or by automatically engaging an actuator disposed on the automatic loader unit and sending drive signals to the actuator.

At block 142 the robotic manipulator of the robotic loader unit is driven to load at least one article to loading shelf of the storage unit.

Figure 15B:
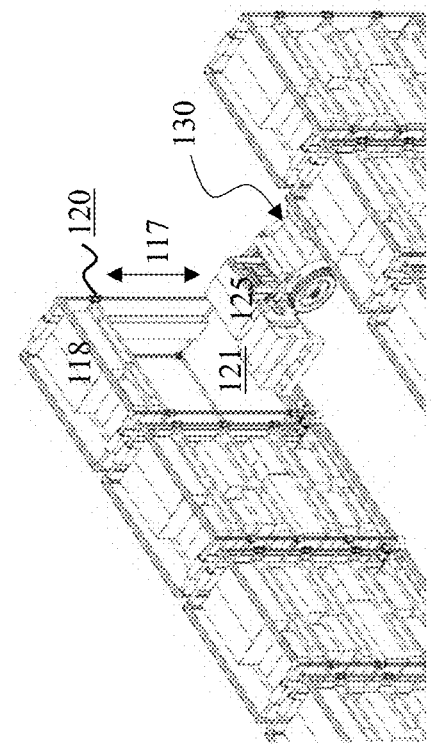
FIG. 15A to 15D are perspective views illustrating an embodiment of the automatic loading process of FIG. 14.
Figure 15D:
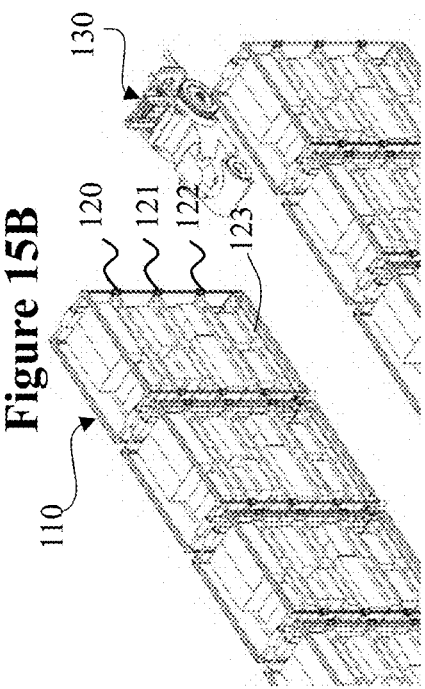
Figure 15A:
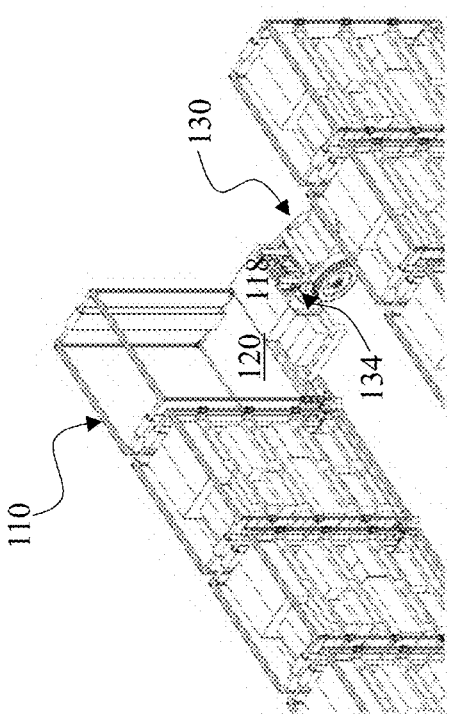

Referring to FIG. 15A, the storage shelves of the stationary storage unit 110 are collapsed and the loading shelf 120 is sufficiently accessible to the loading end effector of the loader unit 130. The automatic loader unit 130 is driven to move to a suitable location in front of the stationary storage unit 110 while carrying the pallet of articles 118 and the robotic manipulator 134 is driven to automatically load the articles 118 to the loading shelf 120 of the storage unit 110.

At block 143, availability of more articles for loading is checked.

If there are more articles to be loaded, directions 140 proceeds to block 144.

If there are no more articles to be loaded, the loading process 140 is finished at block 147.

At block 144, the storage area on the current shelf (loading shelf) is checked.

If there is more storage area on the current shelf the directions 140 proceeds to block 142 to drive the loader unit to load more articles into the current shelf, If the current shelf is full (i.e. there is no more storage area on the current shelf), the directions 140 proceeds to block 145.

At block 145, the process 140 checks if there is an empty shelf from the subsequent shelves in the storage unit.

At block 145, if an additional empty shelf exists on the storage unit, the process of article loading 140 proceeds to block 146.

At block 146, the lift mechanism is driven (similar to block 142 but in an opposite direction) to raise the filled shelf or shelves and provides access for the next empty shelf.

Referring now to FIG. 15B, the pallet of articles 118 is loaded to the highest shelf 120 and no additional storage is left on the shelf 120. Thus, the lift mechanism is driven to raise the shelf 120 in direction 117 and cause the subsequent shelf 121 to be accessible for the loading of the subsequent pallet of articles 125 using the loading unit 130.

Figure 15C:
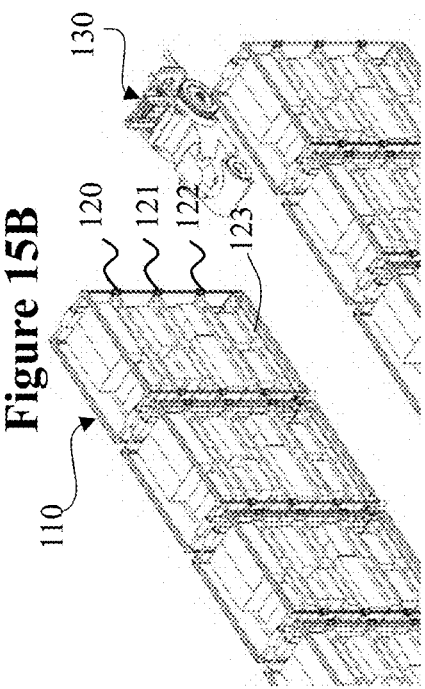

Referring now to FIG. 15C, the shelves 120 to 122 of the storage unit 110 are automatically loaded with articles and the last empty shelf 123 is available and accessible for loading the pallet of articles 127 using the loader unit 130. Then, the second shelf 167 is fully loaded with a plurality of articles 189.

Referring again to FIG. 14, at block 145, if all of the shelves of the storage unit are filled, the loading process is finished at block 147. Referring now to FIG. 15D, all of the shelves 120 to 123 of the storage unit 110 are automatically filled with a plurality of palleted articles and hence the loading process is done.

Figure 16:
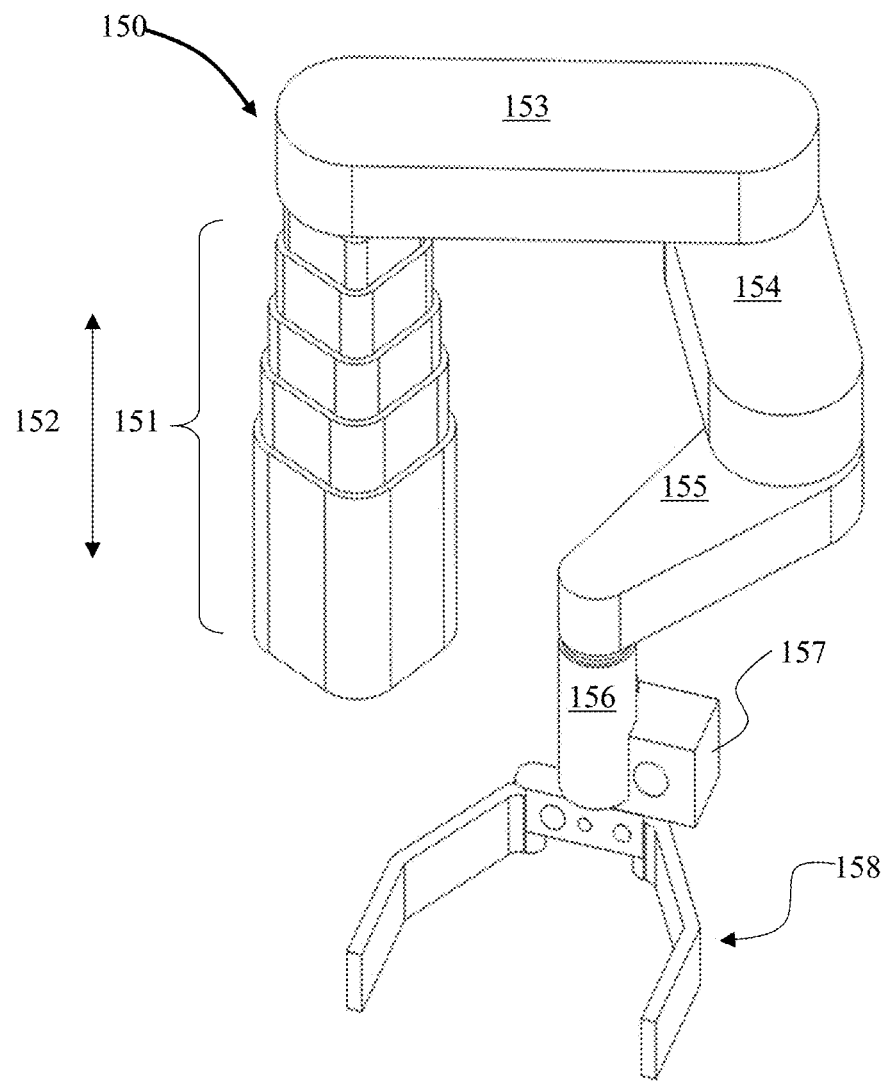
FIG. 16 is a perspective view of the loader/unloader unit of the present disclosure, according to another embodiment.

Referring now to FIG. 16, a loader/unloader unit, according to another disclosed embodiment, is shown generally at 150.

The unit 150 comprises a stationary base 151, an articulated manipulator comprising of a plurality of articulated and actuated links 153, 154, 155, and 156, and a loading or unloading end effector 158.

In the embodiment shown, the base 151 comprises an actuated telescopic column configured to be driven in direction 152.

Unit 150 further includes a plurality of sensors such as a vision camera 157 and actuator encoders (not shown in images) to provide navigation and perception signals for the unit 150.

The unit 150 further includes a control unit (not shown in figures) configured to receive signals from sensors and send a command to the actuators of unit 150.

Unit 150 further includes a power unit (not shown in figures) such as a rechargeable battery configured to supply power for different components of unit 150.

Figure 17:
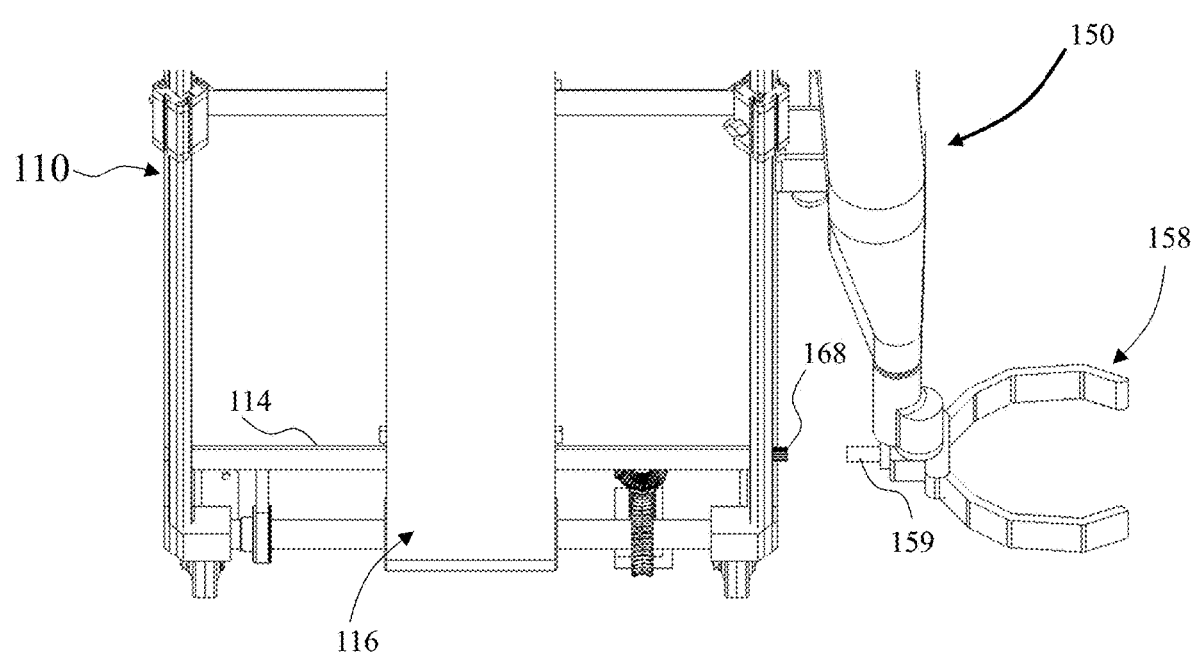
FIG. 17 is a close-up perspective view of the loader/unloader unit of FIG. 16 configured to actuate the lift mechanism of an embodiment of the storage unit of the present disclosure.

Referring now to FIG. 17, the unit 150 further includes a second end effector 159 configured to engage with the lift mechanism 114 of a storage unit 110 through an input shaft

168 to provide actuation force for the drive of the lift mechanism 114 and the movement of the shelves on the storage unit 110.

Figure 18:
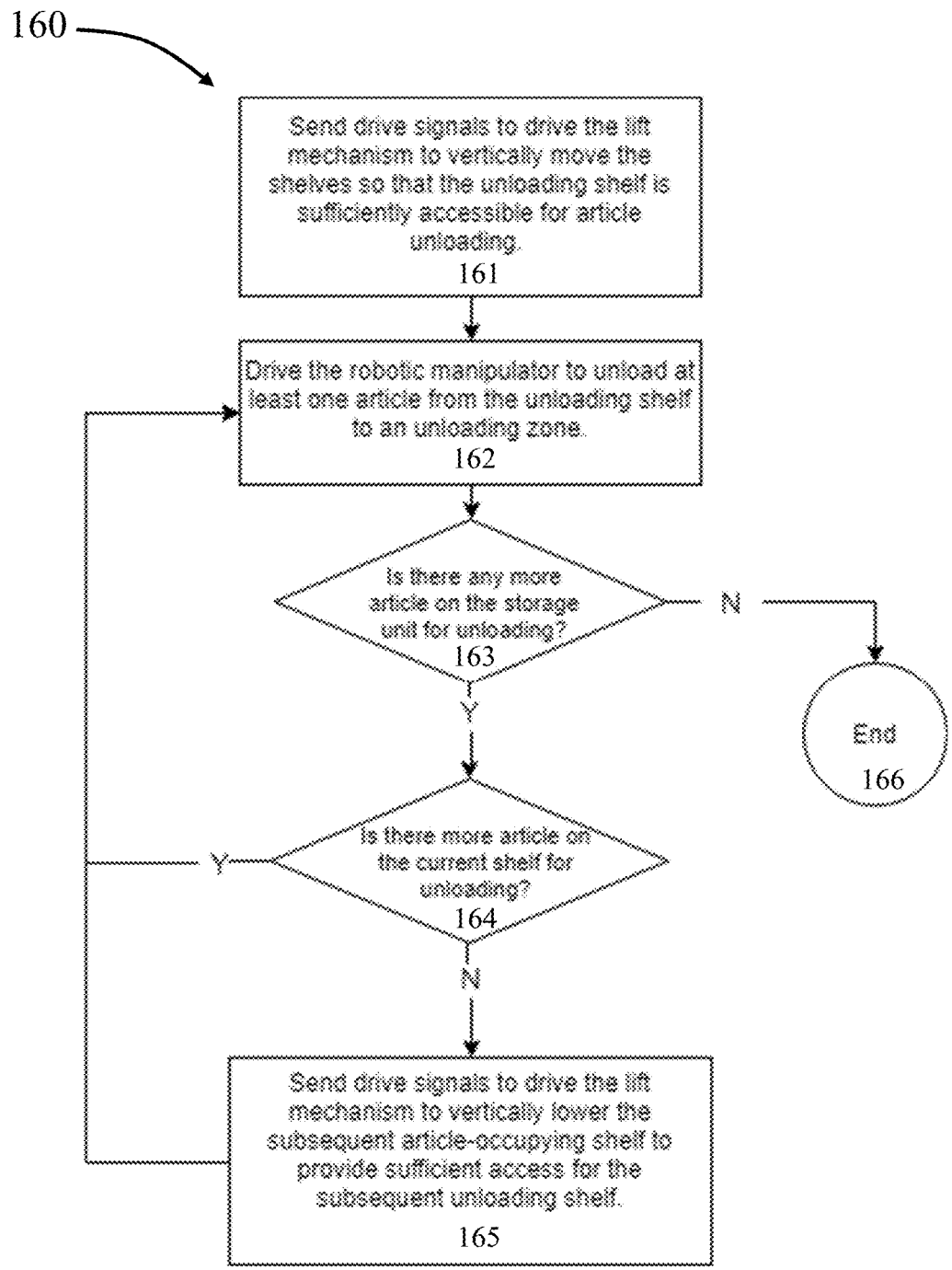
FIG. 18 is a flow diagram of an automatic unloading process of the present disclosure, according to an embodiment.

Referring now to FIG. 18, shown therein is a flowchart diagram showing an embodiment of directions 160 for automatic unloading process of the material handling system of the present disclosure.

A series of perspective views illustrating the automatic unloading process of a plurality of articles from the multi-shelf storage unit 110 to an unloading zone 170 using the unloader unit 150 are shown in FIGS. 19A to 19J as an example of the unloading operation 160 using the proposed automatic material handling system.

The unloading process 160 starts at block 161 by driving the lift mechanism of the multi-shelf unit to vertically move the shelves so that the unloading shelf, which is the lowest article-occupying shelf, is sufficiently accessible for article unloading using the automatic unloader unit. For this step, the lift mechanism may be driven by sending drive signals to an actuator disposed on the storage unit, or by automatically engaging an actuator disposed on the automatic loader unit and sending drive signals to the actuator.

At block 162 the robotic manipulator of the robotic unloader unit is driven to unload at least one article from the unloading shelf of the storage unit to an unloading zone.

Figure 19A:
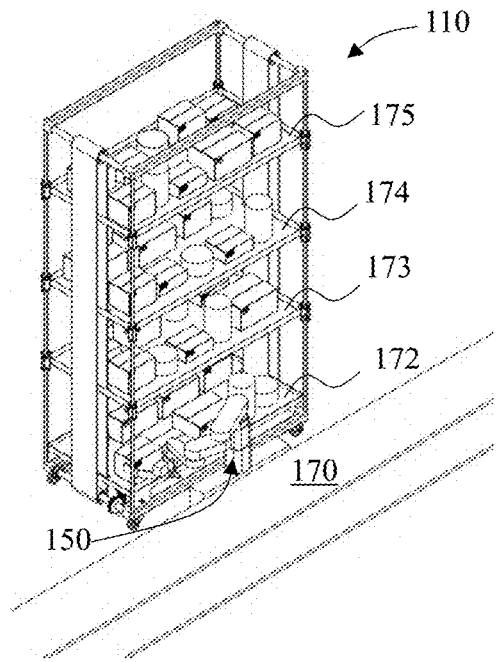

Referring to FIG. 19A, the storage unit 110 is a wheeled storage unit and the shelves of the storage unit 172 to 175 are filled with a plurality of articles. The shelf 172 is sufficiently accessible to the unloading end effector of the unloader unit 150. In the embodiment shown in FIG. 19, the base of the unloader unit 150 is not mobile and is fixed to the ground. In other embodiments, the unloader unit 150 may be disposed on a wheeled chassis to facilitate the mobility of the unloader unit 150. The automatic unloader unit 150 is driven to grasp the first article from the plurality of articles on the shelf 172.

Figure 19B:
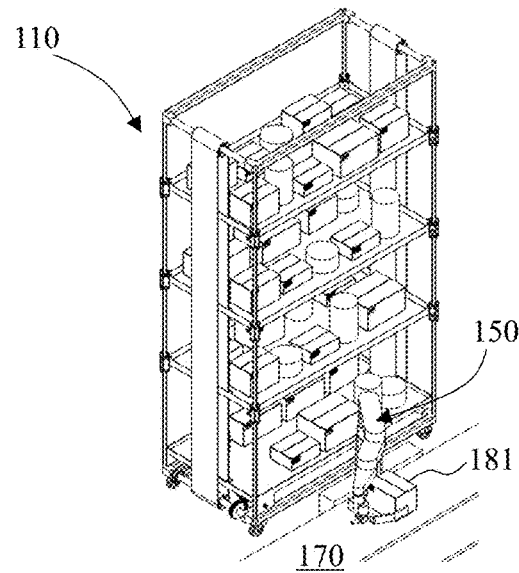

Referring to FIG. 19B, the unloader unit 150 unloads the first article 181 to the unloading zone 170. In the embodiments shown in FIG. 19, the unloading zone 170 is a conveyor belt to further transport the unloaded articles to a different destination.

At block 163, the process checks the availability of more articles for unloading.

If there are more articles for unloading, directions 160 proceeds to block 164.

If there are no more articles for unloading, the unloading process is finished at block 166.

At block 164, the process checks the existence of the unloading article on the current unloading shelf.

If there is another unloading article on the current unloading shelf, directions 160 proceeds to block 162 to drive the unloader unit to unload the unloading article to the unloading zone.

Figure 19C:
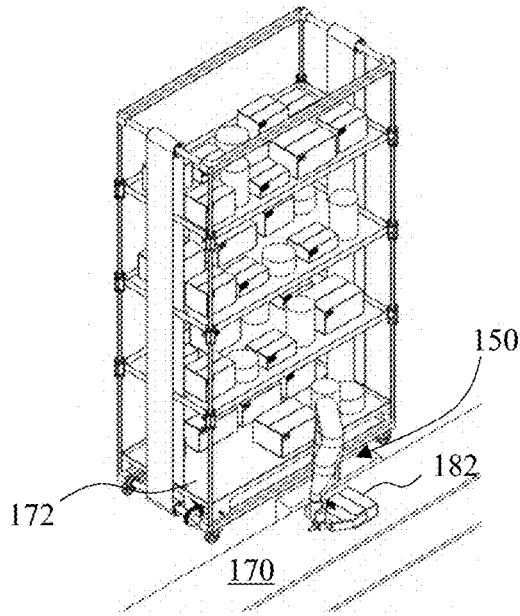

Referring to FIG. 19C, the unloader unit 150 unloads the second article 182 on the unloading shelf 172 to the unloading zone 170.

Figure 19D:
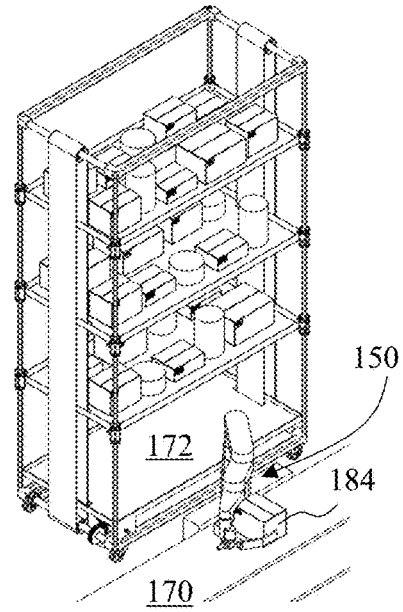

Referring to FIG. 19D, the unloader unit 150 unloads the last article 184 on the unloading shelf 172 to the unloading zone 170.

Referring again to FIG. 8, at block 164, if the unloading shelf is empty the directions 160 proceeds to block 165.

At block 165, the lift mechanism is driven to lower the subsequent article-occupying shelf to provide access for the next unloading shelf.

Figure 19E:
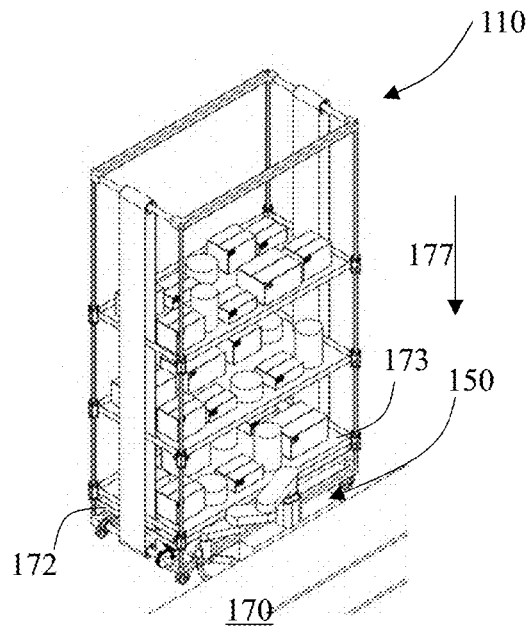

Referring to FIG. 19E, the second end effector of robotic unloader unit 150 is engaged with the lift mechanism of the storage unit 110 to actuate the lift mechanism and lower the subsequent unloading shelf 173 in direction 177 to provide access to the subsequent unloading articles on the unloading shelf 173 for the robotic manipulator of the unloader unit 150.

Figure 19F:
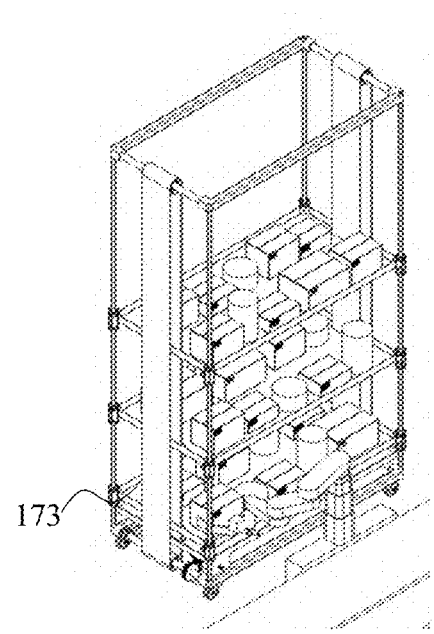
Figure 19G:
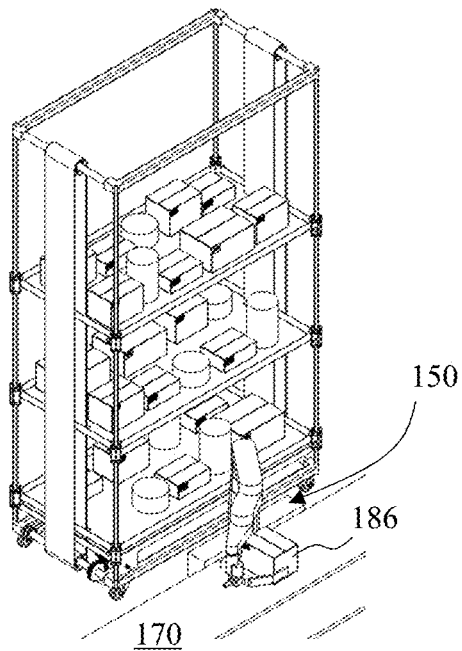

Referring to FIGS. 19F and 19G, the unloader unit 150 unloads the first article 186 from the unloading shelf 173 to the unloading zone 170.

Figure 19H:
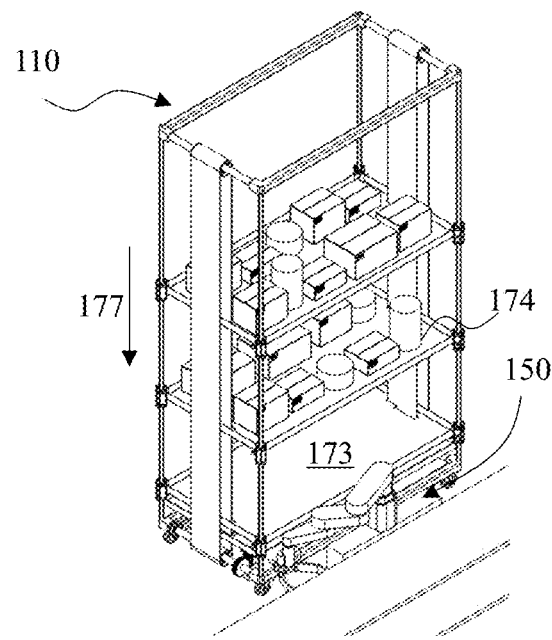

Referring to FIG. 19H, the plurality of articles from the unloading shelf 173 are unloaded and the unloading shelf is emptied. The robotic unloader unit 150 drives the robotic manipulator to engage the secondary end effector to further drive the lift mechanism of the storage unit 110 to lower the subsequent article-occupied shelf 174 to provide access to the unloading articles on the subsequent unloading shelf 174 for the unloader unit 150.

Referring to FIG. 19I, the plurality of unloading articles on the unloading shelf 174 are unloaded the secondary end effector of the robotic unloader unit 150 is engaged with the lift mechanism of the storage unit 110 to lower the subsequent and last article-occupying shelf 175 in direction 177.

Referring to FIG. 19J, the robotic unloader unit 150 unloads the last unloading article 188 from the last unloading shelf 175 of the multi-shelf storage unit 110 to the unloading zone 170 and the ends the unloading process.

Figure 20:
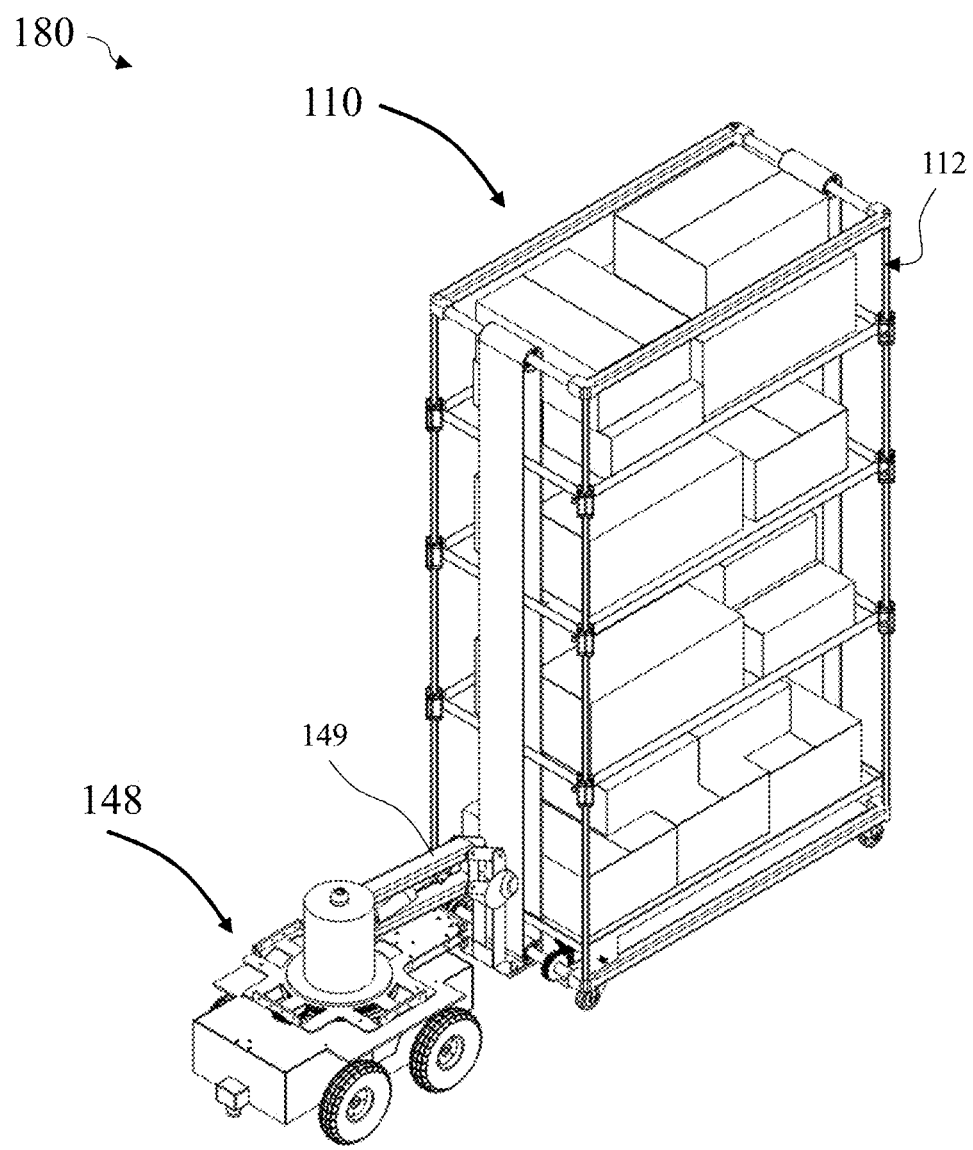
FIG. 20, is a perspective view of a system for transporting the mobile storage unit of FIG. 19, according to an embodiment.

Referring now to FIG. 20, shown therein is an embodiment of a system 180 for transporting a mobile storage unit 110.

In this embodiment, the storage unit 110 is pulled using a cart-pulling mobile robot 148.

The cart-pulling robot 148 is configured to attach to the frame 112 of the storage unit 110 using a docking arm 149. The cart-pulling robot 148 is also configured to assist the storage unit 110 in automatic navigation and transportation from one location to another.

In other embodiments, the mobile storage unit 110 may be transported using a human operator or a cart-pulling truck.

The system 180 of FIG. 20 may be used before the loading or unloading process of FIG. 14 and FIG. 18, respectively, to transport the storage unit 110 to a suitable and desirable location for loading or unloading processes.

Figure 21A:
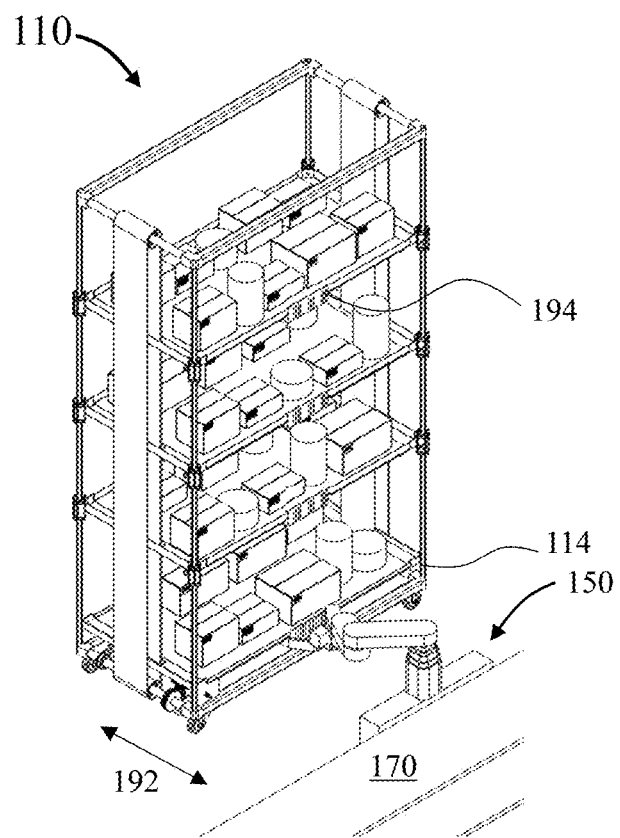
FIGS. 21A and 21B are perspective views of another embodiment of the material handling system of the present disclosure where the unloading unit is further configured to move trays of a storage unit in a lateral direction.
Figure 21B:
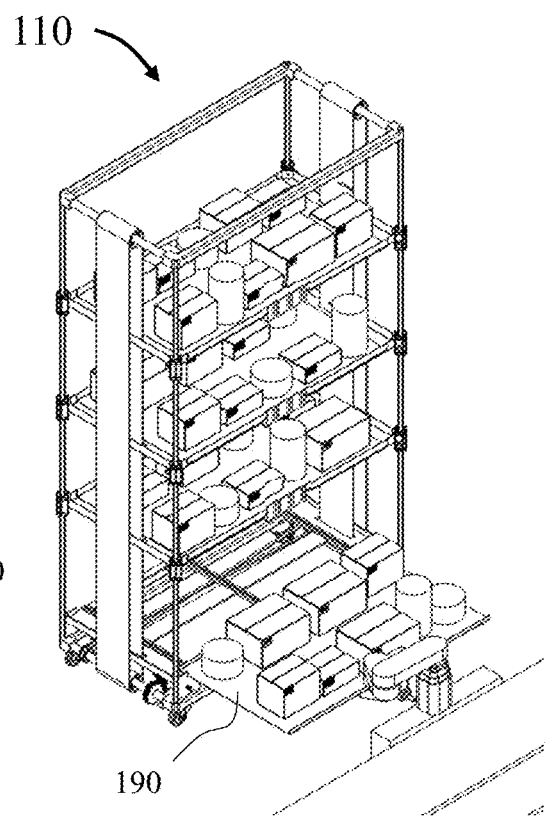

Referring now to FIGS. 21A and 21B, shown therein is another embodiment of the cart 110.

In this embodiment, a slidable tray 190 is disposed on each shelf 114.

The slidable tray 190 provides the storage area on each shelf and is configured to slide in direction 192 to improve the accessibility of the storage area for loading and unloading of articles to and from the cart 110.

The robotic loader or unloader unit 150 is configured to engage with the tray 190 to cause movement of the tray 190 in direction 192 to change the accessibility of the storage area on each shelf 114 in lateral direction 192.

In the embodiment shown, a gripper end effector, which is the loading or unloading end effector of unit 150, is used to grab the tray 190 and articulation of the robotic manipulator of unit 150 causes the movement of the tray in direction 192.

Each shelf 114 may include an identifier tag 194 disposed thereon. The identifier tag 194 may facilitate identification and tracking of the storage shelves and, subsequently, the stored articles on the shelves. The loader/unloader unit may scan or otherwise read the identifier tag 194 on the shelves 114 and on the articles (which may also include a barcode or other identifier) while performing the loading/unloading process and update a WMS with data regarding the articles in the warehouse.

Figure 22:
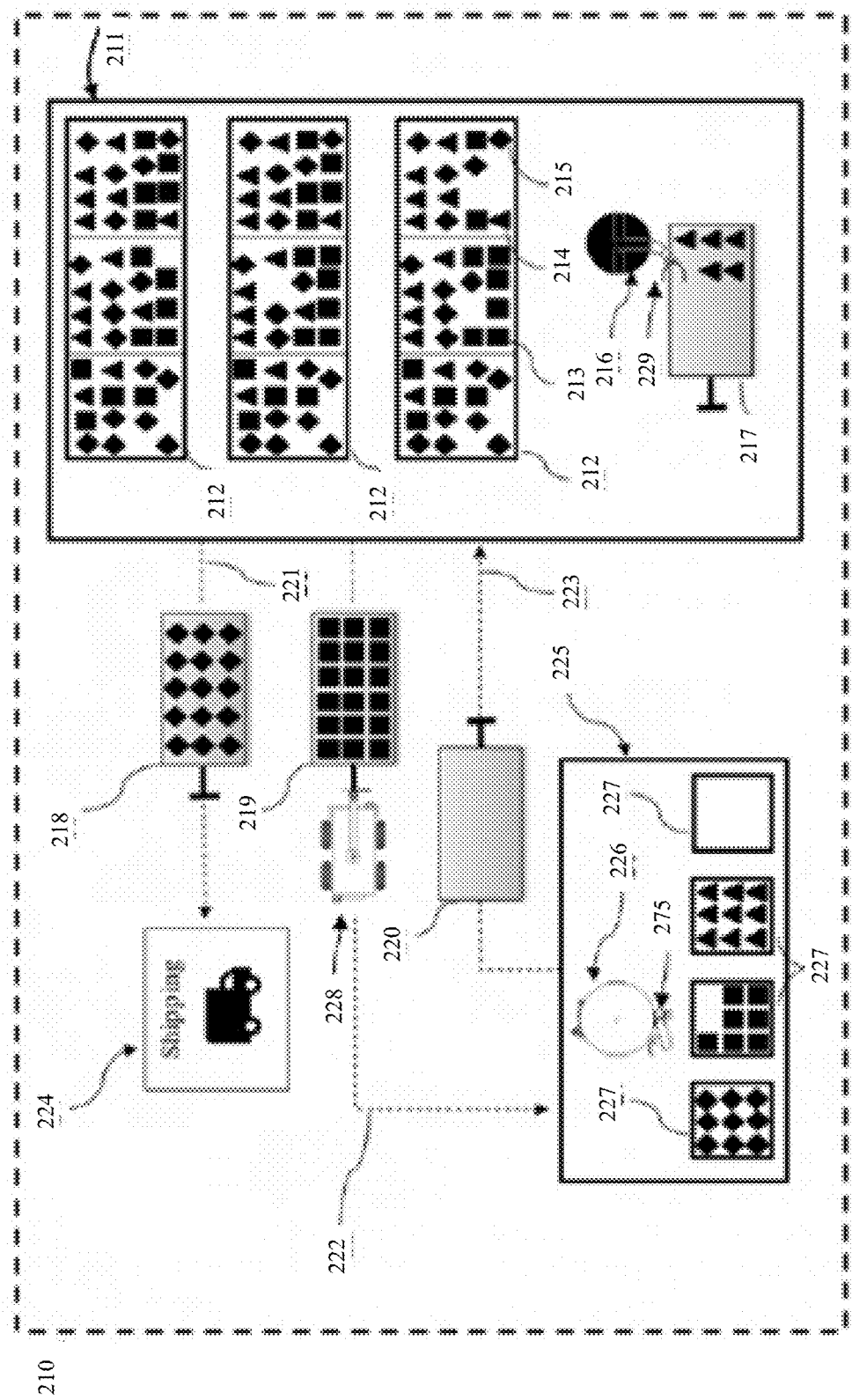
FIG. 22 is a schematic diagram of a system for distribution of a plurality of articles, according to an embodiment.

Referring now to FIG. 22, shown therein is a system 10 for distribution of a plurality of articles according to an embodiment.

The system 210 includes a primary facility 211. The primary facility 210 is a location which houses a plurality of articles.

The system 210 also includes a plurality of multi-shelf carts 217, 218, 219, and 220. Each cart is configured to temporarily store a plurality of articles to facilitate transportation of the plurality of articles through transportation routes 221, 222 and 223.

The system 210 includes a shipping facility 224. The shipping facility 224 is a location which is used to ship articles to a further destination The system 210 also includes a secondary facility 225. The secondary facility 225 is a location which provides secondary storage for all or a subset of the articles.

In the embodiment shown in FIG. 22, the primary facility 211 is an inventory warehouse that stores a plurality of warehouse articles. In other embodiments, the primary facility 211 may be a production facility that produces a plurality of articles with different attributes.

The primary facility 211 may further include a plurality of storage racks 212 to organize the storage space of the plurality of articles in the primary facility 211. The plurality of articles in the primary facility 211 includes articles with different logistic attributes such as article-a 213, article-b 214, and article-c 215, which are disposed on the storage racks 212 of the primary facility 211.

Each differentiating logistic attribute may be defined by an attribute associated with a plurality of articles that justifies or manages handling (e.g. loading, transporting, unloading) of articles having that particular attribute at the same time or in the same manner. Examples of a logistic attribute include, but are not limited to, article shipment date, article color, article shape, and article type.

In the embodiment shown in FIG. 22, the plurality of articles with different attributes are stored without particular organization or order on the storage racks 212.

In an embodiment, the multi-shelf cart of FIG. 22 (e.g. any one of carts 217, 218, 219, and 220) may be the storage unit 110 of FIG. 11.

Referring still to FIG. 22, the system 210 includes a plurality of multi-shelf carts 217 to 220 wherein each cart is configured to store and transport articles that have at least one identical attribute.

The primary facility 211 further includes a loader unit 216 configured to load a plurality of articles from the primary facility 211 to a multi-shelf cart 217.

The loader unit 216 comprises a robotic arm 229 configured to automatically load articles to each shelf of the multi-shelf cart 217.

The loader unit 216 may also include an end-effector configured to actuate the lift mechanism of the cart.

Due to the collapsible shelves of the described embodiment of the multi-shelf cart 217 the loader unit 216 is not required to work in elevations in order to access the upper shelves of the multi-shelf cart 217.

The loader unit 216 further may be stationary or mobile but in the embodiment shown in FIG. 22, the loader unit 216 is a mobile robotic unit.

Referring to FIG. 22, the process of collecting articles with identical logistic attribute (i.e. transporting articles form storage racks 212 to loader unit 216) can be performed manually by labor or automatically, such as by means of a logistic conveyor belt or a mobile robot.

Referring to FIG. 22, articles are transported to a destination facility based on their identical logistic attribute. The storage area on the multi-shelf cart 218 is occupied with a plurality of article-c 215. The multi-shelf cart 218 is self-propelled and is transported to a destination facility 224, which is a shipping facility, via the transportation route 221. Articles transported to the shipping facility 224 are further transported to a designated destination.

The multi-shelf cart 219 loaded with a plurality of article-a 213 is directed toward a destination facility 225, which is a secondary storage facility, by means of a cart-pulling unit 228 via route 222.

The destination facility 225 includes storage fields 227 configured to provide secondary storage area for a plurality of articles with an identical logistic attribute, and at least one unloader unit 226 configured to unload articles from a multi-shelf cart arriving at the facility 225 to the storage fields 227 using a robotic arm 275 disposed on the unloader unit 226. The storage fields 227 may be, for example, storage racks configured to house a plurality of articles that have at least one identical logistic attribute.

Due to the collapsible shelves of the described embodiment of the multi-shelf cart 222 the unloader unit 226 is not required to work in elevations in order to access upper shelves of the cart. The unloader unit 226 may include an end-effector configured to actuate the lift mechanism of the multi-shelf cart 222.

Once a cart is unloaded in the destination facility 225, the cart can be transported back to the primary facility 211. In the embodiment shown in FIG. 22, the multi-shelf cart 220 is unloaded in the facility 225 and is driving back towards the primary facility 211 via route 223.

Figure 23:
FIG. 23 is a flow diagram of a process for distributing stored articles having an identical logistic attribute using the systems of the present disclosure, according to an embodiment.

Referring now to FIG. 23, a flow diagram showing an embodiment of directions for distributing articles with at least one identical attribute from a primary storage to a destination facility is generally shown at 230.

The process starts by collecting articles with identical attribute from the primary storage at block 231.

At block 231, a plurality of articles with at least one identical logistic attribute are loaded to a multi-shelf storage cart using a loader unit at the primary facility.

At block 232 the loaded multi-shelf cart is transported to a destination facility such as a shipping facility or a secondary storage facility.

At block 233, the articles are unloaded from a multi-shelf cart to an unloading zone in the destination facility using an unloader unit.

Figure 24:
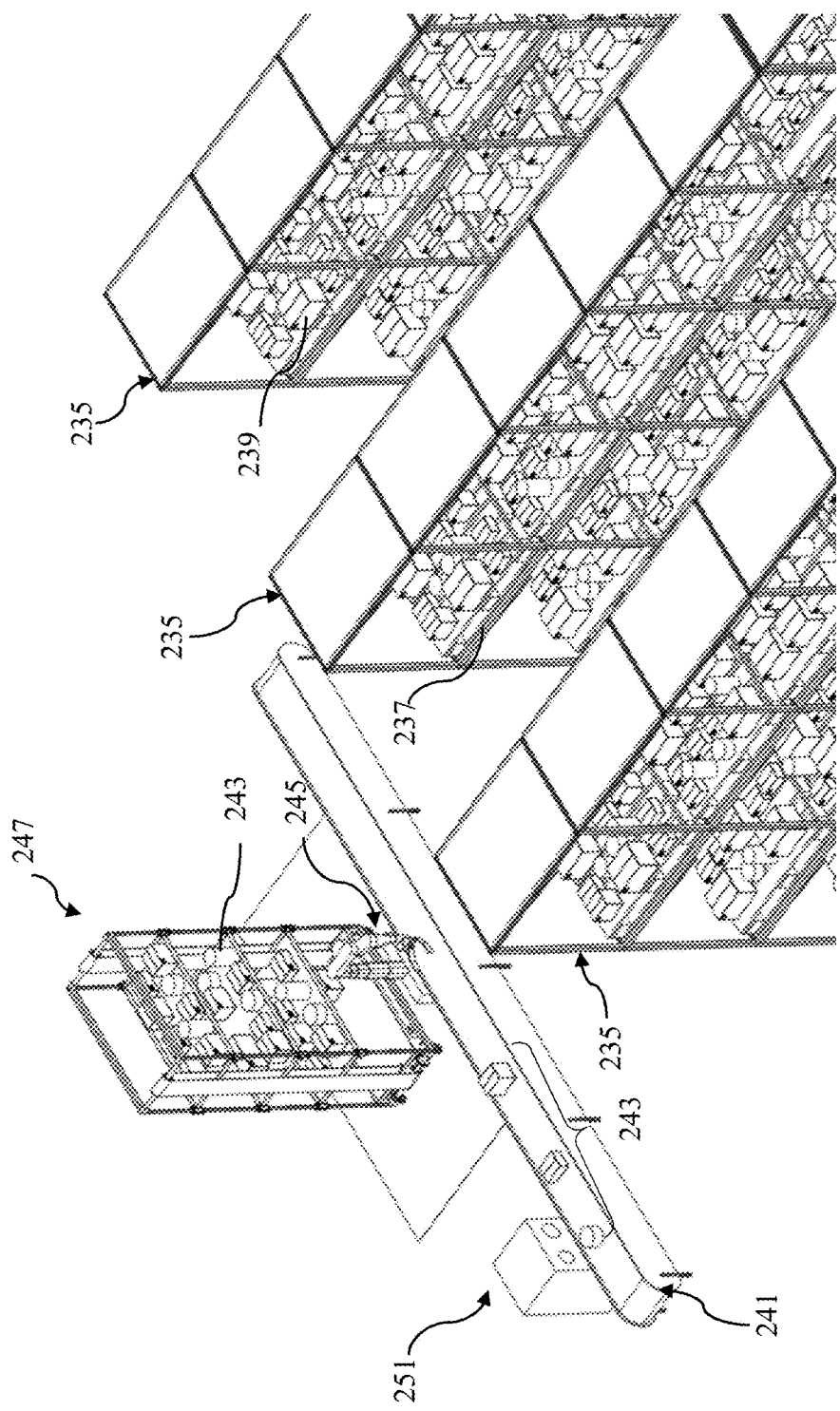
FIG. 24 is a perspective view of an embodiment of the primary facility of the system of FIG. 22.

Referring now to FIG. 24, an embodiment of a primary facility 211 of FIG. 22 is shown in a warehousing application.

The primary facility 211 includes a plurality of storage racks 235 configured to provide storage space for a plurality of articles 239 by means of a plurality of shelves 237.

Each article 239 may include a unique identifier to facilitate tracking each article 239.

A plurality of articles with at least one identical attribute 243 such as an identical shipping date are collected by manual labor or automatically from the storage racks 235 to conveying belt 241. For example, in one embodiment at least one human worker can collect a plurality of articles that have identical shipping dates and load them on the conveyor belt 241. In another embodiment, the process of collecting articles with the identical attribute can be performed by means of a combination of at least one mobile robot and at least one human worker. Mobile robots can be configured to transport a storage rack (wherein each storage rack is movable) to a collecting zone where a human labor picks articles with the identical attribute of identical shipping date and disposes articles on the conveyor belt 241. In another embodiment, the process of collecting articles that have the identical attribute of identical shipping date can be performed by means of a combination of cartesian robots disposed on the storage racks 235 and conveying belts. The cartesian coordinate robot is configured to collect the articles and dispose articles on a conveying belt connected to the conveying belt 241.

The plurality of articles with identical attributes 243 may be scanned by an inspection device 251, which may be disposed along the conveyor belt 241, to intermediately track the articles 243 being loaded to a multi-shelf cart 247.

The primary facility 211 further includes a loader device 245 configured to load the articles 243 onto the multi-shelf cart 247.

The loader unit 245 includes a robotic manipulator equipped with a suitable gripper end effector to effectively engage with articles 243 and load them to the cart 247 using a loading procedure.

The loader unit 245 may further include another end effector configured to engage with the lift mechanism of the cart 247 to cause movement of the shelves of the cart in a vertical direction.

Figure 25:
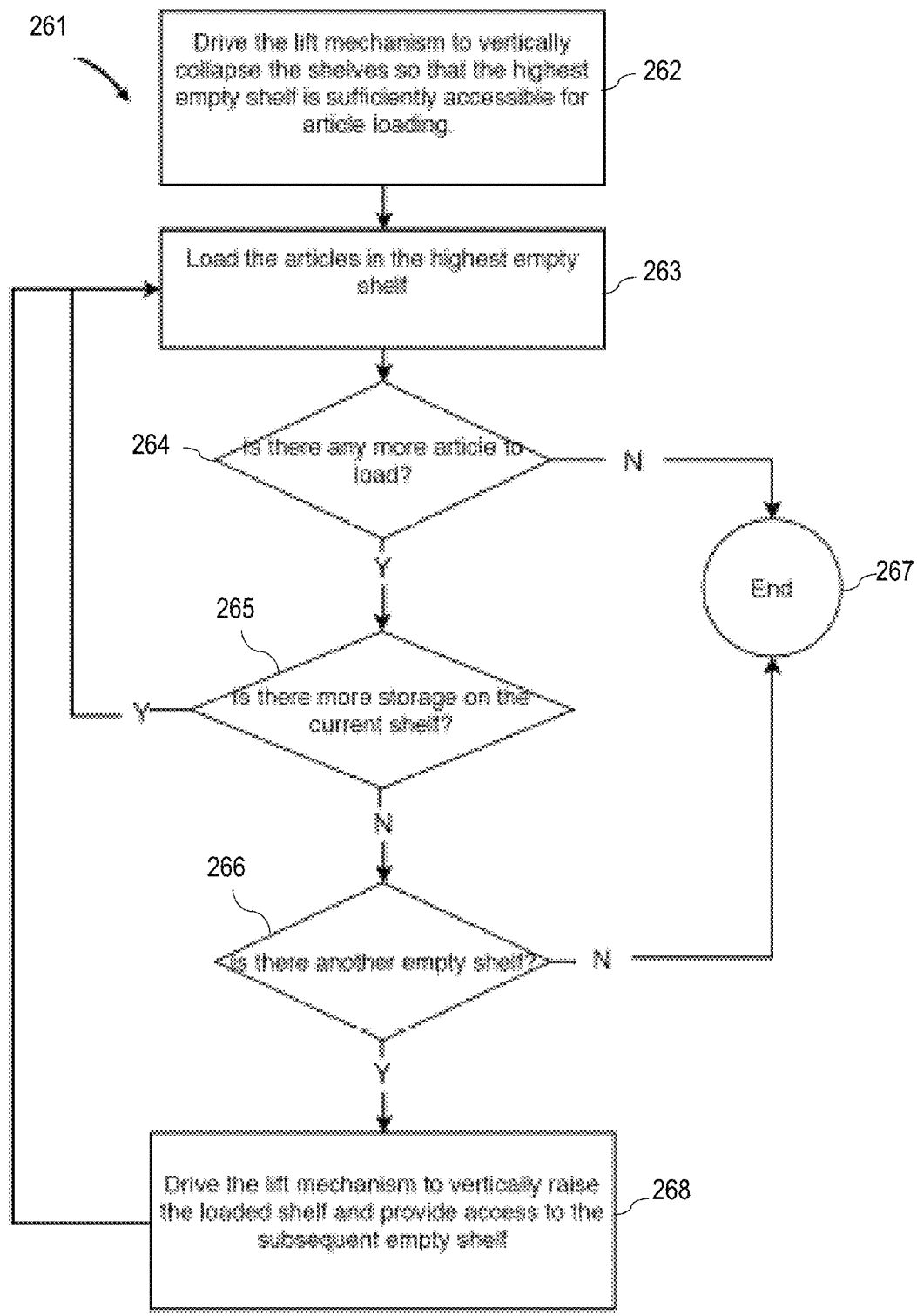
FIG. 25 is a flow diagram of a process for loading articles onto the multi-shelf cart of FIG. 11, according to an embodiment.

Referring now to FIG. 25, a flow diagram of an embodiment of directions for loading process of a plurality of articles onto a multi-shelf cart is shown generally at 261.

The directions 261 may be performed using the robotic loader of FIG. 24.

The loading process starts at block 262 by driving the lift mechanism to cause the collapse of the shelves so that the highest empty shelf is sufficiently accessible for article loading.

At block 263 a plurality of articles are loaded to the highest empty shelf.

At block 264 availability of more articles for loading is checked. If there are more articles to be loaded, directions 261 proceeds to block 265, otherwise the loading process is finished at block 267.

At block 265 the storage area on the current shelf is checked.

If there is more storage area on the current shelf the directions 261 proceeds to block 263 to load more articles onto the current shelf, otherwise, if the current shelf is full, the directions 261 proceed to block 266.

At block 266 the directions 261 checks if there is an empty shelf from the subsequent shelves in the cart.

At block 266 if there is an additional empty shelf the process of article loading 261 proceeds to block 268.

At block 268, the lift mechanism raises the filled shelf or shelves and provides access for the next empty shelf.

At block 266 if all of the storage shelves are filled, the loading process is finished at block 267.

Figure 26A:
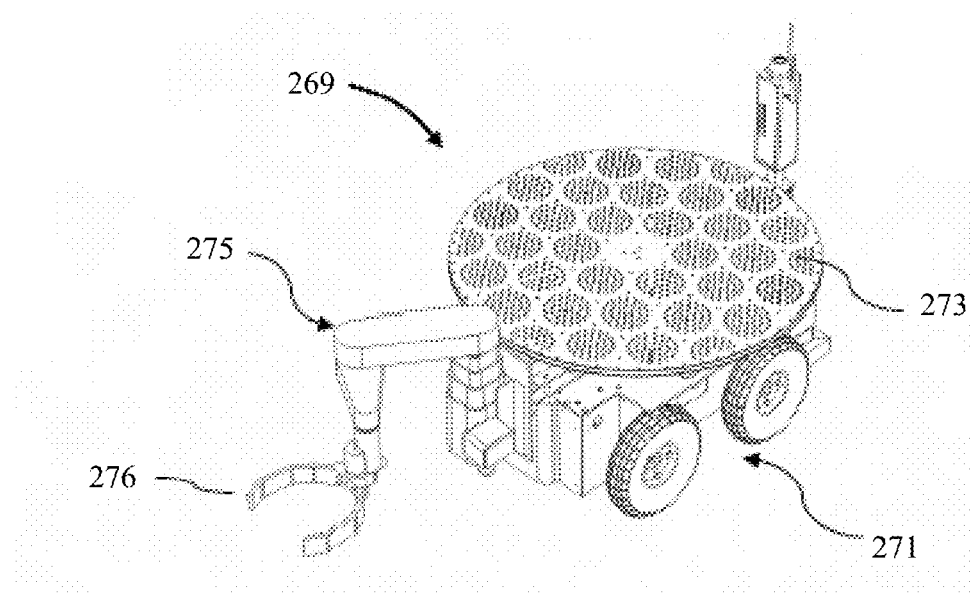
FIGS. 26A, 26B are views of the unloader unit of FIG. 22, according to an embodiment.
Figure 26B:
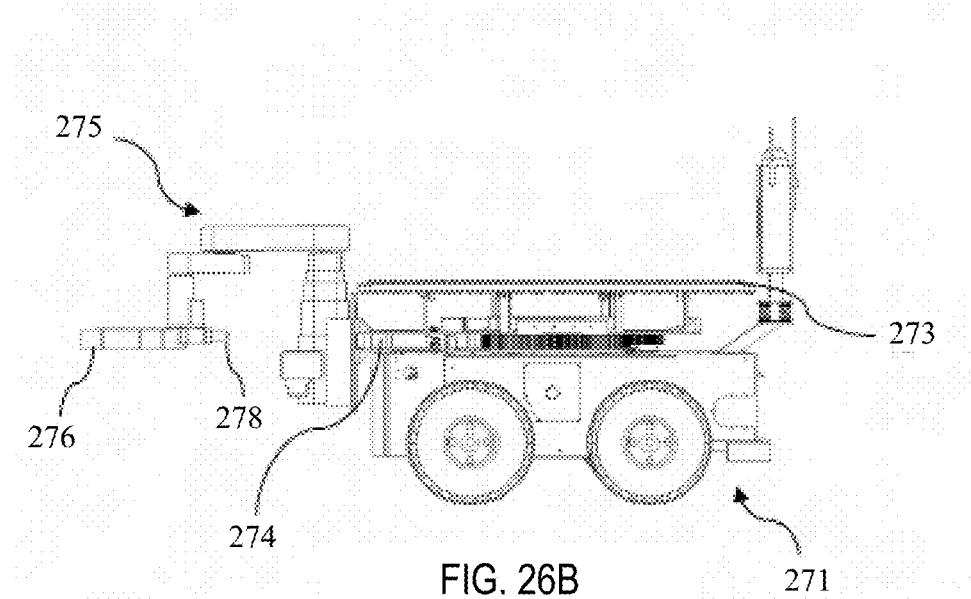

Referring now to FIGS. 26A and 26B, views of an embodiment of the unloader unit are shown at 269.

The unloader unit 269 in this embodiment is a mobile robot comprising a wheeled chassis 271, a storage platform 273 configured to provide space for disposing a plurality of articles, a rotatable base platform 274 disposed on the wheeled chassis 271 and configured to rotate relative to the wheeled chassis 271 and the storage platform 273, and a manipulator 275 disposed on the base platform 274 and configured to manipulate articles.

The manipulator 275 comprises a gripper arm 276 configured to collect articles such as a plant pot.

The gripper arm 276 may further include a powered spline socket 278 configured to actuate the lift mechanism of a multi-shelf cart.

Figure 27A:
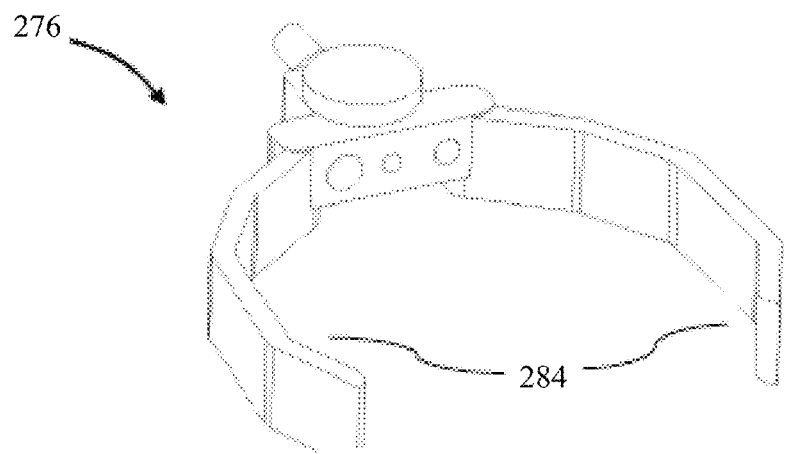
FIGS. 27A, 27B are perspective views of the end effector of the unloader unit of FIGS. 26A, 26B, according to an embodiment.
Figure 27B:
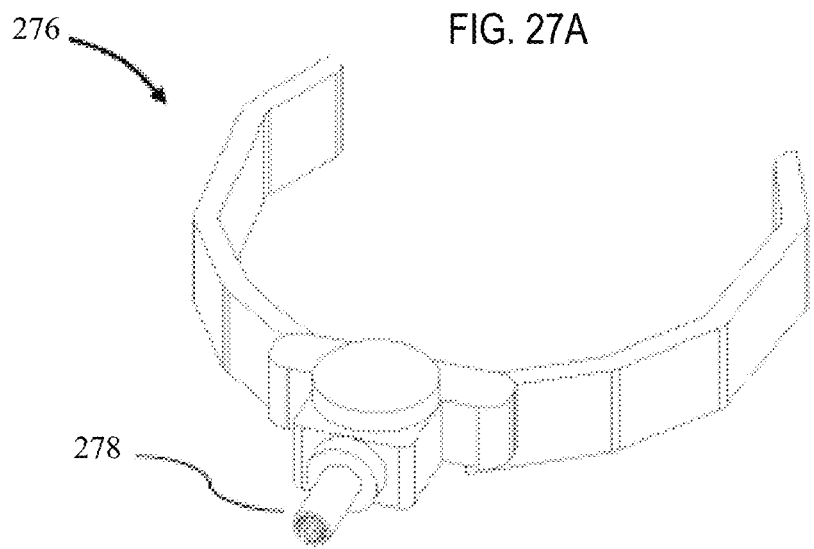

Referring to FIGS. 27A-27B, two perspective views of an embodiment of the gripper end effector 276 are illustrated.

The gripper end effector 276 includes two opposing fingers 284 configured to grip articles such as plant pots.

The gripper end effector 276 further includes a powered spline socket 278 that can be used in actuation of the lift mechanism of a multi-shelf cart.

Figure 28:
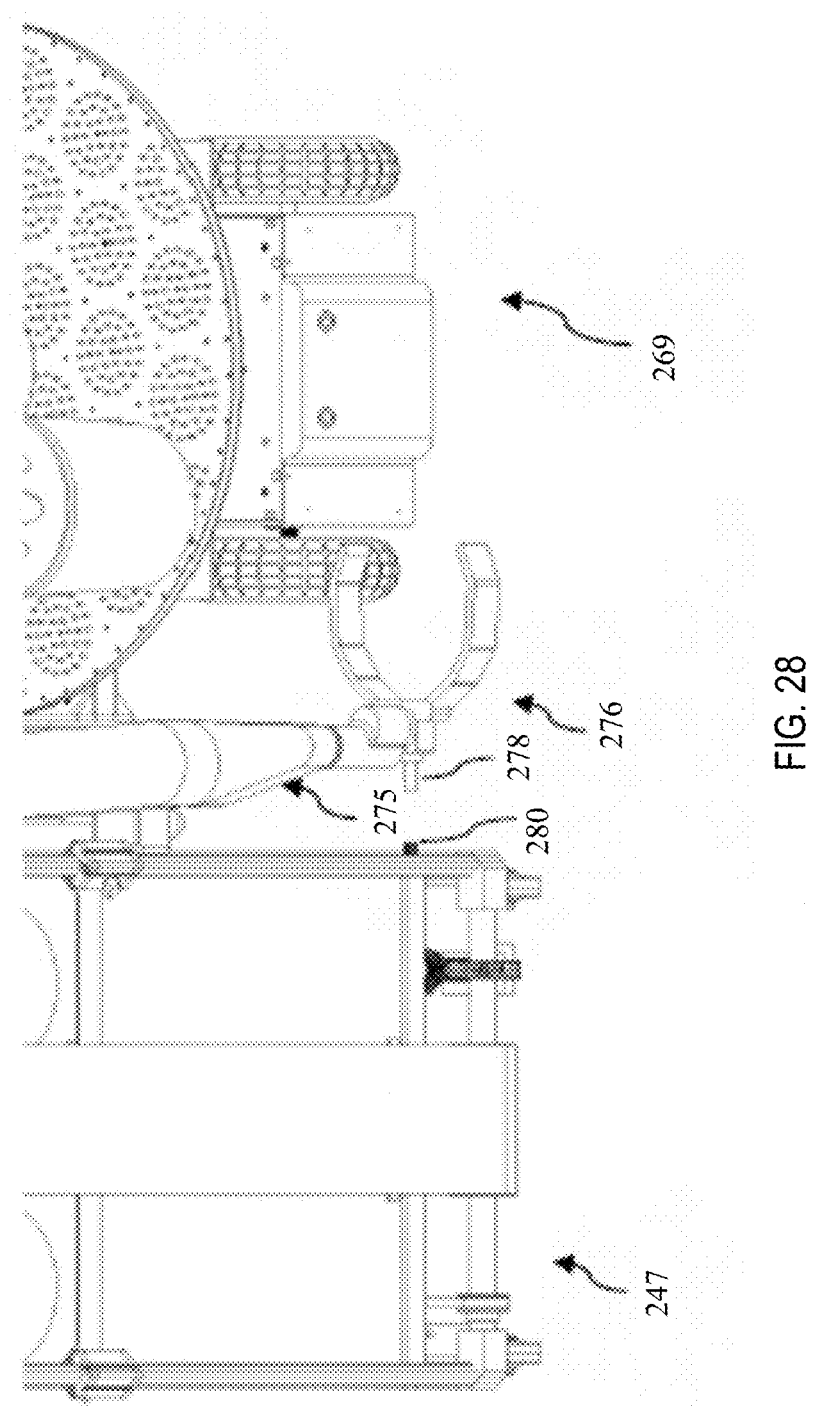
FIG. 28 shows the lift mechanism of the multi-shelf cart of FIG. 11 being actuated by the unloader unit of FIGS. 26A, 26B, according to an embodiment.

Referring to FIG. 28, an embodiment of the engagement of the powered spline socket 278 of the unloader unit 269 with the input shaft 280 of the multi-shelf cart's lift mechanism is illustrated. The multi-shelf cart is shown at 247.

Figure 29:
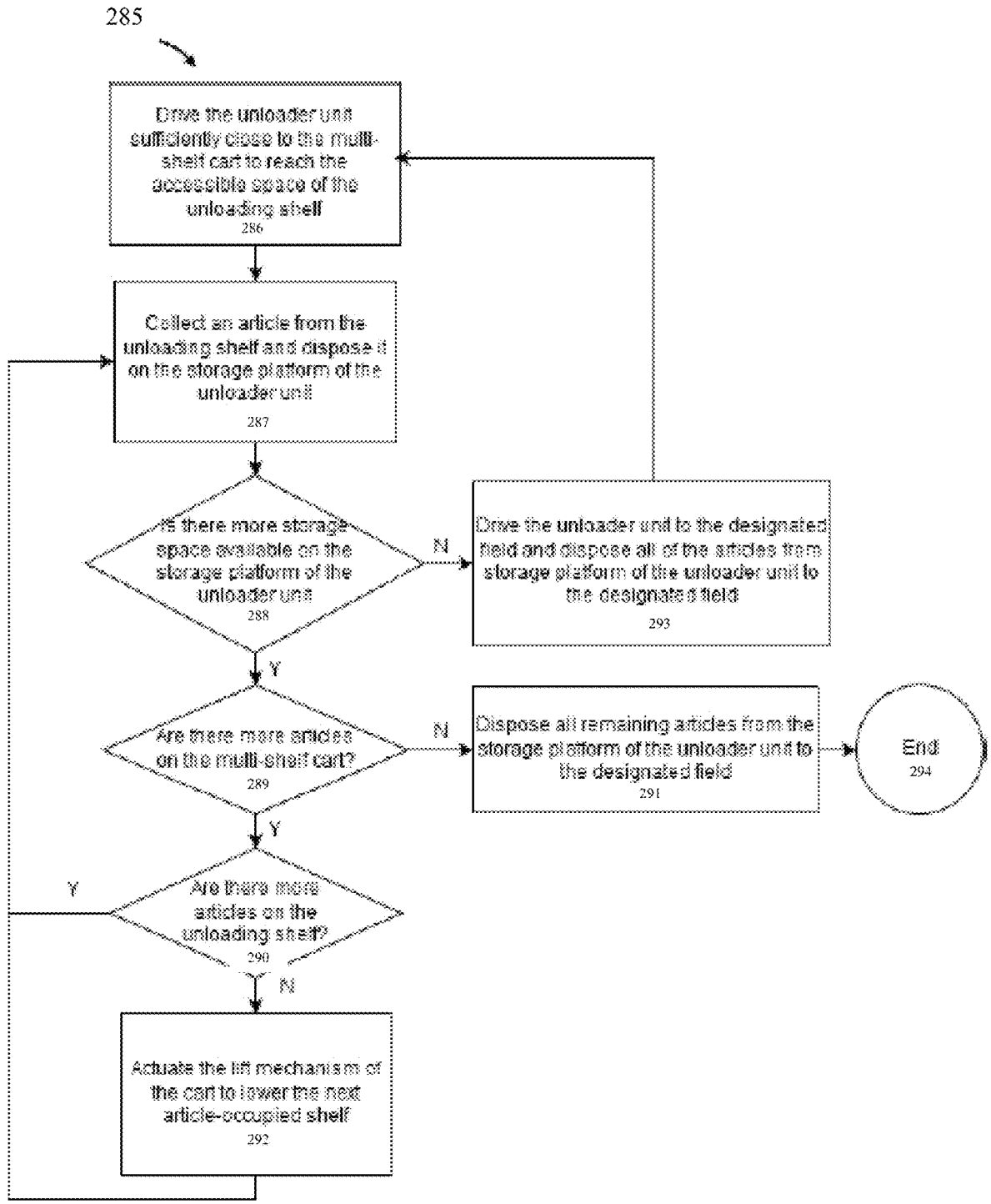
FIG. 29 is a flow diagram of a process for unloading articles from the multi-shelf cart of a system of the present disclosure, according to an embodiment.

Referring to FIG. 29, a flow diagram showing an embodiment of directions for unloading articles from a multi-shelf cart is generally shown at 285.

Perspective views of the unloading process from the multi-shelf cart to an unloading zone are shown in FIGS. 30A-30H as an example of the unloading process using an unloader unit.

In the embodiment shown in FIG. 30, the unloader unit is a mobile robot 269 configured to unload a plurality of 2-gallon plant pots 295 from a multi-shelf cart 296 to a greenhouse nursery bay 300.

The unloading process starts at block 286 by driving the unloader unit sufficiently close to the multi-shelf cart to reach the accessible space of the unloading shelf.

At block 287 the unloader unit collects an article from the multi-shelf cart and disposes it on the storage platform of the unloader unit.

Figure 30A:
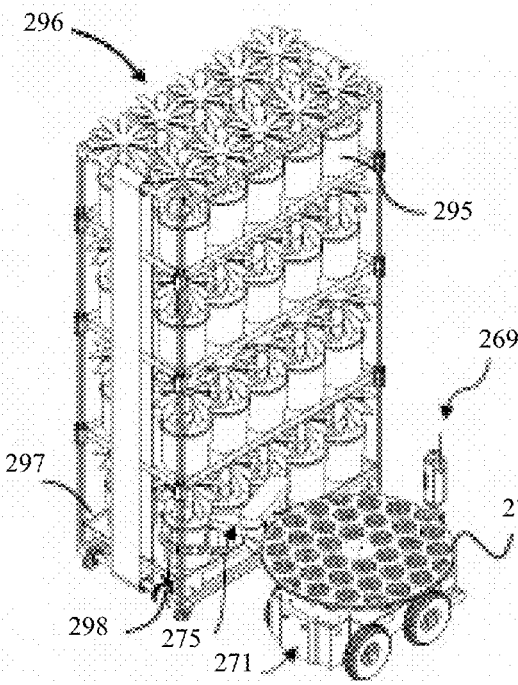
FIGS. 30A-30H are perspective views of an unloading process from the multi-shelf cart of FIG. 11 with application in potted plant nurseries, according to an embodiment.

Referring to FIG. 30A, the wheeled chassis 271 of the unloader unit 269 is driven to be sufficiently close to the multi-shelf cart 296 such that the articles loaded on the first shelf 297 are within reach of the manipulator arm 275 of the unloader unit 269. The unloader unit 269 is collecting a first article 298 from the first shelf 297 of the multi-shelf cart 296.

Figure 30B:
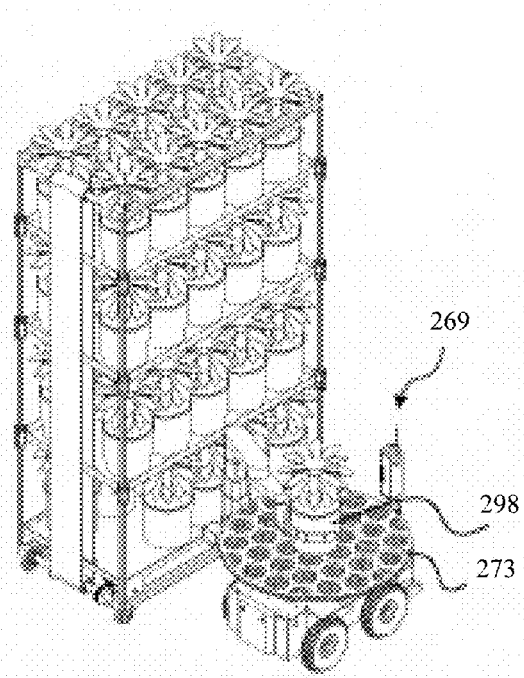

Referring to FIG. 30B, the first article 298 is being disposed on the storage platform 273 of the unloader unit 269.

At block 288 the directions 285 checks if there is more storage space available on the storage platform of the unloader unit.

At block 288 if there is more storage space on the storage platform of the unloader unit, the directions 285 proceeds to block 289.

Figure 30C:
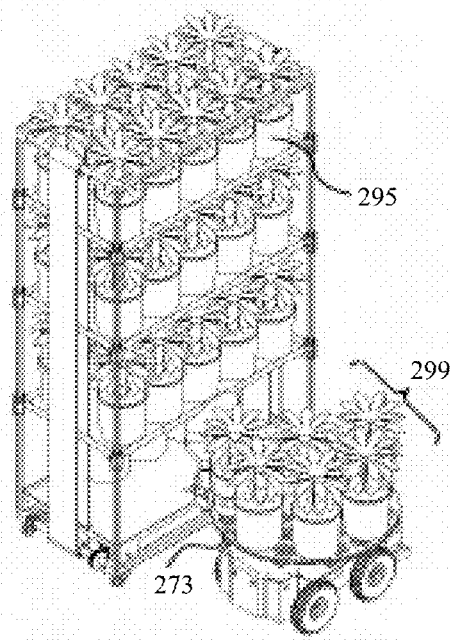

Referring to FIG. 30C, a plurality of articles 299 are loaded on the storage platform 273 of the unloader unit 269 and there is more storage space available on the storage platform 273, therefore the unloader unit proceeds to load more articles 295.

At block 289 the directions 285 checks if there are more articles on the multi-shelf cart.

At block 289 if there are more articles on the multi-shelf cart the directions 285 proceeds to block 290, otherwise the directions 285 proceeds to block 291.

At block 290 the directions 285 checks if there are more articles on the current unloading shelf.

At block 290 if there are more articles on the current shelf the directions 285 proceeds to block 287 otherwise the directions 285 proceeds to block 292.

Still referring to FIG. 29, at block 288 if there is no more storage space available on the storage platform of the cart the directions 285 proceeds to block 293.

At block 293, the unloader unit, which is filled with a plurality of articles, is driven to a designated unloading zone in a storage field and all of the articles are unloaded and disposed on the designated unloading zone.

Figure 30D:
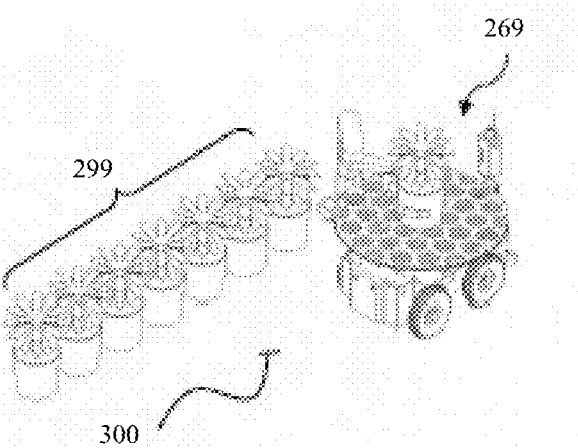

Referring to FIG. 30D, the unloader unit 269, which is fully loaded with articles, is driven to a designated unloading zone in the storage bay 300 and is disposing the plurality of collected articles 299 from the multi-shelf cart on the bay 300.

Referring to FIG. 29, at block 290 if there are no more articles on the current shelf the directions 285 proceeds to block 292.

At block 292 the lift mechanism of the multi-shelf cart is actuated in order to lower the next article-occupied shelf.

Figure 30E:
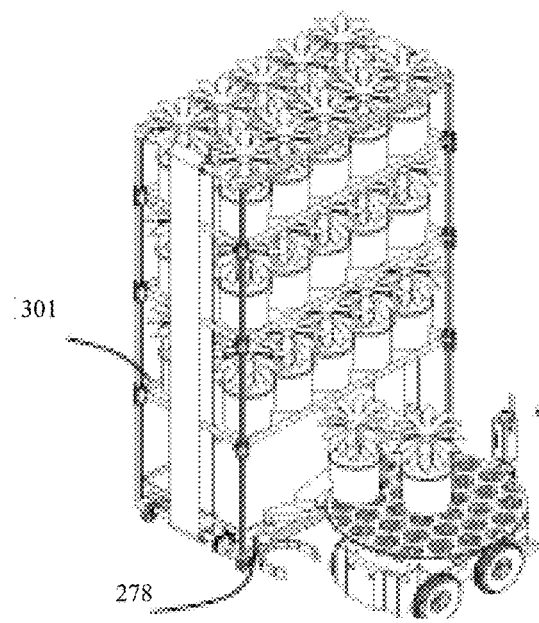

Referring to FIG. 30E, all of the articles on the first shelf of the cart are collected by the unloader unit 269, the lift mechanism of the multi-shelf cart is being actuated by the end-effector 278 of the unloading unit 269 to lower the next article-occupied shelf 301.

Figure 30F:
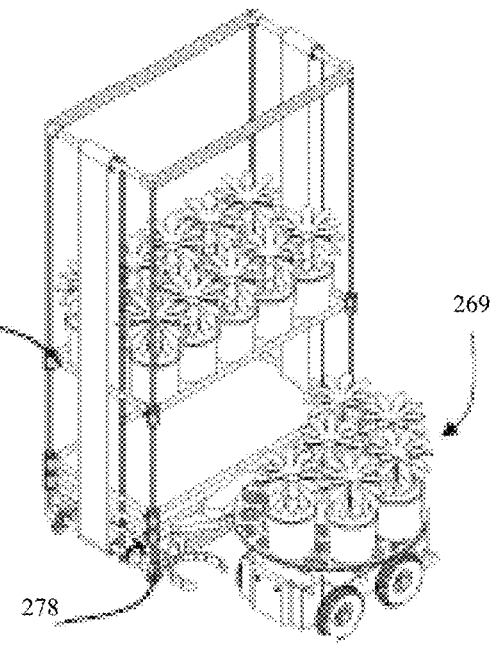

Referring to FIG. 30F, the unloading direction 285 has cycled many times and all of the articles on the multi-shelf cart except for the articles on the last shelf 302 are unloaded using the unloader unit 269. Thus, the end effector 278 of the unloader unit 269 is actuating lift mechanism of the multi-shelf cart to bring down the top shelf 302 to the accessible space of the unloader unit 269.

Referring to FIG. 29, at block 289 if there are no more articles on the multi-shelf cart the directions 285 proceeds to block 291.

Figure 30G:
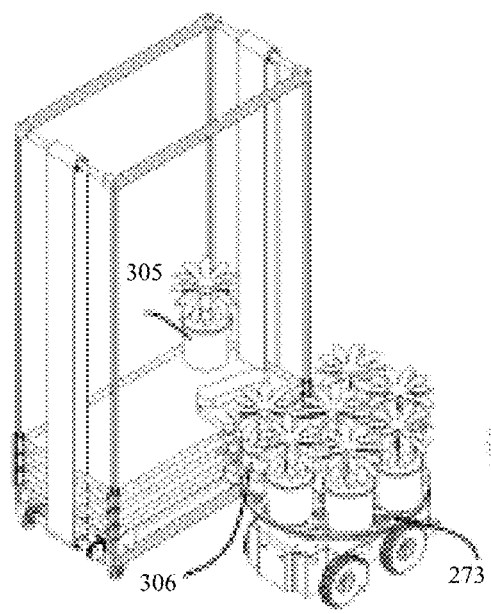

Referring to FIG. 30G, the unloader unit 269 is disposing the second to the last article 306 on the storage platform 273 of the unloader unit and is about to unload the last article 305.

At block 291 the unloader unit disposes all remaining articles from the storage platform 273 to the designated unloading zone.

Afterwards, the directions 285 ends at block 294.

Figure 30H:
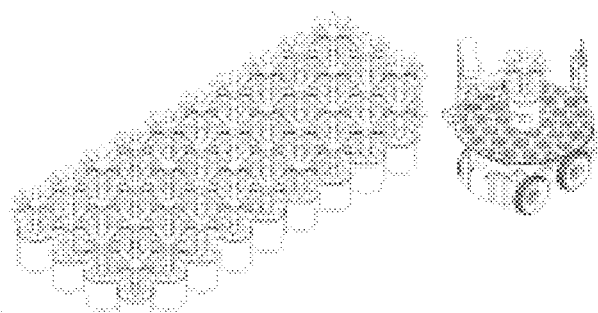

Referring to FIG. 30H, the unloader unit 269 has driven to a designated unloading zone in the storage bay 300 and the unloader unit is disposing the plurality of articles on the storage platform 273 of the unit 269 to the unloading zone and thus the unloading process from the multi-shelf cart ends.

Figure 31:
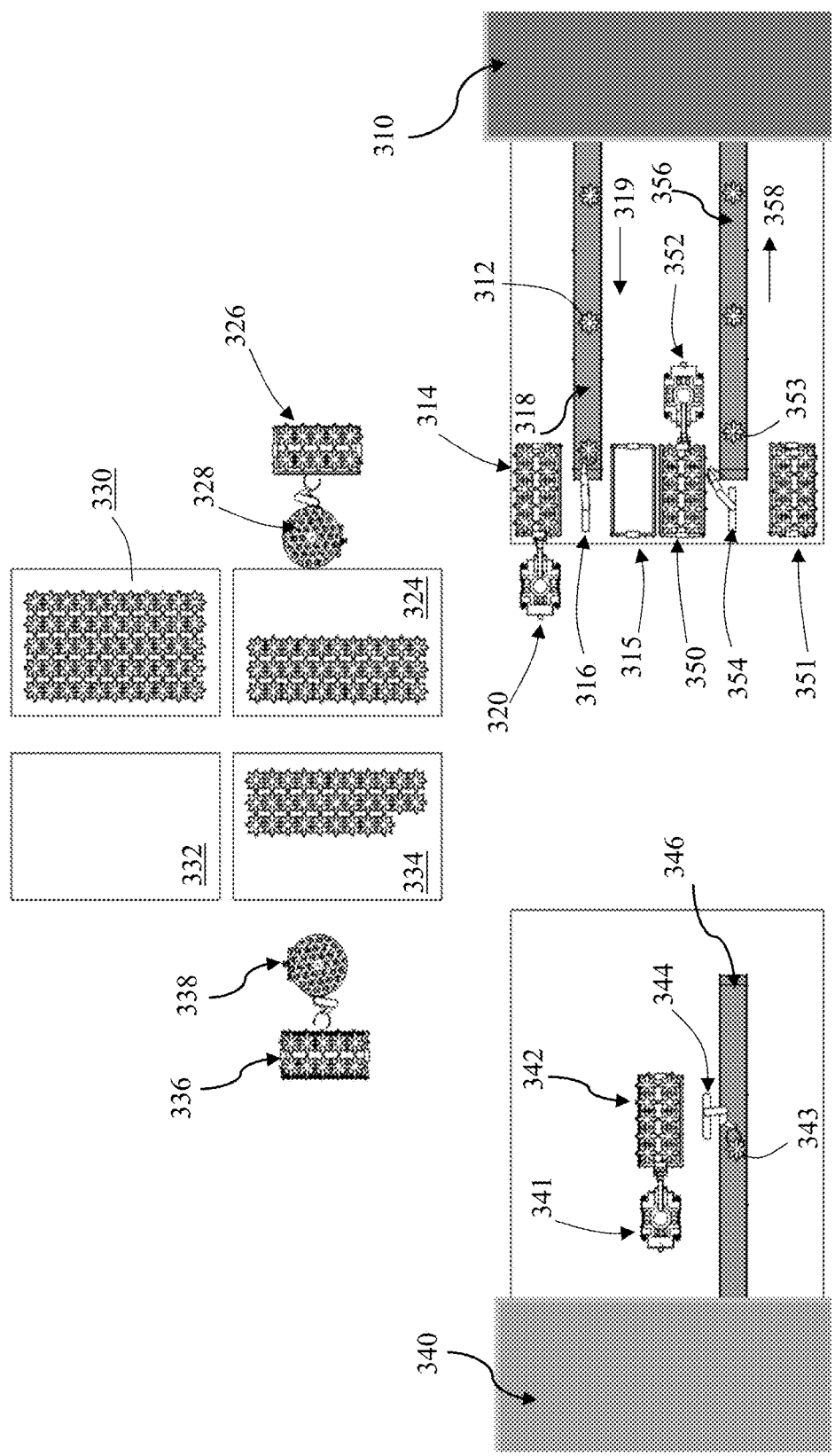
FIG. 31 is a top view of an embodiment of a distribution system of the present disclosure with an application in potted plant nurseries, according to an embodiment.

Referring now to FIG. 31, a top view of another embodiment of the distribution system 210 is disclosed.

The embodiment shown in FIG. 31 shows the capability of the system of the present disclosure in automating the distribution process for articles with at least one identical attribute.

The distribution system starts by loading a plurality of 2-gallon potted plants (identical attribute) 312 from a loading zone in a potting center (primary facility) 310 to a multi-shelf cart 314 using a robotic loader unit 316.

The plurality of potted plants 312 are transported on a conveyor belt 318 from inside the potting center to a vicinity of the loader unit 316 in direction 319.

The loader unit is configured to automatically load articles 312 one by one from the conveying belt 318 to the multi-shelf cart 314.

The robotic loader unit 316 is further configured to engage with the lift mechanism of the cart 314 to cause vertical motion of shelves in the cart 314.

Once the cart 314 is loaded with a plurality of 2-gallon potted plants, the cart 314 is automatically transported to a greenhouse bay (destination facility) using a cart-pulling robot 320, for example, for further growth and storage of the plant inside a pot.

An empty cart 315 is available near the conveyor belt 318 so that once the cart 314 is filled with articles and transported toward the destination facility, the unloader unit 316 can continue loading articles 312 to the cart 315.

A multi-shelf cart 326 is transported to the bay 324. The cart 326 is being unloaded to the bay 324 using a robotic unloader unit 328 through an unloading process similar to the process in FIGS. 29 and 30.

Still referring to FIG. 31, a bay 330 is fully loaded with identical potted plants and bay 332 is empty and ready to store a plurality of potted plants.

The bay 334 houses a plurality of grown potted plants where the plants are ready to be transported to another destination.

The plurality of grown potted plants in the bay 334 (primary facility) are loaded to a multi-shelf cart 336 using a robotic loader unit 338.

Figure 32:
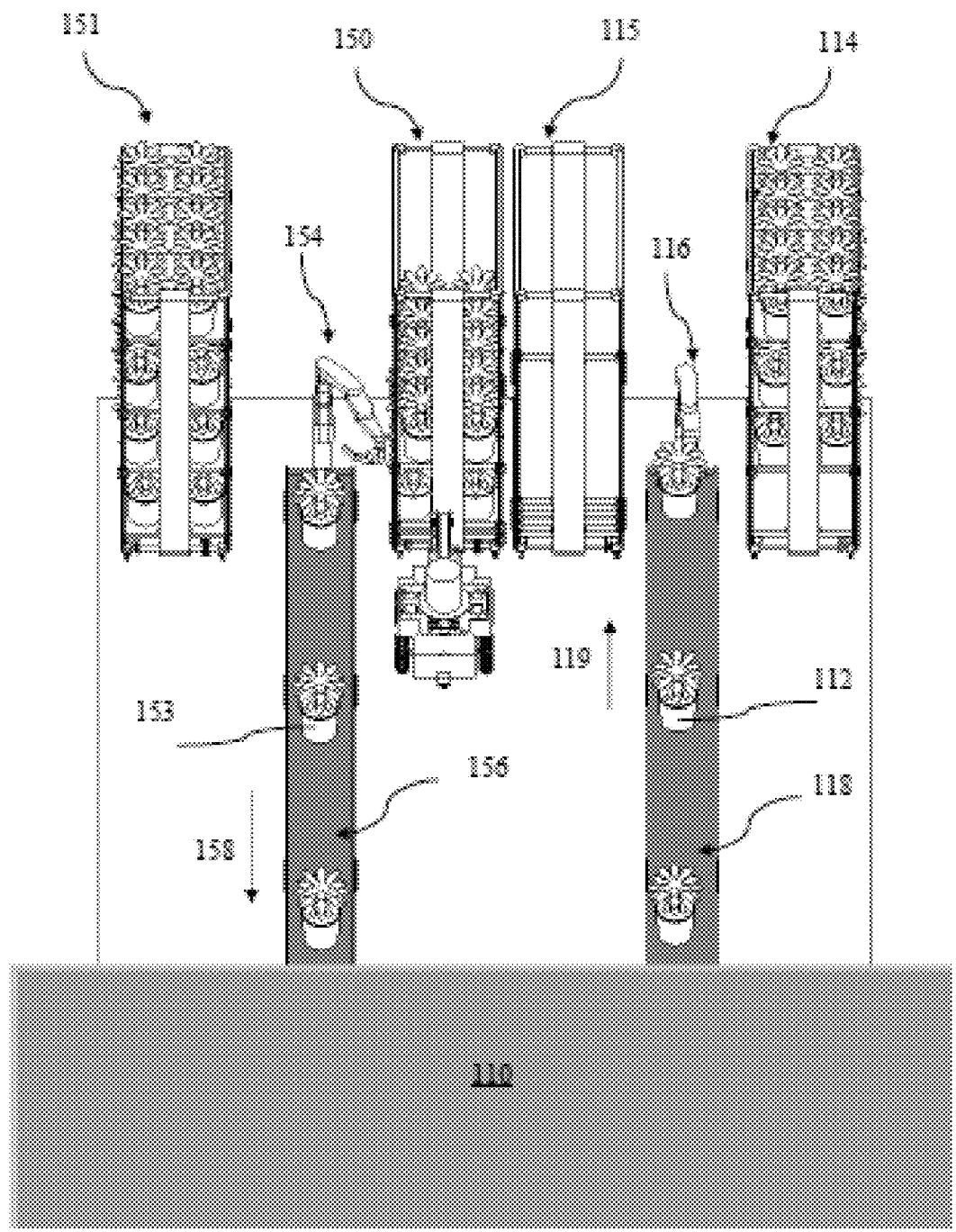
FIG. 32 is a perspective view of the potting station of FIG. 31, according to an embodiment.

In the embodiment shown in FIG. 32, the robotic loader unit 338 is the same as the robotic unloader unit 328 and is configured to collect and load the plurality of potted plants from the bay 334 to the cart 336.

Once the cart 336 is loaded with grown potted plants, the cart 336 could be transported to a shipping facility (a destination facility) 340 or to the potting station (another destination facility) 310 for further process on the grown potted plant such as transplanting to a bigger pot.

At the shipping facility 340, the multi-shelf cart 342 is transported in using the cart-pulling robot 341. Potted plants 343 may be automatically unloaded from the multi-shelf cart 342 to a conveying belt 346, using a robotic unloader unit 344.

At the potting station 310, a multi-shelf cart 350 is returned from a greenhouse bay using a cart puller robot 352.

The plurality potted plants 353 are unloaded from the cart 350 to an input conveyor belt 356 using an unloader unit 354.

The conveyor belt 356 conveys the potted plant 353 inside the potting center 310 in direction 358 for further process on the plants.

Once the cart 354 is fully unloaded, another cart 351, loaded with potted plants, is available for unloading using the robotic unloader unit 354.

Referring to FIG. 32, a close-up perspective view of the potting center 310 of FIG. 31 is illustrated.

Figure 33A:
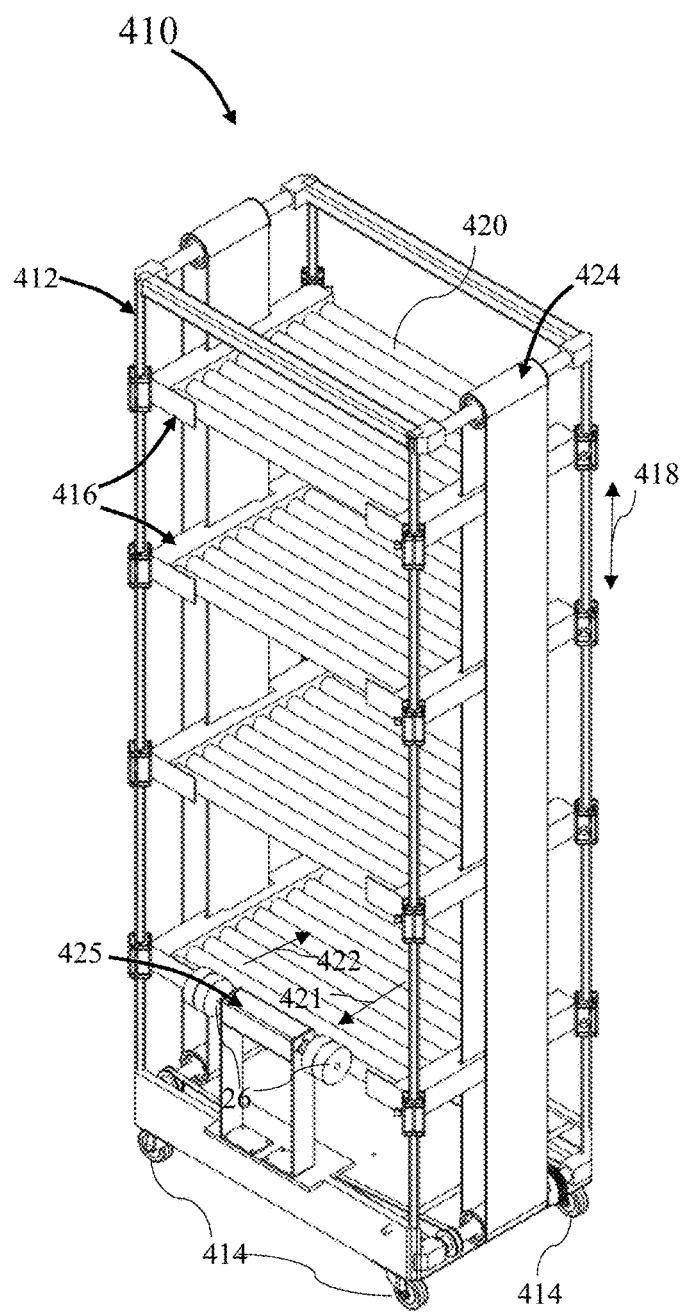
FIGS. 33A and 33B are perspective views of a mobile unit for transporting articles, the mobile unit having a plurality of conveyor shelves, according to an embodiment.

Referring now to FIG. 33A, an embodiment of the mobile unit of current invention with a plurality of roller conveyor shelves expanded, is shown in a perspective view at 410.

The multi-shelf unit 410 includes a wheeled frame 412.

Figure 33B:
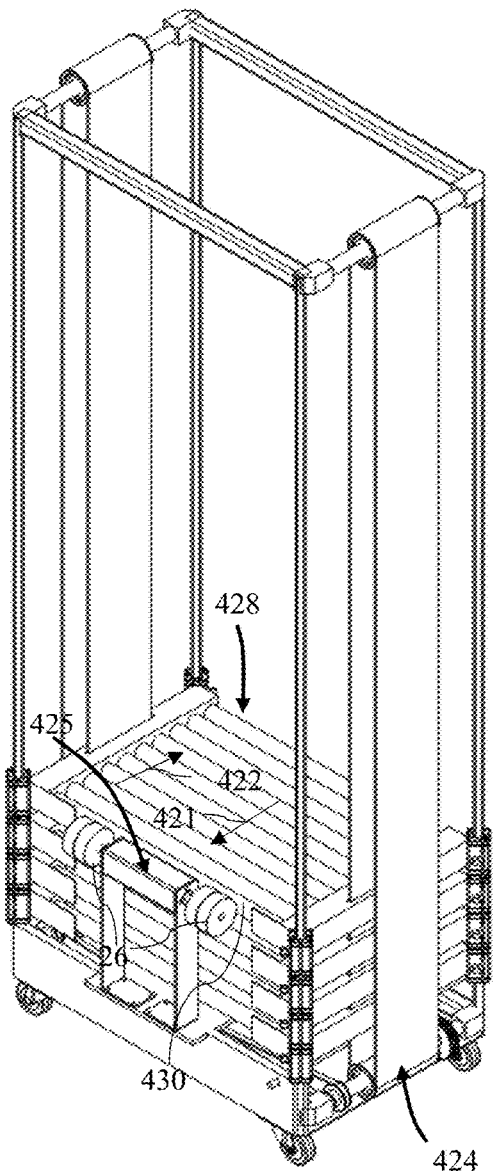

In the embodiment shown in FIG. 33A a plurality of castor wheels 414 (only 3 are shown in FIGS. 33A, 33B) are disposed on each corner of the frame 412 and are configured to swivel to allow navigation of cart in a desired direction.

The unit 410 includes a plurality of vertically spaced apart shelves 416 which are movably disposed on the wheeled frame and are configured to provide storage area for article storage.

Each shelf 416 is configured to move in a vertical direction 418 in order to improve accessibility to each shelf in the vertical direction 418 to facilitate receiving and delivering articles in and from an accessible shelf of the multi-shelf unit 410.

There are further a plurality of roller shafts 420 disposed on each shelf 416 configured to facilitate moving an article in an inward 421 or outward direction 422.

The plurality of roller shafts of a shelf are coupled to each other such that upon rotation of a primary roller shaft, the rest of the roller shafts of the shelf rotate synchronously with the primary roller shaft and in the same direction as the primary roller shaft of the shelf.

The cart 410 further includes a lift mechanism 424 disposed on the wheeled frame 412 and coupled to the plurality of the shelves to drive the shelves in the vertical direction 418 configured to improve accessibility for each shelf of the multi-shelf unit for article loading and unloading.

The multi-shelf unit 410 further includes a roller conveyor drive mechanism 425 disposed on the wheeled frame 412. The conveyor drive mechanism 425 comprises two rollers 426 configured to engage with a primary roller shaft of a loading or unloading shelf to cause rotation of the plurality of the roller shafts of the shelf in order to assist in article loading or unloading to or from the shelf of multi-shelf cart. The conveyor drive system 425 may include a reversible electrical motor coupled to the drive system and configured to actuate the drive system to cause rotation of the rollers 426.

Referring to FIG. 33B, the mobile unit is illustrated in a perspective view with the plurality of shelves collapsed.

The plurality of the conveyor shelves of the unit are collapsed by engaging the lift mechanism 424.

The rollers 426 of the conveyor drive mechanism 425 are engaged with the primary roller shaft 430 of the top shelf 428 of the multi-shelf unit in order to run the roller conveyor of the top shelf in an inward direction 421 or outward direction 422.

Figure 34A:
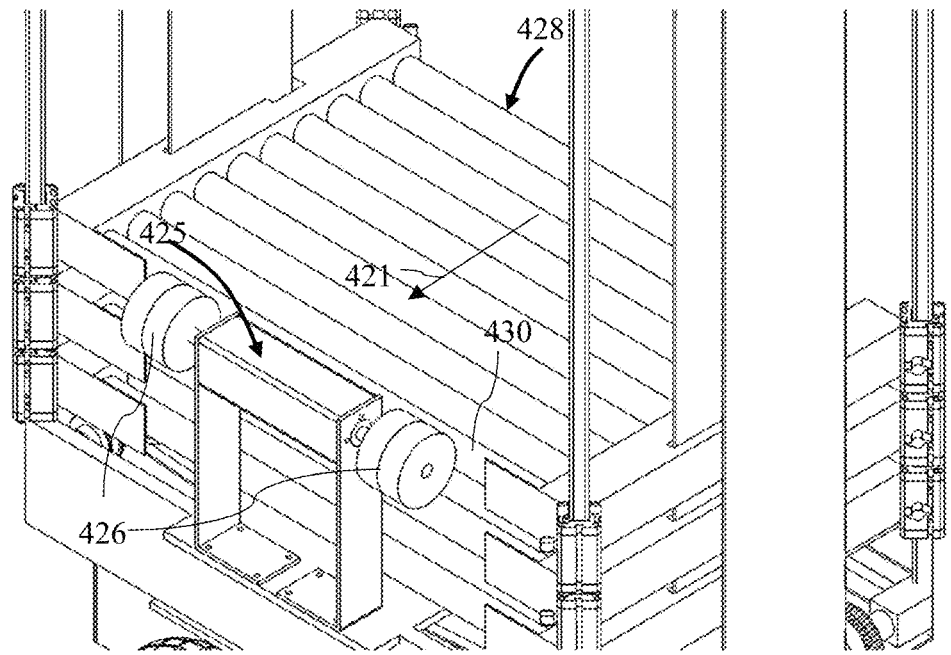
FIGS. 34A and 34B are close-up perspective and section views, respectively, of the mobile unit of FIG. 33B.

Referring to FIG. 34A, a close-up perspective view of the multi shelf unit of FIG. 33B is shown.

The rollers 426 of the conveyor drive mechanism 425 are engaged with the primary roller shaft 430 of the top shelf 428 of the multi-shelf unit in order to generally run the roller conveyor of the top shelf in an inward direction 421 to facilitate loading articles.

Figure 34B:
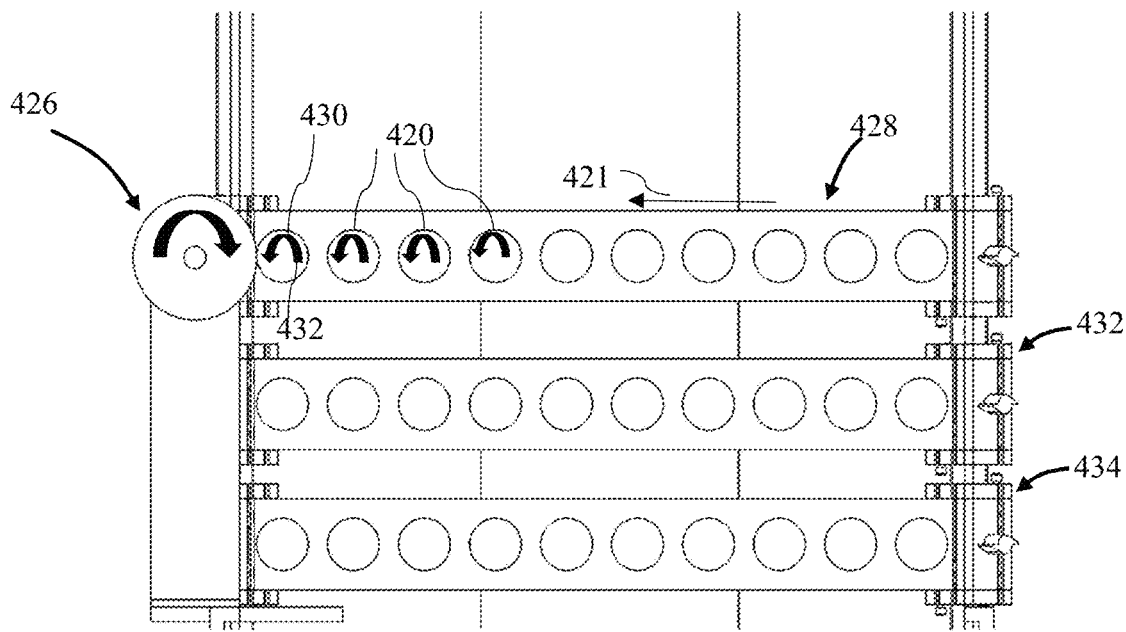
Figures 35A, 35B:
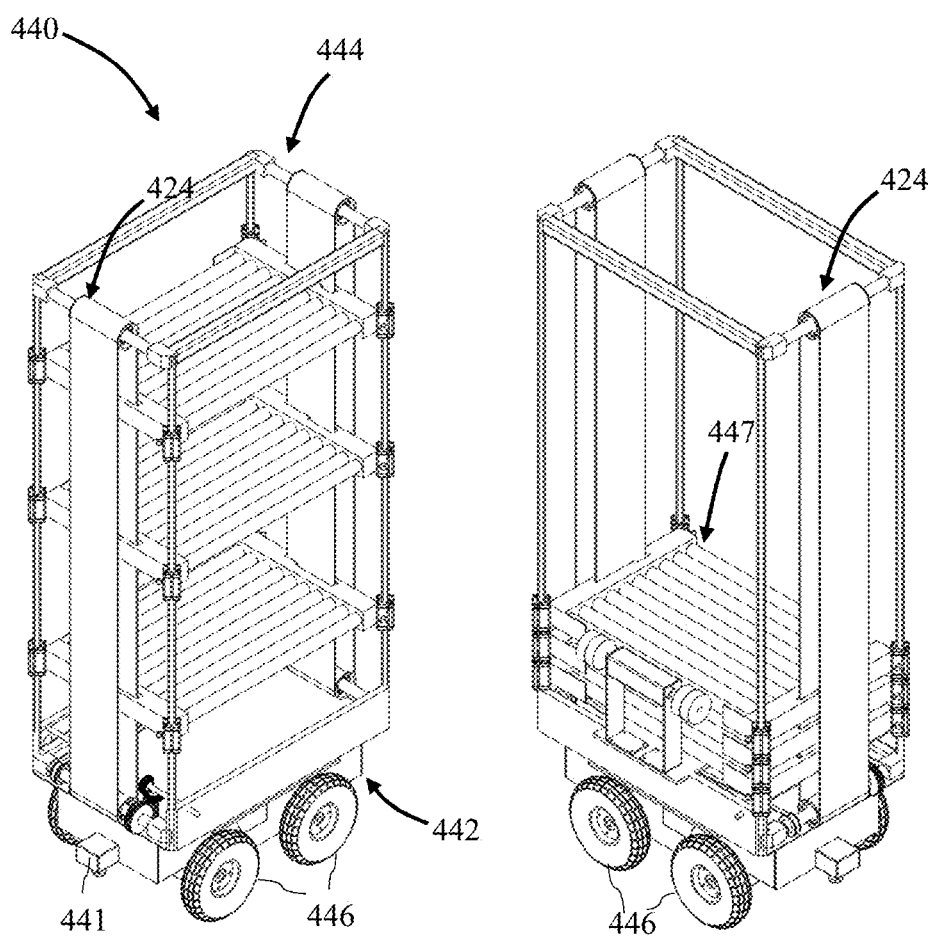
FIGS. 35A and 35B are perspective views of a mobile unit for transporting articles, the mobile unit having a plurality of conveyor shelves, according to another embodiment.

Referring to FIG. 34B, a close-up section view of the embodiment of FIG. 35B is shown from side.

The conveyor drive mechanism is configured to rotate in a clockwise direction and is engaged with the primary roller shaft 430 of the top conveyor shelf 428 to cause the primary roller shaft 430 to rotate in a counterclockwise direction 432.

The primary shaft 430 is coupled to the plurality of roller shafts 420 on the top shelf 428 in order to cause rotation of the plurality of shafts 420 in a counterclockwise direction 432 to facilitate article loading in the direction. Subsequent shelves 432 and 434 follow a similar procedure of engaging with the conveyor actuation mechanism 426 for article loading and unloading.

The process of article unloading is facilitated in a similar manner of actuating the conveyor drive mechanism 426 in a counterclockwise direction such that the primary roller shaft 420 and the plurality of roller shafts 420 of the top shelf rotate in a clockwise direction to assist in article unloading.

Referring to FIG. 35A, another embodiment of the present disclosure is shown generally at 440.

The mobile unit 440 comprises a mobile base 442 and a multi-shelf unit 444 disposed on the mobile base 442.

The multi-shelf unit 444 may be fixed on the mobile base 442 or may be allowed a plurality of degrees of freedom in order to facilitate article loading or unloading by facilitating alignment of the loading or unloading shelf with the direction of article delivering or receiving.

The mobile base 442 is configured to transport the mobile unit 440 to a desired location by means of the motorized wheels 446.

The mobile base 442 is further configured to actuate the lift mechanism by means of a reversible electrical motor disposed in the mobile base 442.

The mobile base 442 further comprises a processing unit (not shown in the figures) comprising a processor and a memory, the processor capable of autonomously executing instructions stored on the memory, and one or more sensors configured to send signals to the processing unit.

In FIG. 35A, a LiDAR sensor disposed on the mobile base 442 is shown as the sensors 441. For example, there may be other sensors such as article detection sensors disposed on each shelf, vision camera disposed on the apparatus, and infrared sensors disposed on the apparatus, which are not shown on the figures.

The mobile base 442 is further configured to autonomously navigate the unit 440 to a desired location by means of the motorized wheels 446.

The mobile base is further configured to actuate the lift mechanism of the multi-shelf unit 444.

Referring to FIG. 35B, the mobile unit 440 is shown in a perspective view with the plurality of conveyor shelves collapsed.

In the embodiment shown, the highest shelf 447 is lowered such that the shelf 447 is sufficiently accessible for article loading and unloading.

Figure 36:
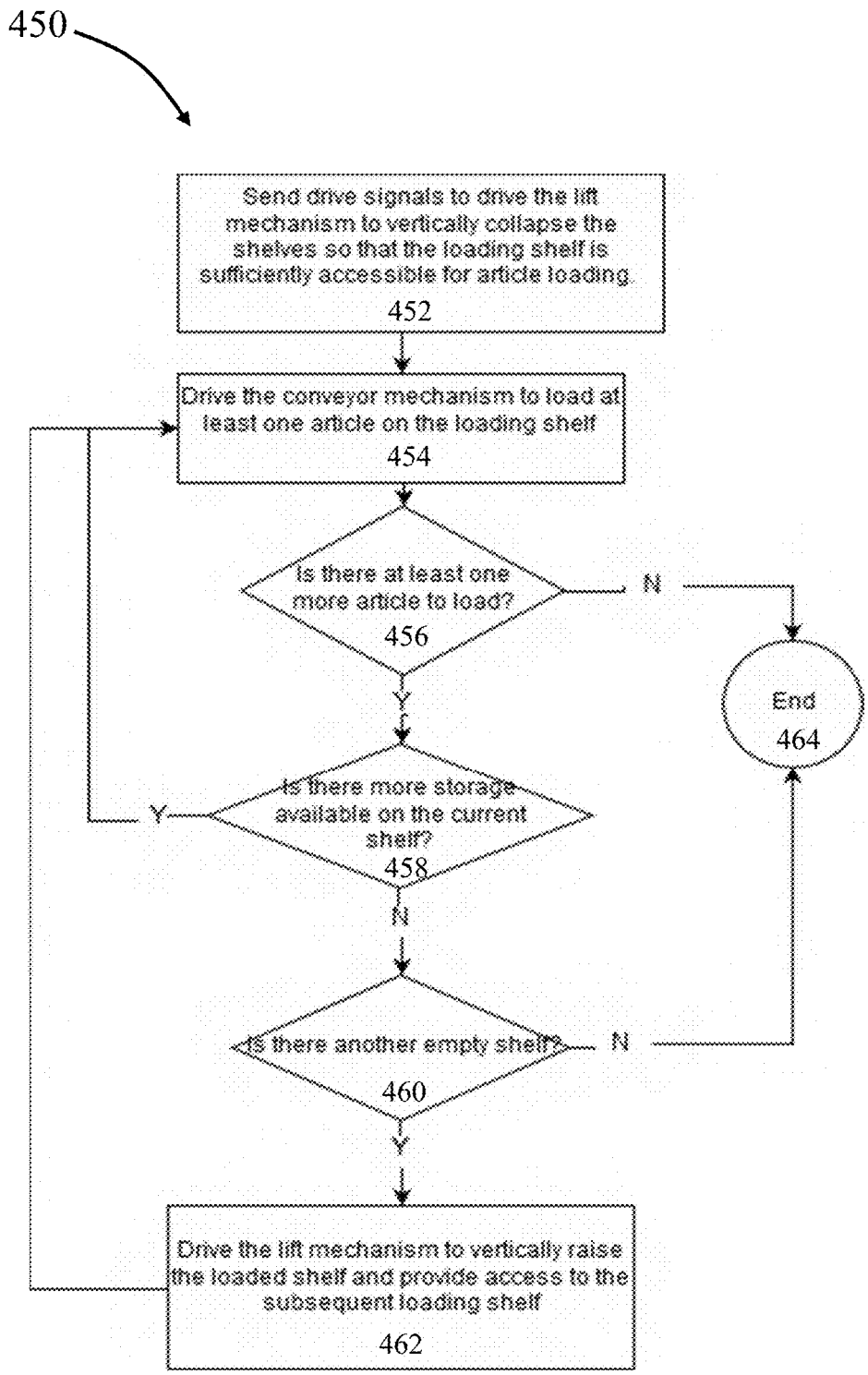
FIG. 36 is a flow diagram of a method of loading a plurality of articles on a multi-shelf unit of the present disclosure, according to an embodiment.

Referring to FIG. 36, a flow diagram of an embodiment of a method for loading a plurality of articles to the multi-shelf unit of current invention is shown generally at 450.

A series of views of the process of loading a plurality of articles to the mobile unit of FIGS. 35A-B are shown at FIG. 37A to 37G.

The loading process starts at block 452.

At block 452 the processing unit sends drive signals to drive the lift mechanism to vertically collapse the shelves so that the loading shelf is sufficiently accessible for article loading.

Referring to FIG. 37A, all of the shelves of the mobile unit 440 are collapsed so that the top shelf 429 is accessible for article loading. The conveyor belt 470 is aligned with the loading shelf 429 of the multi-shelf unit 440 in order to facilitate loading the article 472 from the conveyor belt 470 to the shelf 429. The article 472 is conveyed in direction 474 on conveyor belt.

Referring again to FIG. 36, at block 454 the processing unit sends directions to drive the conveyor mechanism to load at least one article on the loading shelf. Referring to FIG. 37B, the conveyor belt 470 conveys the article 472 in the direction 474 in order to facilitate access to article 472 for the loading shelf 429.

The roller shafts of the loading shelf are actuated by the conveyor drive mechanism 426 to rotate in the inward direction to facilitate receiving the article 472 from the conveyor belt and disposing the article in the shelf 429.

Referring to FIG. 37C, the article 472 is loaded on the top shelf 429 of the mobile unit 440.

Referring to FIG. 36, at block 456, the processing unit checks, with one or more sensors 441, if there is at least one more article to load.

At block 456 if there is not at least one more article to load, the method 450 ends at 464.

At block 456 if there is at least one more article to load, the method 450 proceeds to block 458.

At block 458 the processing unit checks, with one or more sensors 441, if there is more storage available on the current shelf.

At block 458 if there is more storage available on the current shelf, the method 450 proceeds to block 454.

At block 458 if there is no more storage space available on the current shelf the method 458 proceeds to block 460.

At block 460 the processing unit checks, with one or more sensors 441, if there is another empty shelf.

At block 460 if there is not another empty shelf the method 450 ends at 464.

At block 460 if there is another empty shelf, the method 450 proceeds to block 462.

At block 462 of the method 450, the processing unit sends directions to drive the lift mechanism to vertically raise the loaded shelf and provide access to the subsequent loading shelf and the method 450 proceeds to block 454.

Referring to FIG. 37D, the first loaded shelf 429 is raised and the second shelf 478 of the multi-shelf unit is raised in order to facilitate the loading process. The roller conveyor of the second shelf 478 is engaged with the conveyor drive mechanism 426 in order to facilitate receiving the article on the shelf 478. A second article 476 is conveyed in the direction 474 by the conveyor belt 470 to facilitate making the article 476 accessible for the loading shelf 478.

Referring to FIG. 37E, the second article 476 is loaded on the second shelf 478 of the multi-shelf unit.

Referring to FIG. 37F, the loaded shelves 429 and 478 are raised. The third loading shelf 480 is raised and engaged with the conveyor actuation mechanism 426 (shown in FIG. 37B). A third article 478 is conveyed in the direction 474 to facilitate loading on the third shelf of the multi-shelf unit.

Referring to FIG. 37G, there are no more storage space available on the mobile unit 440 and the loading process is ended.

Figure 38:
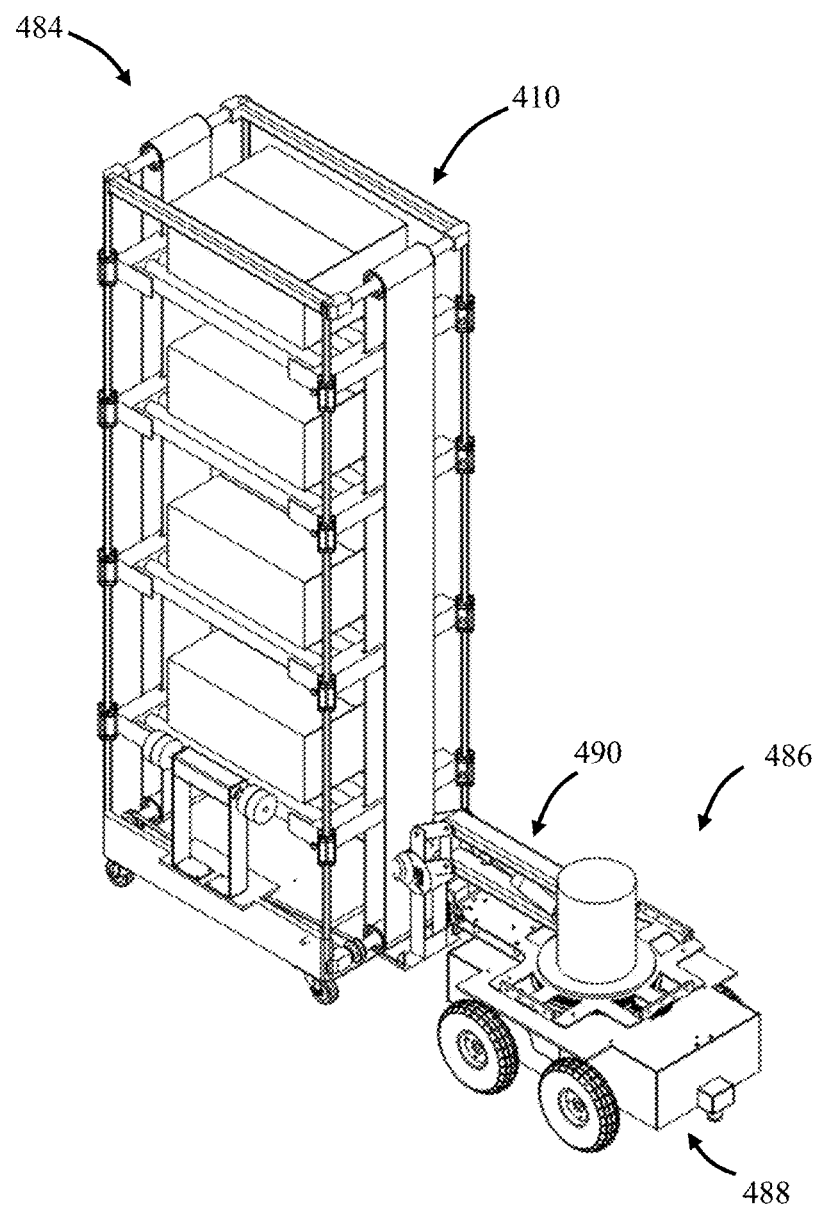
FIG. 38 is a perspective view of a mobile unit having a plurality of conveyor shelves, the mobile unit for transporting articles using a puller mobile robot, according to an embodiment.

Referring now to FIG. 38, an embodiment of the present disclosure is shown generally at 484.

The mobile unit 484 includes a multi-shelf unit 410 (also illustrated in FIG. 33A) and a puller unit 486.

The puller unit 486 generally includes a wheeled base 488 and a hooking mechanism 490.

The wheeled base is configured to navigate the unit 484 to a destination location.

The hooking mechanism 490 is configured to couple with the multi-shelf unit 410 in order to facilitate pulling process.

Figure 39:
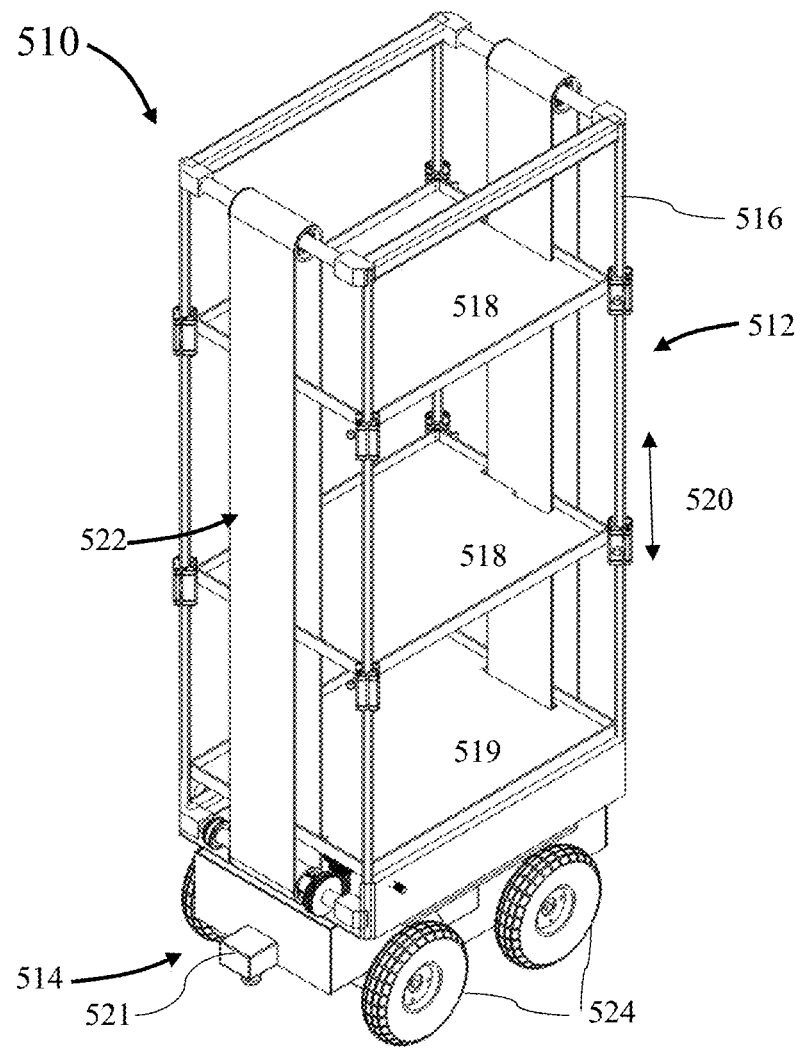
FIG. 39 is a perspective view of a mobile storage unit, according to an embodiment.

Referring to FIG. 39, an embodiment of the mobile storage unit is shown in a perspective view generally at 510.

The mobile storage unit shown at 510 includes a multi-shelf module 512 and a mobile base 514.

The multi-shelf module 512 includes a frame 516 which is removably attached to mobile base 514.

The multi-shelf module 512 further includes a plurality of vertically movable shelves 518 disposed on the frame 516 configured to move in the vertical direction 520.

The lowest shelf 519 may be fixed on the frame 516 or be configured to move in the vertical direction 520 as well.

There is a lift mechanism 522 disposed on the frame 516 and coupled to the plurality of shelves 518 to drive the shelves in the vertical direction 520.

The lift mechanism 522 of the multi-shelf module may be driven externally, or the drive system may be supplied in the mobile base 514.

The mobile base 514 further comprises a processing unit (not shown in the figures). The processing unit includes a processor and a memory. The processor is configured to autonomously execute instructions stored on the memory.

The mobile base 514 also includes one or more sensors 521 configured to send signals to the processing unit.

In FIG. 39, a LiDAR sensor disposed on the mobile base 514 is shown as the one or more sensors 521. There may be other sensors, such as article detection sensors disposed on each shelf, vision camera disposed on the apparatus, and infrared sensors disposed on the apparatus, which are not shown on the figures.

The mobile base 514 is further configured to autonomously navigate the unit 510 to a desired location by means of the motorized wheels 524.

The mobile base is further configured to actuate the lift mechanism of the multi-shelf unit 512.

Figures 40A, 40B:
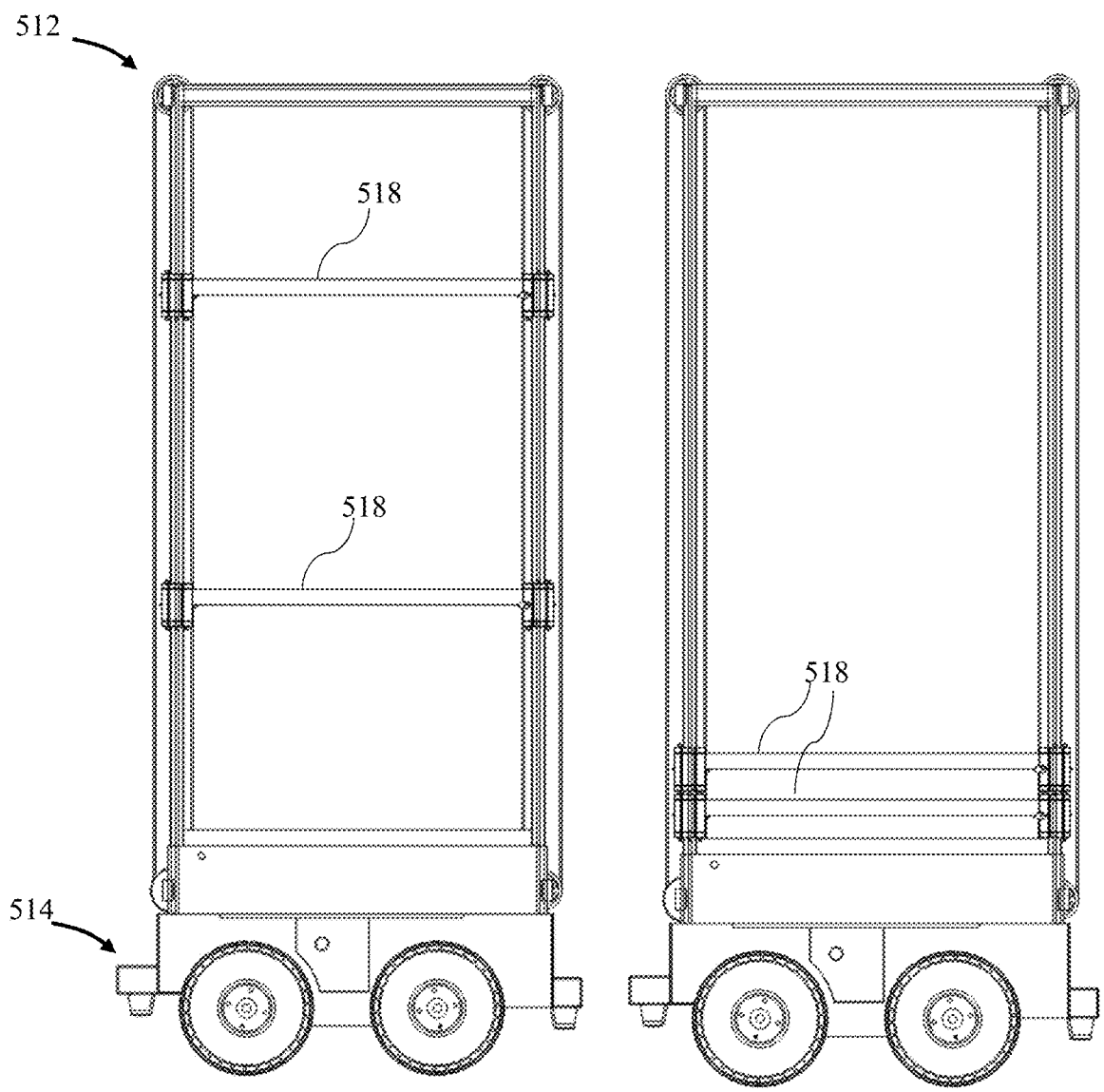
FIGS. 40A and 40B are side views of the mobile storage unit of FIG. 39.

Referring to FIG. 40A, a side view of the mobile storage unit of FIG. 39 is shown with the plurality of the shelves 518 expanded.

Referring to FIG. 40B, a side view of the mobile storage unit of FIG. 40B is shown with the plurality of shelves 518 are collapsed to provide accessibility to the top shelf of the unit.

Figure 41:
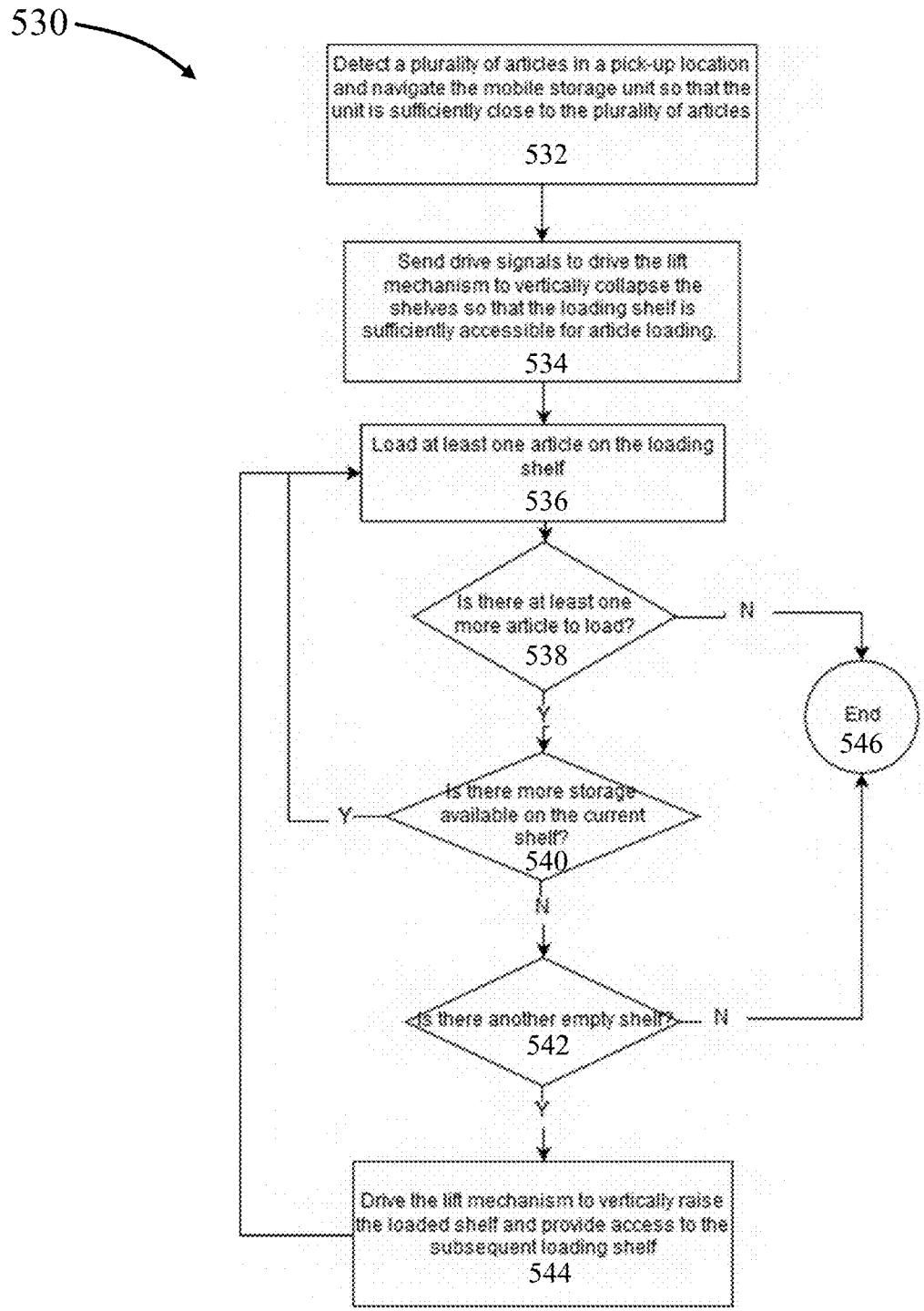
FIG. 41 is a flow diagram of a method of loading a plurality of articles onto a mobile storage unit, according to an embodiment.

Referring to FIG. 41, an autonomous method for loading a plurality of articles from a pick-up location to the mobile storage unit is generally shown in the flow diagram at 530.

The method 530 starts at block 532.

At block 532 the one or more sensors 521 detects a plurality of articles in a pick-up location and sends a signal to the processing unit, the processing unit then causes the mobile base to navigate the mobile storage unit sufficiently close to the plurality of articles.

The method 530 proceeds to block 534.

At block 534 the processing unit sends drive signals to the lift mechanism to vertically collapse the shelves so that the loading shelf is sufficiently accessible for article loading.

The method 530 proceeds to block 536.

At block 536 the processing unit causes the robotic arm 552 to load at least one article on the loading shelf.

The method 530 proceeds to block 538.

At block 538 the processing unit checks, with the one or more sensors 521, if there is at least one more article to load.

At block 538 if there is not at least one more article to load, the method 530 ends at 546.

At block 538, if there is at least one more article to load, method 530 proceeds to block 540.

At block 540, the processing unit checks, with the one or more sensors 521, if there is more storage available on the loading shelf.

If there is more space available, the method 530 proceeds to block 536.

At block 540, if there is no more storage available on the loading shelf the method 530 proceeds to block 542.

At block 542, the processing unit 530 checks if there is not another empty shelf available.

If there is no other empty shelf available, the method 530 ends at 546.

At block 542, if there is another empty shelf available, the method 530 proceeds to block 544.

At block 544 the processing unit 530 drives the lift mechanism to vertically raise the loaded shelf and provide access to a subsequent loading shelf.

The method 530 then proceeds to block 536 to continue the loading process.

Figure 42:
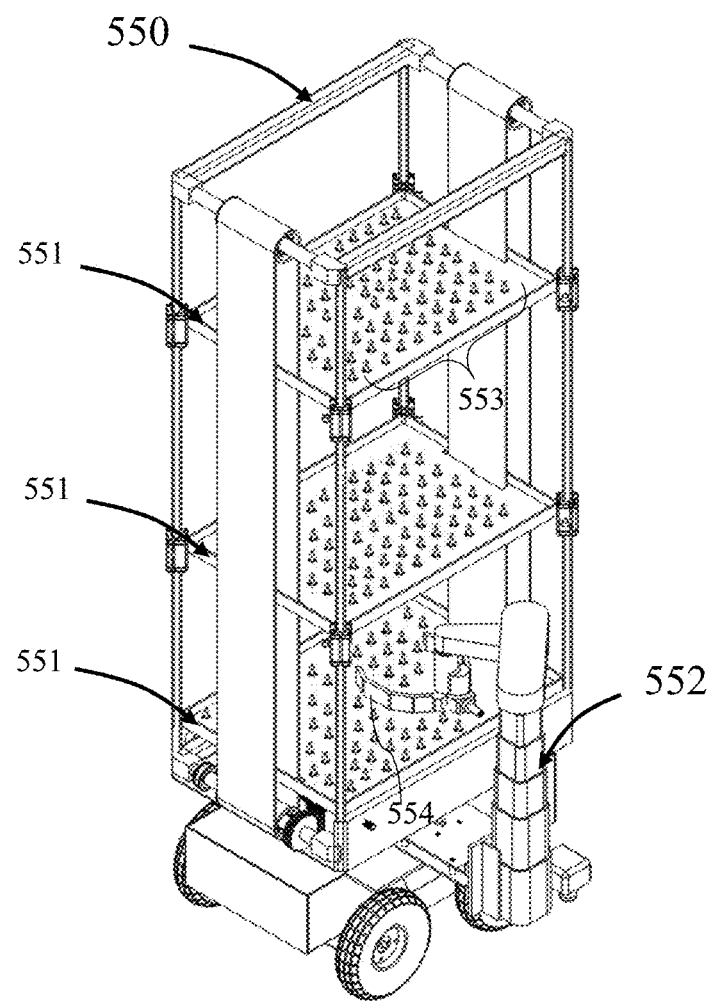
FIG. 42 is a perspective view of a mobile storage unit, according to another embodiment.

Referring to FIG. 42, another embodiment of the mobile storage unit of the present disclosure is generally shown at 550.

The mobile storage unit 550 includes a robotic arm 552 configured to have an end effector 554 such as a gripper disposed on it configured to load or unload articles to and from the lowest accessible shelf of the multi-shelf module 550.

Each shelf 551 of the multi-shelf module 550 may further have a plurality of pins 553 distributed over at least a portion of the shelf 551.

The pins 553 may be movable between an extended position and a retracted position. The pins 553 may be urged into the extended position such that a portion of each pin protrudes above the surface of the shelf 551. When an article (not shown) is loaded onto the shelf 551, the underside of the article may cause a first portion of the plurality of pins 553 underlying the article to be depressed into the retracted position while a second portion of the plurality of pins 553 remain in the extended position such that the lateral retaining portions of pins disposed adjacent to the article constrain the article to prevent movement of the article on the shelf 551 while being transported.

Referring to FIG. 43A, a flow diagram of an embodiment of a method for autonomously using the mobile storage unit as a buffer storage unit is generally shown at 555.

The method 555 begins at block 556, where the processing unit receives a task of providing accessibility for an article which is in an elevated shelf of a multi-shelf storage unit.

The method 555 proceeds to block 557, where the processing unit causes the mobile buffer storage unit to navigate to a location sufficiently close to the multi-shelf storage unit.

The method 555 proceeds to block 558, where the processing unit causes a manipulator, for example, the robotic arm 552, to unload at least one article from the lowest article-loaded shelf until the shelf is empty, load the at least one unloaded article to the highest shelf of the buffer storage unit with sufficient storage space, raise the loaded shelf of the buffer unit, and on the multi-shelf storage unit, lower the subsequent article-loaded shelf onto the emptied shelf.

The method 555 proceeds to block 559, where the processing unit checks if the accessibility for the target shelf is provided.

At block 559, if the accessibility for the target shelf is provided, the method 555 ends at block 560.

If the accessibility for the target shelf is not provided, the method 555 proceeds back to block 558.

Once accessibility to the target shelf is provided, agents, such as human operators or the buffer unit itself, may perform actions on articles stored on the target shelf. For example, one or more articles may be removed from the target shelf, or one or more articles may be examined on the target shelf.

Figure 43B:
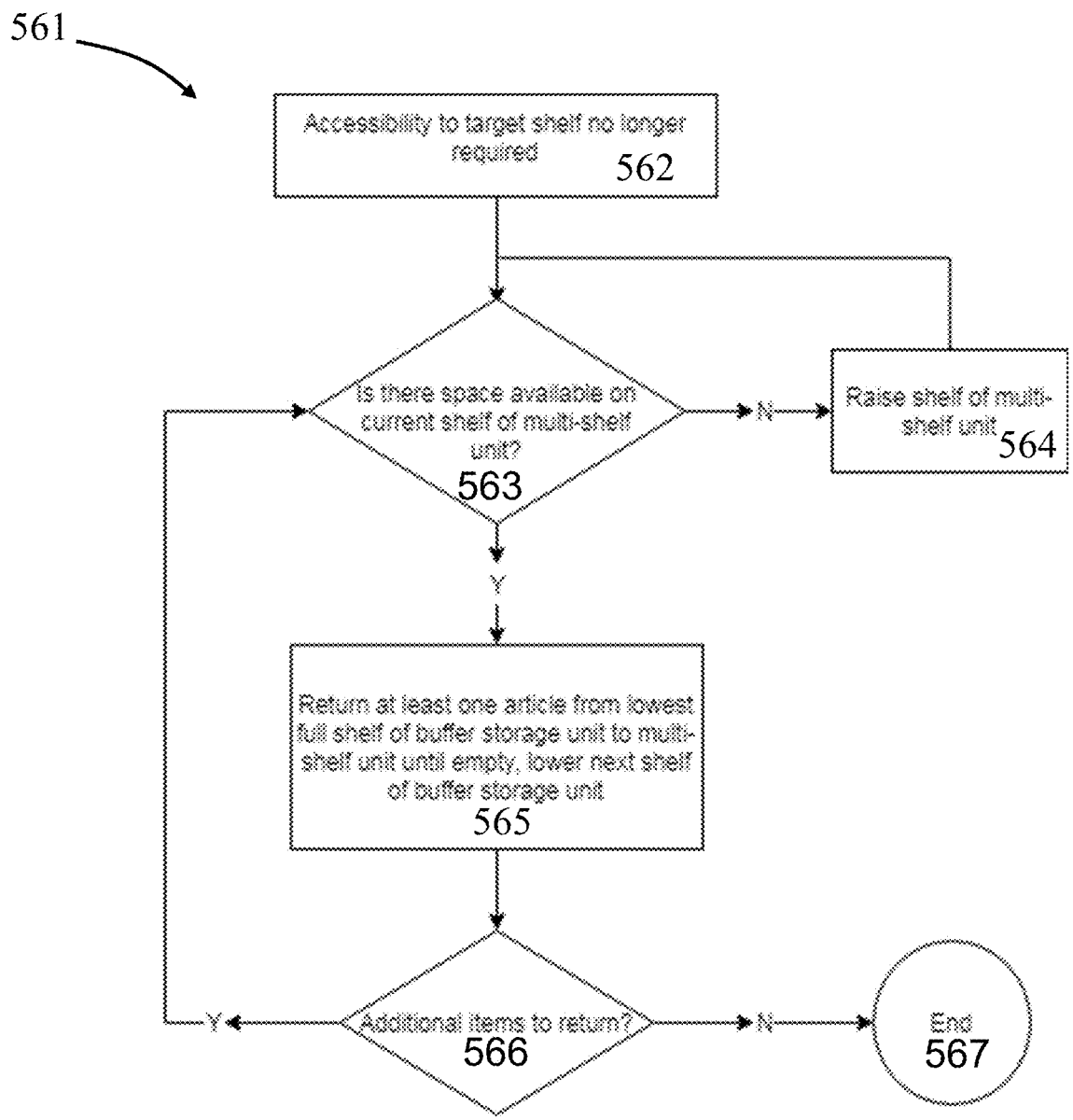
FIG. 43B is a flow diagram of a method using a mobile unit of the present disclosure as a buffer storage unit, according to an embodiment.

Referring now to FIG. 43B, when accessibility to the target shelf is no longer required, an embodiment of a method for autonomously returning articles from the buffer to the multi-shelf storage unit is generally shown at 561.

The method 561 begins at block 562, where accessibility to the target shelf of the multi-shelf unit is no longer required.

The method 561 then proceeds to block 563, where the processing unit determines whether there is space available on the currently accessible shelf of the multi shelf unit.

At block 563, if space is not available, the method 561 proceeds to block 564 and the shelf of the multi-shelf unit is raised, then the method returns to block 563.

If the current shelf has space available, the method 561 proceeds to block 565, where the processing unit causes a manipulator, for example, the robotic arm 552, to return at least one article from the lowest occupied shelf of the buffer storage unit to the current shelf of the multi-shelf storage unit.

If the lowest occupied shelf of the buffer storage unit is empty, the processing unit then causes the next shelf of the buffer storage unit to lower.

The method 561 then proceeds to block 566, where the processor determines if there are additional items to return.

If there are additional items to return, the method 561 returns to block 563.

If there are no additional items to return, the method ends at block 567.

Referring to FIGS. 44A-44G, an example implementation of the method of using the mobile storage unit as a buffer storage is illustrated in a series of perspective views.

Referring to FIG. 44A, a plurality of articles 572, 573, and 574 are loaded on the plurality of shelves 576, 578, 580, and 582 of a multi-shelf storage unit 584.

Multi-shelf storage unit 584 may be any multi-shelf storage unit with a similar operating mechanism as the mobile storage unit 586 acting as buffer storage unit.

A buffer storage unit 586 is further navigated sufficiently close to the multi-shelf storage unit 584 in order to provide sufficient accessibility for the robotic arm 588 to reach articles loaded in a lowered shelf 582.

The article 573 is loaded on the second shelf 580 of the multi-shelf storage unit 580.

A task of providing accessibility for the article 573 in the shelf 580 is received by the buffer storage unit.

There is a vacuum suction cup disposed on the robotic arm 588 as the end effector, the vacuum cup configured to detachably couple with articles.

The first article 574 is collected by the vacuum cup of the robotic arm in order to be unloaded from the multi-shelf storage unit 584 to the buffer storage unit 586.

Referring to FIG. 44B, the collected article 574 is loaded on the first shelf of the buffer storage unit 586.

Referring to FIG. 44C, the first article 574 is loaded to the buffer storage unit 586, the subsequent loaded shelf 580 of the multi-shelf storage unit 584 is lowered and the article 573 is accessible for the robotic arm 588 of the buffer storage unit 586.

The article 573 is collected by the vacuum cup of the robotic arm 588.

Referring to FIG. 44D the buffer storage unit 586 navigates sufficiently close to a table 590 while carrying the collected article 573 and disposes the collected article 573 on the table 590.

Referring to 44E-44F the article 574 is unloaded from the buffer storage unit and disposed on the lowered shelf 580 of the multi-shelf storage unit 584.

Referring to FIG. 44G, the shelf 580 of the multi-shelf storage unit is raised in order to provide access to the empty shelf 582 of the multi-shelf storage unit 584.

While the above description provides examples of one or more apparatus, methods, or systems, it will be appreciated that other apparatus, methods, or systems may be within the scope of the claims as interpreted by one of skill in the art.

The invention claimed is:

1. A system for automatic loading and unloading of articles on a collapsible storage unit, the system comprising:
 a collapsible storage unit for storing articles, the collapsible storage unit comprising:
  a frame;
  a plurality of vertically collapsible shelves disposed on the frame, wherein each vertically collapsible shelf is moveable in first and second vertical directions relative to the frame, wherein the first vertical direction corresponds to an increase in height of the respective vertically collapsible shelf, and wherein the second vertical direction corresponds to a decrease in height of the respective vertically collapsible shelf;
  a lift mechanism coupled to the plurality of collapsible shelves, the lift mechanism configured to automatically drive, in response to receiving a drive input, the plurality of vertically collapsible shelves in the first or second vertical direction; and a robotic unit independently mounted from the collapsible storage unit and configured to automatically load or unload articles to or from the plurality of vertically collapsible of the collapsible storage unit and drive vertical movement of the plurality of vertically collapsible shelves of the collapsible storage unit, the robotic unit comprising:

a base;

a robotic manipulator disposed on the base;

an end effector operably disposed on the robotic manipulator, the end effector configured to engage an article and transport the engaged article to or from a respective one of the plurality of vertically collapsible shelves of the collapsible storage unit; and a lift mechanism actuator disposed on the base;

wherein the lift mechanism actuator is connectable to the lift mechanism and configured to provide the drive input to actuate the lift mechanism when connected; and wherein actuation of the lift mechanism causes a change in height of the plurality of vertically collapsible shelves by moving the plurality of vertically collapsible shelves in the first or second vertical direction.

2. The system of claim 1, wherein the lift mechanism comprises a first belt disposed on a first side of the frame and a second belt disposed on a second side of the frame, the second side of the frame opposing the first side, and wherein movement of the first and second belts are simultaneous and synchronized.

3. The system of claim 1, wherein the lift mechanism actuator comprises a second end effector disposed on the robotic manipulator.

4. The system of claim 1, wherein each of the plurality of shelves includes an identifier tag, and wherein the robotic unit is configured to read the identifier tag, and wherein after reading the identifier tag the robotic unit sends data to a warehouse management system to update the warehouse management system.

5. The system of claim 1, wherein the robotic unit includes a rotatable base platform disposed on the base and configured to rotate relative to the base, and wherein the robotic manipulator is disposed on the rotatable base platform.

6. The system of claim 1, wherein the multi-shelf storage unit further comprises a wireless communication module communicatively connected to a warehouse management system, and wherein the wireless communication module is configured to transmit data to and receive data from the warehouse management system and wherein the warehouse management system is implemented at a cloud-based server.

7. The system of claim 1, wherein the lift mechanism actuator generates the drive input in response to receiving a command signal from a cloud-based server, the cloud-based server implementing a warehouse management system.

8. A collapsible storage unit for storing articles, the collapsible storage unit comprising:

a frame;

a plurality of vertically collapsible shelves disposed on the frame, wherein each vertically collapsible shelf is moveable in first and second vertical directions relative to the frame, wherein the first vertical direction corresponds to an increase in height of the respective vertically collapsible shelf, and wherein the second vertical direction corresponds to a decrease in height of the respective vertically collapsible shelf;

a lift mechanism disposed on the frame and coupled to the plurality of vertically collapsible shelves, the lift mechanism configured to automatically, in response to receiving a drive input, drive the plurality of vertically collapsible shelves in the first or second vertical direction; and wherein the lift mechanism is connectable to a lift mechanism actuator disposed on an external robotic unit, the external robotic unit independently mounted from the collapsible storage unit and configured to automatically load or unload articles to or from the plurality of vertically collapsible shelves of the collapsible storage unit and drive vertical movement of the plurality of vertically collapsible shelves of the collapsible storage unit; and wherein the lift mechanism actuator is configured to provide the drive input to actuate the lift mechanism; and wherein, upon receiving the drive input, the lift mechanism is actuated, causing a change in height of a respective one of the plurality of vertically collapsible shelves by moving the respective one of the plurality of vertically collapsible shelves in the first or second vertical direction.

9. The multi-shelf storage unit of claim 8, wherein the lift mechanism comprises a first belt disposed on a first side of the frame and a second belt disposed on a second side of the frame, the second side of the frame opposing the first side, and wherein movement of the first and second belts are simultaneous and synchronized.

10. The multi-shelf storage unit of claim 8, further comprising a Wi-Fi module communicatively connected to a warehouse management system, and wherein the Wi-Fi module is configured to transmit data to and receive data from the warehouse management system regarding tracking articles stored on the multi-shelf storage unit; and wherein the warehouse management system is implemented at a cloud-based server.

11. The multi-shelf storage unit of claim 8, wherein each shelf includes an identifier tag for facilitating tracking articles loaded to or unloaded from each shelf.

12. The multi-shelf storage unit of claim 8, wherein the lift mechanism actuator comprises at least one pneumatic actuator for driving the at least one vertically moveable shelf, wherein the at least one pneumatic actuator is connected to the at least one vertically moveable shelf via a transmission system, and wherein the transmission system comprises a pulley/cable transmission or a rigid linkage.

13. The multi-shelf storage unit of claim 8, wherein the lift mechanism actuator provides the drive input in response to receiving a command signal, and wherein the command signal is received via a Wi-Fi module disposed on the robotic unit.

14. The multi-shelf storage unit of claim 8, wherein each of the plurality of shelves comprises a plurality of roller conveyors, and wherein the multi-shelf storage unit further comprises a roller conveyor drive mechanism disposed on the frame and configured to engage with the plurality of roller conveyors of a shelf to cause the plurality of roller conveyors to rotate in an inward or outward direction, and wherein the plurality of roller conveyors of a given shelf are coupled to each other in such a way that rotation of a first roller results in the other rollers of the given shelf rotating synchronously with the first roller and in the same direction as the first roller.

15. A mobile storage unit comprising the multi-shelf storage unit of claim 8 disposed on a mobile base, the mobile base including a processing unit configured to autonomously navigate the mobile storage unit to a location via the mobile base, wherein the frame of the multi-shelf storage unit is moveably attached to the mobile base, and wherein the moveable attachment provides multiple degrees of freedom for the frame with respect to the mobile base.

16. A mobile storage unit comprising the multi-shelf storage unit of claim 8 disposed on a mobile base, the mobile base comprising a processing unit configured to:
   autonomously navigate the mobile storage unit to a location via the mobile base; and
   determine any one or more of whether there is another article to load onto the mobile storage unit, whether there is an available storage space for an article on a current shelf of the mobile storage unit, and whether there is an empty shelf on the mobile storage unit.

17. A mobile robot having a storage module comprising the multi-shelf storage unit of claim 8.

18. The multi-shelf storage unit of claim 8, further comprising a processing unit configured to send directions to the robotic unit to drive the lift mechanism actuator.

19. A method of using the multi-shelf storage unit of claim 8 as a buffer storage unit to access a target article, the method comprising:
   unloading a first article from a first shelf of an article storage unit, the article storage unit having a second shelf positioned above the first shelf, the second shelf storing the target article;
   loading the unloaded first article onto a first vertically moveable shelf of the multi-shelf storage unit, the first vertically moveable shelf being the most elevated shelf of the multi-shelf storage unit having sufficient storage space for the first article;
   lowering the second shelf of the article storage unit to provide access to the second shelf of the article storage unit; and
   raising the first vertically moveable shelf of the multi-shelf storage unit, having the first article loaded thereon, to provide access to a second vertically moveable shelf of the multi-shelf storage unit.

\* \* \* \* \*